United States Patent
Takenaka

(10) Patent No.: US 12,234,947 B2
(45) Date of Patent: Feb. 25, 2025

(54) EJECTION DEVICE

(71) Applicant: TOYOTA JIDOSHA KABUSHIKI KAISHA, Toyota (JP)

(72) Inventor: Tetsuhiro Takenaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 18/069,361

(22) Filed: Dec. 21, 2022

(65) Prior Publication Data
US 2023/0243464 A1 Aug. 3, 2023

(30) Foreign Application Priority Data
Jan. 31, 2022 (JP) .................................. 2022-013027

(51) Int. Cl.
*F16N 3/10* (2006.01)
(52) U.S. Cl.
CPC ...................................... *F16N 3/10* (2013.01)
(58) Field of Classification Search
CPC ........... F16H 57/0456; F16N 3/10; F16N 5/02
See application file for complete search history.

(56) References Cited

U.S. PATENT DOCUMENTS

| | | | | |
|---|---|---|---|---|
| 11,333,201 B2 * | 5/2022 | Takenaka | ............ | F16C 33/6614 |
| 2020/0072282 A1 * | 3/2020 | Takenaka | ................ | F16D 23/14 |
| 2022/0243768 A1 * | 8/2022 | Takenaka | ................ | F16D 23/14 |
| 2023/0159147 A1 * | 5/2023 | Raper | .................... | B63H 20/12 |
| | | | | 184/105.3 |
| 2023/0193956 A1 * | 6/2023 | Takenaka | .................. | F16N 3/10 |
| | | | | 184/5.1 |
| 2023/0194048 A1 * | 6/2023 | Takenaka | .................. | F16N 3/10 |
| | | | | 184/28 |
| 2023/0241639 A1 * | 8/2023 | Takenaka | ................ | B05B 15/62 |
| | | | | 118/317 |
| 2023/0243464 A1 * | 8/2023 | Takenaka | .................. | F16N 3/10 |
| | | | | 184/38.1 |
| 2023/0243465 A1 * | 8/2023 | Takenaka | ................ | F16B 2/005 |
| | | | | 184/38.1 |
| 2023/0294137 A1 * | 9/2023 | Takenaka | ............ | F16C 33/6622 |
| | | | | 15/93.1 |

FOREIGN PATENT DOCUMENTS

| | | |
|---|---|---|
| JP | H06200448 A | 7/1994 |
| JP | H07275744 A | 10/1995 |
| JP | H091010 A | 1/1997 |
| JP | 2009189897 A | 8/2009 |
| JP | 2009273976 A | 11/2009 |
| JP | 2020037949 A | 3/2020 |

* cited by examiner

*Primary Examiner* — Michael A Riegelman
(74) *Attorney, Agent, or Firm* — Hunton Andrews Kurth LLP

(57) ABSTRACT

An ejection device includes an insertion portion that is held by an operator and inserted toward a relevant portion in a narrow space. The insertion portion includes an ejection unit that is a fluidic substance supply pipe of which distal end portion is closed. A side surface of the distal end portion of the ejection unit includes at least one fluidic substance ejection port that extends from an outer peripheral surface to an inner peripheral surface of the distal end portion and from which a fluidic substance to be supplied through the ejection unit is ejected.

5 Claims, 31 Drawing Sheets

HORIZONTAL APPLICATION EXAMPLE

VERTICAL APPLICATION EXAMPLE

EJECTION DEVICE

CROSS-REFERENCE TO RELATED APPLICATION

This application claims priority to Japanese Patent Application No. 2022-013027 filed on Jan. 31, 2022, incorporated herein by reference in its entirety.

BACKGROUND

1. Technical Field

The present disclosure relates to ejection devices.

2. Description of Related Art

A device has been proposed that is configured so that an insertion portion (greasing pipe etc.) inserted into a guide through hole of a guide jig fixed to a clutch housing is moved toward a relevant portion (portion that needs to be supplied with grease from a distal end portion of the greasing pipe) (see, for example, Japanese Unexamined Patent Application Publication No. 2020-37949 (JP 2020-37949 A)).

SUMMARY

However, since the device of JP 2020-37949 A is configured to eject and supply (apply) grease in the insertion direction, grease cannot be supplied (applied) in a direction crossing the insertion direction.

The present disclosure provides an ejection device capable of supplying (applying) a fluidic substance (e.g., grease) in a direction crossing an insertion direction.

An aspect of the present disclosure relates to an ejection device including an insertion portion. The insertion portion is a member that is held by an operator and inserted toward a relevant portion in a narrow space. The insertion portion includes an ejection unit that is a fluidic substance supply pipe of which distal end portion is closed. A side surface of the distal end portion of the ejection unit includes at least one fluidic substance ejection port that extends from an outer peripheral surface to an inner peripheral surface of the distal end portion and from which a fluidic substance to be supplied through the ejection unit is ejected.

According to the ejection device of the above aspect, the fluidic substance (e.g., grease) is ejected from the ejection port in the side surface of the distal end portion of the ejection unit. Therefore, the fluidic substance can be supplied (applied) in a direction crossing the insertion direction.

In the ejection device of the above aspect, an orientation, position, number, size, and shape of the at least one fluidic substance ejection port may be selected as appropriate according to an application.

In the ejection device of the above aspect, a plurality of the fluidic substance ejection ports may be provided in a circumferential direction of the distal end portion of the ejection unit.

In the ejection device with the above configuration, a total area of the fluidic substance ejection ports located on an upper side when the insertion portion is inserted in a horizontal direction may be larger than a total area of the fluidic substance ejection ports located on a lower side when the insertion portion is inserted in the horizontal direction.

In the ejection device of the above aspect, the at least one fluidic substance ejection port may be a taper shaped with a smaller diameter on the outer peripheral surface side of the distal end portion of the ejection unit and a larger diameter on the inner peripheral surface side of the distal end portion of the ejection unit.

In the above ejection device of the above aspect, the insertion portion may further include an imaging device that captures an image including the distal end portion of the ejection unit, the at least one fluidic substance ejection port, and surroundings of the distal end portion and the at least one fluidic substance ejection port.

In the ejection device with the above configuration, the imaging device may be an endoscope.

The ejection device of the above aspect may further include a supply unit and a flexible tube. The supply unit may be configured to supply the fluidic substance to the insertion portion. The flexible tube is configured to connect the insertion portion and the supply unit.

With the ejection device of the present disclosure, a fluidic substance (e.g., grease) can be supplied (applied) in a direction crossing the insertion direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A greasing device for a clutch release mechanism according to a first embodiment (reference example) of the present disclosure will be specifically described below with reference to the drawings. The present disclosure is not limited to embodiments described below.

First Embodiment

A greasing device of a first embodiment is used to perform inspection and maintenance with grease ejection at low cost and in a short time for poor sliding (e.g., poor sliding that accompanies increased friction, abnormal sound, etc.) caused by an outflow of grease from a fork portion in a manual transmission clutch housing to be lubricated with grease or entry of foreign matter after a manual transmission vehicle is flooded or fords water.

Figure 1:
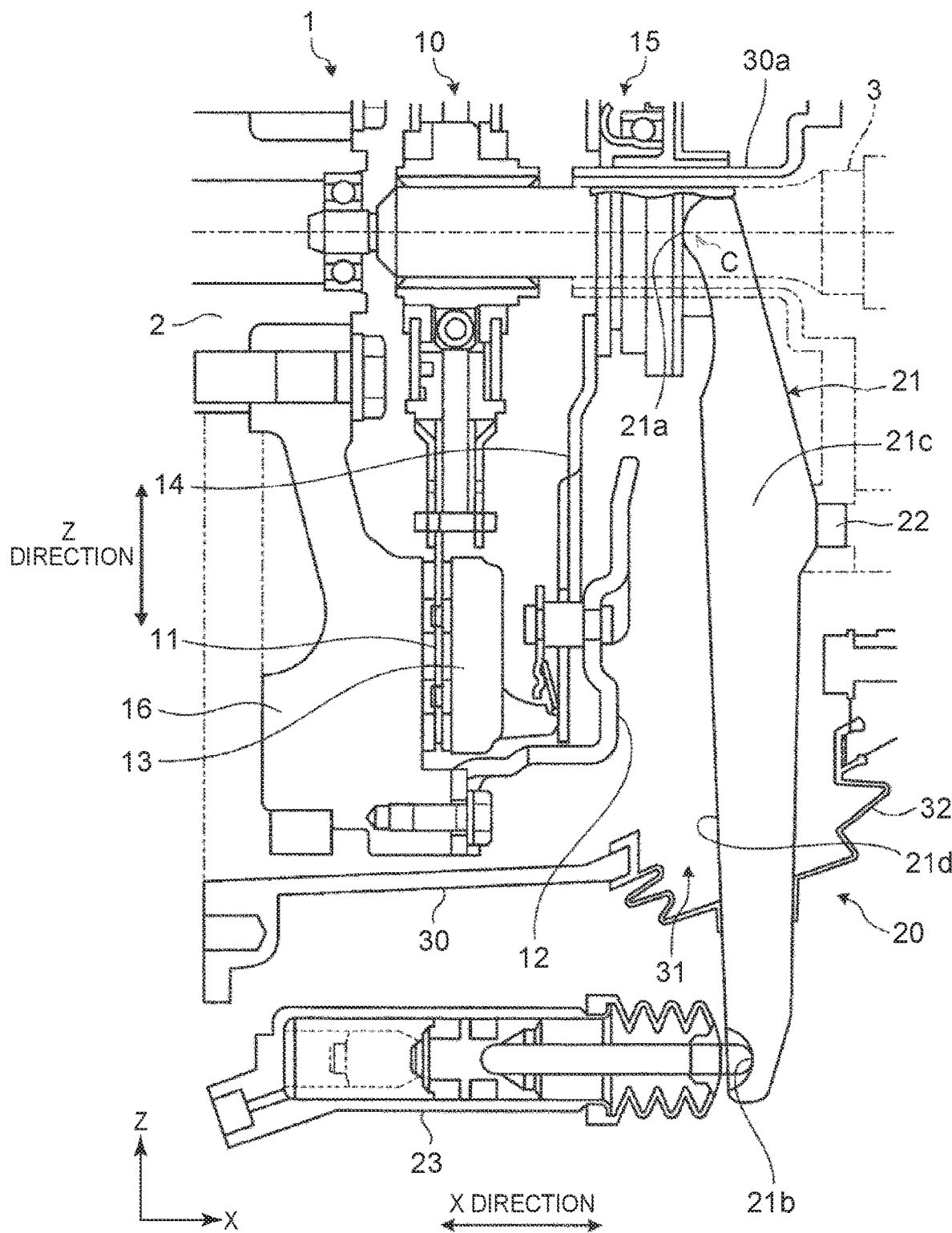
FIG. 1 schematically shows a clutch release mechanism of a first embodiment of the present disclosure.

FIG. 1 schematically shows a clutch release mechanism of the first embodiment. As shown in FIG. 1, a clutch device 1 includes a clutch body 10 that operates to connect and disconnect power, a clutch release mechanism 20 for operating the clutch body 10, and a clutch housing 30 that houses the clutch body 10 therein. For example, the clutch device 1 is mounted on a manual transmission vehicle and is disposed between an engine and a transmission.

In FIG. 1, the X direction represents an axial direction that extends along the central axis, and the Z direction represents a direction perpendicular to the central axis (sometimes referred to as the "radial direction" or "height direction"). When the Z direction is the height direction, the upper side and the lower side are sometimes referred to as the "distal end side" and the "proximal end side," respectively. The Y direction that will be described later represents a direction perpendicular to the X direction and the Z direction. The Y direction is sometimes referred to as the "lateral direction."

The clutch body 10 includes a clutch disk 11, a clutch cover 12, a pressure plate 13, a diaphragm spring 14, and a release bearing 15.

The clutch disk 11 has a friction surface (clutch facing) interposed between the pressure plate 13 and a flywheel 16, and is spline-fitted on an input shaft 3 of the transmission. Rotation of the flywheel 16 is transmitted to the input shaft 3 by a friction force between the friction surface of the clutch disk 11 and the flywheel 16. The flywheel 16 is bolted to a crankshaft 2 of the engine, so that the flywheel 16 and the crankshaft 2 rotate together.

The clutch cover 12 is provided so as to cover the outer periphery of the clutch disk 11, and rotates with the pressure plate 13 and the diaphragm spring 14. The pressure plate 13 is located between the friction surface of the clutch disk 11 and the diaphragm spring 14. The diaphragm spring 14 is a member that presses the friction surface of the clutch disk 11 against the flywheel 16 via the pressure plate 13, and is located on the opposite side of the pressure plate 13 from the friction surface of the clutch disk 11. The peripheral edge portion of the diaphragm spring 14 is connected to the pressure plate 13, and the central portion of the diaphragm spring 14 is connected to the release bearing 15. This enables the diaphragm spring 14 to press the pressure plate 13.

When the clutch body 10 is engaged, the pressure plate 13 presses the friction surface of the clutch disk 11 against the flywheel 16 by the elastic force of the diaphragm spring 14. As a result, a friction force is generated between the friction surface of the clutch disk 11 and the flywheel 16, establishing a connected state in which rotation of the flywheel 16 is transmitted to the clutch disk 11.

When the clutch body 10 is disengaged, the release bearing 15 presses the central portion of the diaphragm spring 14, so that the peripheral edge portion of the diaphragm spring 14 is displaced in the direction away from the flywheel 16. At this time, the pressure plate 13, together with the diaphragm spring 14, is drawn in the direction away from the flywheel 16. As a result, the friction force between the friction surface of the clutch disk 11 and the flywheel 16 is eliminated, establishing a disconnected state in which rotation of the flywheel 16 is not transmitted to the clutch disk 11.

The clutch release mechanism 20 includes a clutch release fork 21, a release fork support 22, and a release cylinder 23.

The clutch release fork 21 is a member for moving the release bearing 15 in the axial direction. The clutch release fork 21 is swingable in the state in which the clutch release fork 21 is supported by the release fork support 22. The clutch release fork 21 is an elongated member made of metal, and has a structure in which the clutch release fork 21 is bifurcated on its distal end side.

As shown in FIG. 1, one end of the clutch release fork 21 is formed by a pressing portion 21*a* that presses the release bearing 15 in the axial direction. The pressing portion 21*a* has a bifurcated structure. Namely, the pressing portion 21*a* is bifurcated on its distal end side so as to hold the input shaft 3 between the arms of the bifurcation inside the clutch housing 30. A portion (abutting portion) of the pressing portion 21*a* that faces the release bearing 15 in the axial direction contacts the release bearing 15. The other end of the clutch release fork 21 is formed by a connection portion 21*b*. The connection portion 21*b* projects to the outside of the clutch housing 30 through a through hole 31 of the clutch housing 30, and is connected to the release cylinder 23. The other end of the clutch release fork 21 is covered by a fork boot 32 at a position right outside the clutch housing 30. The fork boot 32 is attached to the through hole 31. The fork boot 32 may have a hole (cooling hole) for releasing friction heat generated when the clutch body 10 is brought into a half-engaged state to the outside of the clutch housing 30.

The clutch release fork 21 has, between the pressing portion 21*a* and the connection portion 21*b*, a fulcrum portion 21*c* where the clutch release fork 21 is supported by the release fork support 22. The release fork support 22 is formed by a body portion fixed to a partition wall of the clutch housing 30 and a pivot portion (not shown) having a spherical surface on the distal end side of the body portion. The partition wall of the clutch housing 30 is formed by a retainer to which a bearing (not shown) that supports the input shaft 3 is attached. The retainer is a member fixed to the clutch housing 30. The root side of the release fork support 22 is bolted to the retainer. A boss portion 30*a* of the retainer extends along the input shaft 3 inside the clutch housing 30. The input shaft 3 is inserted through the boss portion 30*a*.

The release bearing 15 is supported on the outer periphery of the boss portion 30*a* via a sleeve and is movable in the axial direction with respect to the boss portion 30*a*. The release bearing 15 is disposed so as to contact the central portion of the diaphragm spring 14. The release bearing 15 has an outer ring supported by the sleeve on the boss portion 30*a* and an inner ring that contacts the central portion of the diaphragm spring 14. The inner ring of the release bearing 15 that contacts the diaphragm spring 14 rotates, and the outer ring of the release bearing 15 that contacts the clutch release fork 21 does not rotate.

The release cylinder 23 is actuated when a driver depresses a clutch pedal (not shown). When the connection portion 21*b* is operated by the release cylinder 23, the clutch release fork 21 swings about the fulcrum portion 21*c*. With this swinging motion, the pressing portion 21*a* presses the release bearing 15. The release bearing 15 is thus moved in the axial direction and pushes the central portion of the diaphragm spring 14 toward the flywheel 16, so that the clutch body 10 is brought into a disengaged state. When the clutch body 10 is brought into a disengaged state, the flywheel 16 and the clutch disk 11 are disengaged from each other so that power cannot be transferred therebetween. When the operation force from the release cylinder 23 is eliminated, no pressing force is applied from the pressing portion 21*a* to the release bearing 15, so that the clutch body 10 is brought into an engaged state. When the clutch body 10 is brought into an engaged state, the flywheel 16 and the clutch disk 11 are engaged with each other so that power can be transferred therebetween. A power transfer path between the crankshaft 2 on the engine side and the input shaft 3 on the transmission side is thus connected and disconnected by the swinging motion of the clutch release fork 21.

Next, a greasing device 100 of the first embodiment will be described with reference to FIGS. 2, 3, etc. The greasing device 100 is a device that supplies grease to a contact portion between the pressing portion 21*a* of the clutch release fork 21 and the release bearing 15. The greasing device 100 is configured to insert a second jig 120 (insertion portion 121) into a guide through hole (first hole 113, second hole 114) of a first jig 110 fixed to the clutch housing 30 as will be described later, and to move the second jig 120 (insertion portion 121) toward a relevant portion C until a distal end portion 131 of a greasing pipe 130 provided in the second jig 120 and the relevant portion C have a predetermined positional relationship. As shown in FIG. 1, the relevant portion C refers to the contact portion between the clutch release fork 21 (pressing portion 21*a*) and the release bearing 15, namely a portion that needs greasing (portion that needs to be supplied with grease from the distal end portion 131 of the greasing pipe 130). As shown in FIG. 1, the relevant portion C is located in an internal space surrounded by the clutch housing 30. The clutch housing 30 is an example of a "cover member" of the present disclosure. The clutch housing 30 has a jig fixing through hole (through hole 31) that communicates with this internal space.

When a vehicle equipped with the clutch device 1 is used in an environment in which sand, muddy water, etc., is present, foreign matter may enter the clutch housing 30 through the cooling hole in the fork boot 32 described above and a cooling hole or opening for drainage in the clutch housing 30 (none of which is shown). It is therefore desired to perform greasing maintenance in which the clutch release mechanism 20 is maintained and grease is additionally supplied to the contact portion between the clutch release fork 21 and the release bearing 15. Therefore, the greasing device 100 is configured to perform the greasing maintenance without the need to remove the clutch housing 30 (or a manual transmission unit including the clutch housing 30) from the vehicle. The greasing device 100 supplies grease to the contact portion between the clutch release fork 21 and the release bearing 15, namely a portion that needs greasing, from the outside of the clutch housing 30 via the through hole 31 of the clutch housing 30 using the greasing pipe 130 (shown in FIG. 2 etc.).

Figure 2:
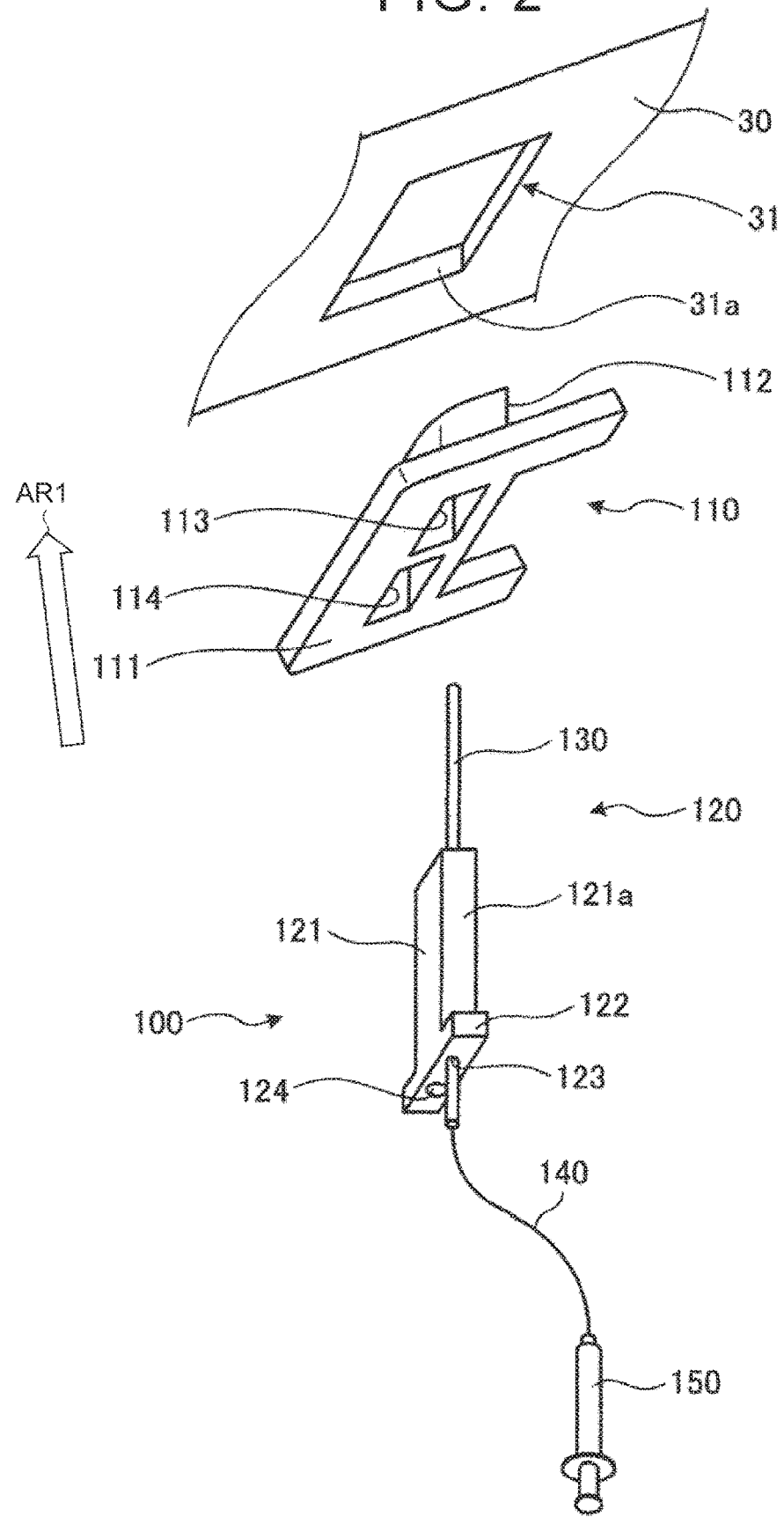
FIG. 2 schematically shows a greasing device of the first embodiment.

As shown in FIG. 2, the greasing device 100 includes the first jig 110, the second jig 120, the greasing pipe 130, a flexible tube 140, and a greasing unit 150. The greasing device 100 is an example of an "ejection device" of the present disclosure. The greasing pipe 130 is an example of an "ejection unit" of the present disclosure. The greasing unit 150 is an example of a "supply unit" of the present disclosure. The first jig 110 and the second jig 120 are members for positioning the greasing pipe 130. The first jig 110 is a member to be attached to the through hole 31 of the clutch housing 30. The second jig 120 is a member to be inserted through an insertion hole of the first jig 110.

The first jig 110 is a guide jig that regulates the direction (insertion direction) of the greasing pipe 130 (grease ejection pipe), and includes a base portion 111, a projecting portion 112, and the first hole 113 and the second hole 114 as positioning holes. The first jig 110 is an integrally molded product made of metal. The base portion 111 is in the form of a flat plate, and has such a shape that the base portion 111 can cover a part of the opening portion of the through hole 31. The width (length in the Y direction that will be described later) of the base portion 111 is larger than the opening width of the through hole 31. The projecting portion 112 is a portion that projects from the base portion 111 and that is to be inserted into the through hole 31. The projecting portion 112 functions as a positioning portion that positions the first jig 110 by abutting on an inner surface 31a of the through hole 31 and abutting on a flat surface 21d of the clutch release fork 21.

The first hole 113 and the second hole 114 are insertion holes into which the greasing pipe 130 and the insertion portion 121 of the second jig 120 are to be inserted, and are positioning holes for positioning the greasing pipe 130. The first hole 113 and the second hole 114 are through holes formed side by side in the lateral direction of the first jig 110 and extending through the first jig 110 from the base portion 111 on the proximal end side toward the projecting portion 112 on the distal end side. The first hole 113 and the second hole 114 are herein referred to as the "insertion holes" when not particularly distinguished from each other.

The second jig 120 includes the insertion portion 121 in the shape of a rectangular prism that is to be inserted into the first hole 113 and the second hole 114 of the first jig 110, and a stopper portion 122 that abuts on a surface 111a of the first jig 110. The second jig 120 is an integrally molded product made of metal. The greasing pipe 130 is integrated with the second jig 120. The second jig 120 has two through holes 123, 124 that extend linearly through the insertion portion 121 from the proximal end side to the distal end side of the insertion portion 121. One through hole 123 is a hole for a greasing pipe. The other through hole 124 is a hole for an endoscope. The greasing pipe 130 is inserted through the through hole 123 and fixed therein. An endoscope 160 is inserted through the through hole 124 and fixed therein (see FIG. 3). The stopper portion 122 has a stopper surface 122a (shown in FIG. 3) that abuts on the surface 111a of the first jig 110.

The greasing pipe 130 is a pipe for supplying grease to the contact portion between the pressing portion 21a of the clutch release fork 21 and the release bearing 15 inside the clutch housing 30. The greasing pipe 130 is a long ejection unit including the distal end portion 131 from which grease is ejected. Grease is an example of a "fluidic substance" of the present disclosure. The greasing pipe 130 is made of metal. The distal end portion 131 of the greasing pipe 130 has an opening portion 131a from which grease is ejected. The flexible tube 140 is connected to the proximal end side of the greasing pipe 130. The greasing pipe 130 is connected to the greasing unit 150 via the flexible tube 140.

Figure 3:
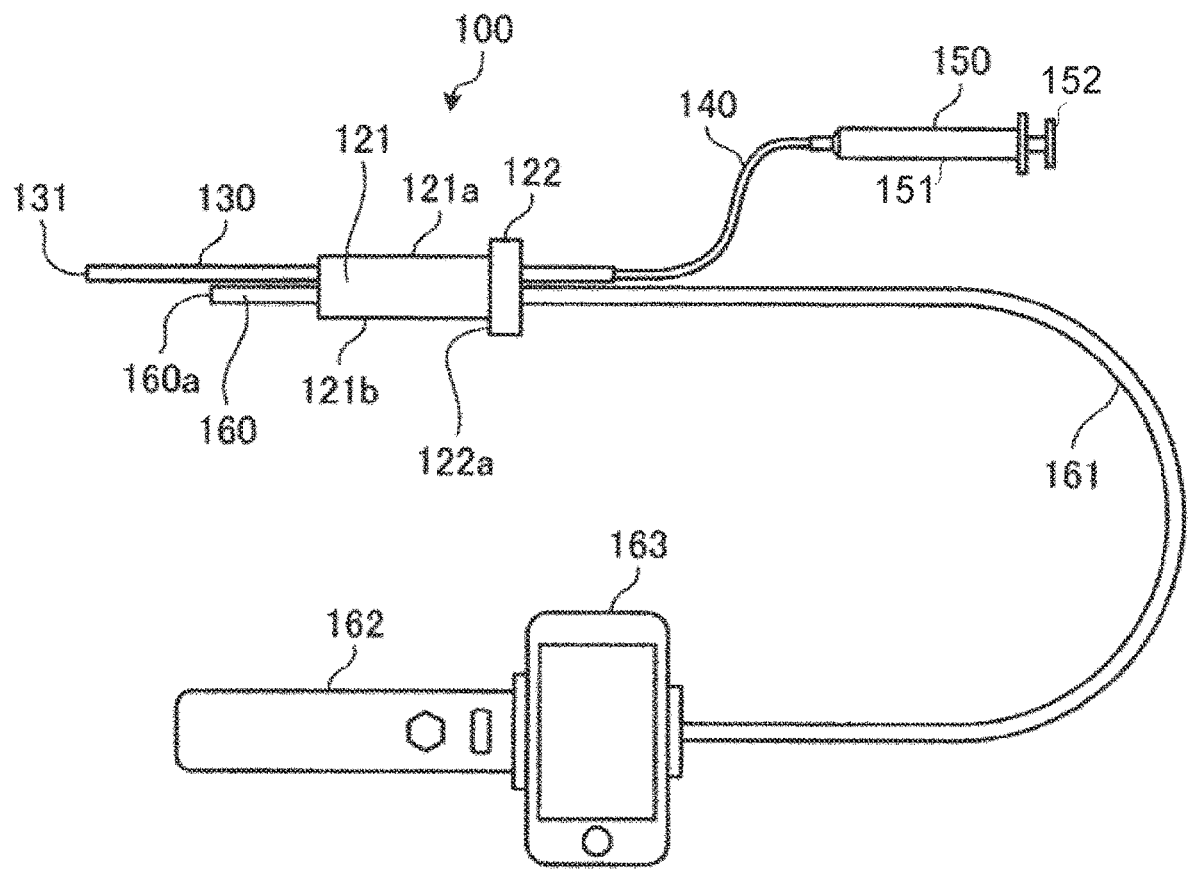
FIG. 3 is a schematic view illustrating the greasing device.

As shown in FIG. 3, the greasing device 100 includes the endoscope 160 as an imaging device. The endoscope 160 is a long imaging device that includes, in a distal end portion 160a, an imaging unit that captures an image including the distal end portion 131 of the greasing pipe 130 and the surroundings of the distal end portion 131 (e.g., the relevant portion C). The endoscope 160 is an example of an "imaging device" of the present disclosure. The endoscope 160 is integrated with the second jig 120, and projects from the distal end side of the insertion portion 121. The distal end side of the endoscope 160 is a portion to be inserted into the clutch housing 30. A lens is provided in the distal end portion 160a of the endoscope 160. The proximal end side of the endoscope 160 is connected to an operation unit 162 via a cable 161. The internal structure of the clutch housing 30 can be imaged with the endoscope 160 by operating the operation unit 162. An image captured by the endoscope 160 (e.g., an image including the distal end portion 131 of the greasing pipe 130 and the surroundings of the distal end portion 131 (e.g., the relevant portion C)) can be displayed on a display unit 163 attached to the operation unit 162.

The greasing unit 150 is composed of a cylinder 151 and a plunger rod 152 (piston) (see FIG. 3). The flexible tube 140 is connected to the cylinder 151 of the greasing unit 150. Grease can be supplied from the greasing unit 150 to the greasing pipe 130 by pushing the plunger rod 152 with the cylinder 151 filled with the grease. Greasing can be smoothly performed by, for example, inserting the greasing pipe 130 into the clutch housing 30 through the through hole 31 with the greasing pipe 130 and the flexible tube 140 filled with grease in advance and operating the greasing unit 150.

Figure 4A:
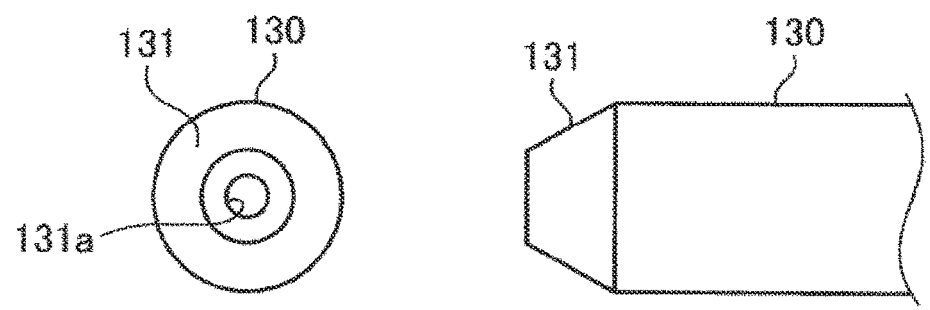
FIG. 4A shows an example of an opening portion of a greasing pipe.
Figure 4B:
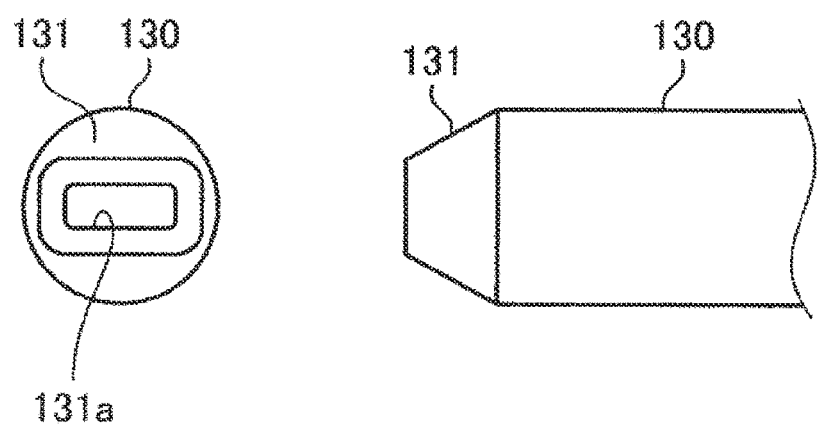
FIG. 4B shows another example of the opening portion of the greasing pipe.

The distal end portion 131 of the greasing pipe 130 has a tapered shape, and has the opening portion 131a from which grease is ejected. For example, the opening portion 131a of the greasing pipe 130 may be a circular opening portion 131a as shown in FIG. 4A. Alternatively, the opening portion 131a may be a flattened opening portion 131a as shown in FIG. 4B. Since the distal end portion 131 of the greasing pipe 130 has a tapered shape, grease can be supplied to the portion that needs greasing through a narrow space in the clutch housing 30.

Figure 5:
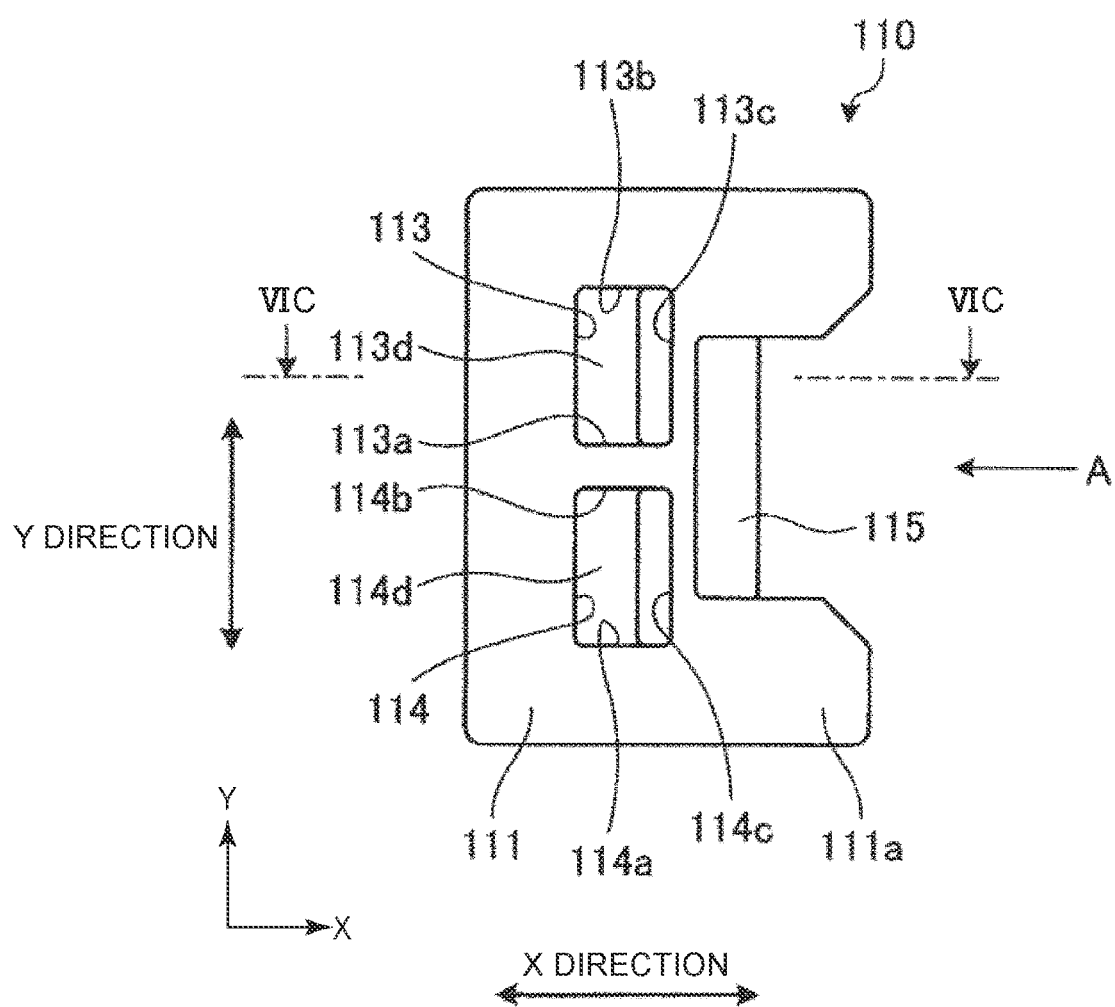
FIG. 5 is a plan view of the proximal end side of a first jig shown in FIG. 2.
Figure 6A:
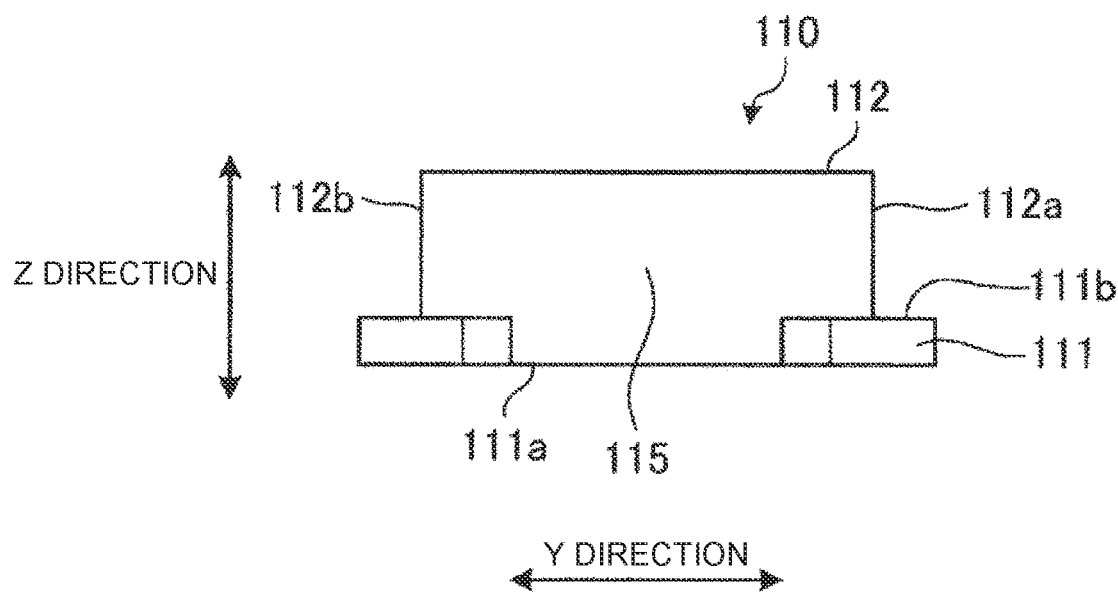
FIG. 6A shows the first jig as viewed in the direction of the arrow A in FIG. 5.
Figure 6B:
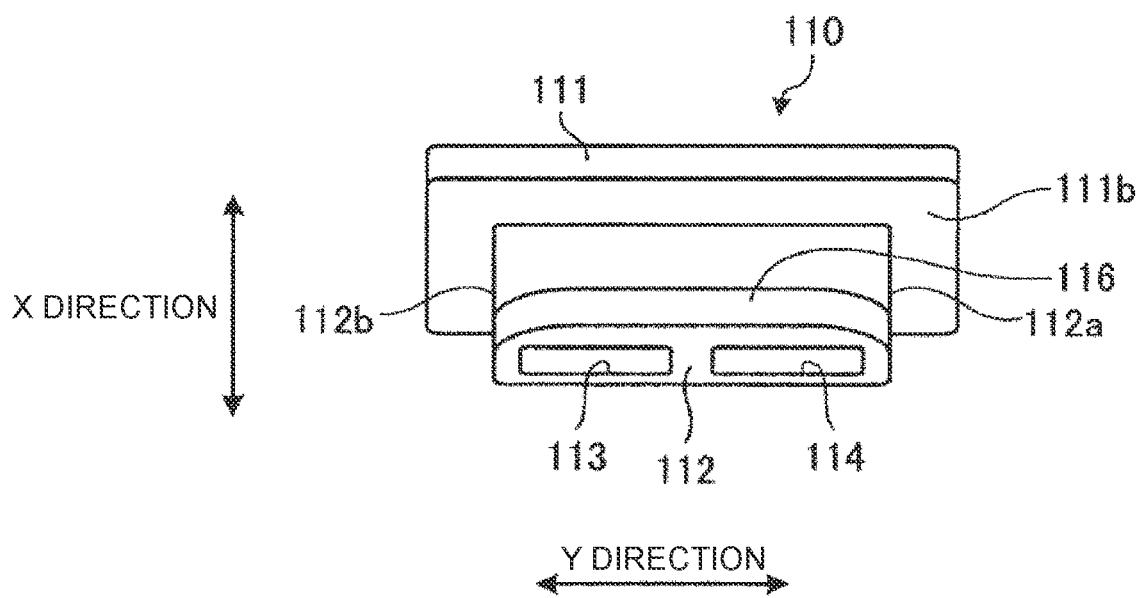
FIG. 6B is a perspective view of the first jig as viewed from its back surface side.
Figure 6C:
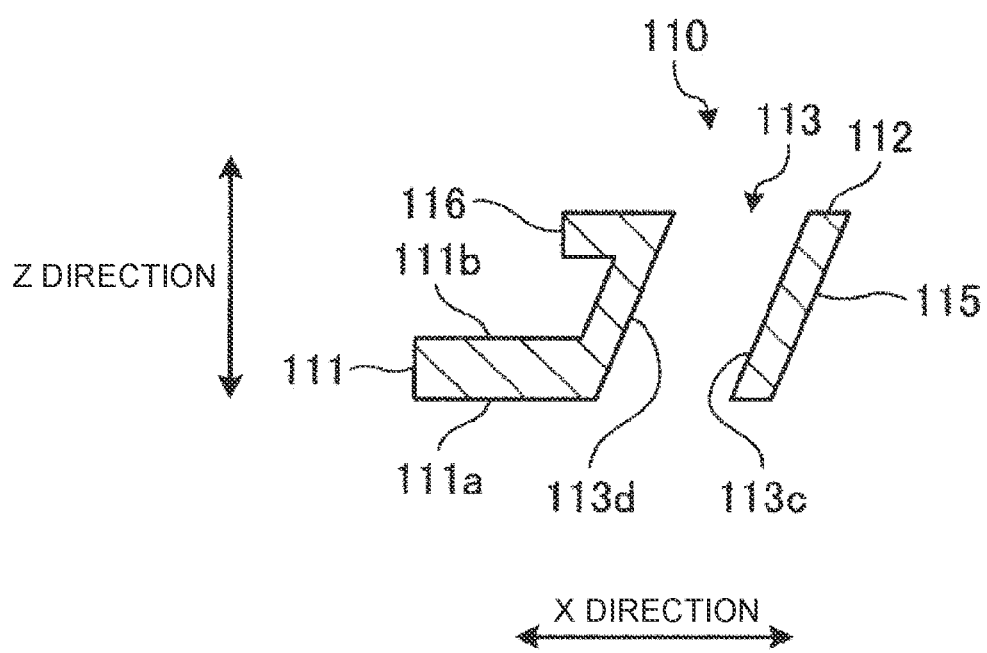
FIG. 6C shows a section taken along line VIC-VIC in FIG. 5.

The first jig 110 will be described in detail with reference to FIGS. 5 and 6A to 6C. FIG. 5 is a plan view of the proximal end side of the first jig 110. FIG. 6A shows the first jig 110 as viewed in the direction of the arrow A in FIG. 5. FIG. 6B is a perspective view of the first jig 110 as viewed from its back surface side. FIG. 6C shows a section taken along line VIC-VIC in FIG. 5.

As shown in FIG. 5, the first jig 110 has rectangular opening portions of the first hole 113 and the second hole 114 on the surface 111a side of the base portion 111. The inner surface of the first hole 113 is a surface that functions as a guide surface on which the insertion portion 121 abuts to position the greasing pipe 130, and includes a first surface 113a, a second surface 113b, a third surface 113c, and a fourth surface 113d. The first surface 113a and the second surface 113b face each other in the Y direction, and correspond to the short sides of the rectangular shape. The third surface 113c and the fourth surface 113d face each other in the X direction, and correspond to the long sides of the rectangular shape. The inner surface of the second hole 114 is a surface that functions as a guide surface for positioning the greasing pipe 130, and includes a first surface 114a, a second surface 114b, a third surface 114c, and a fourth surface 114d. The first surface 114a and the second surface 114b face each other in the Y direction, and correspond to the short sides of the rectangular shape. The third surface 114c and the fourth surface 114d face each other in the X direction, and correspond to the long sides of the rectangular shape.

The first jig 110 further has an abutting surface 115 that abuts on the flat surface 21d of the clutch release fork 21. The abutting surface 115 is a positioning surface, and can position the first jig 110 in the X direction by abutting on the flat surface 21d of the clutch release fork 21. As shown in FIG. 6A, the abutting surface 115 has a predetermined width in the lateral direction (Y direction) of the base portion 111, and extends in the height direction (Z direction) of the projecting portion 112.

As shown in FIG. 6B, the first jig 110 further has a key portion 116 on its back surface 111b side. The key portion 116 is a portion to be caught by the clutch housing 30 when the projecting portion 112 is inserted into the through hole 31. The key portion 116 functions as a portion that retains the first jig 110 in the through hole 31. Opening portions of the first hole 113 and the second hole 114 that are formed in the projecting portion 112 also have a rectangular shape as with the proximal end side. As shown in FIG. 6C, the first hole 113 extends linearly through the projecting portion 112.

Figure 7:
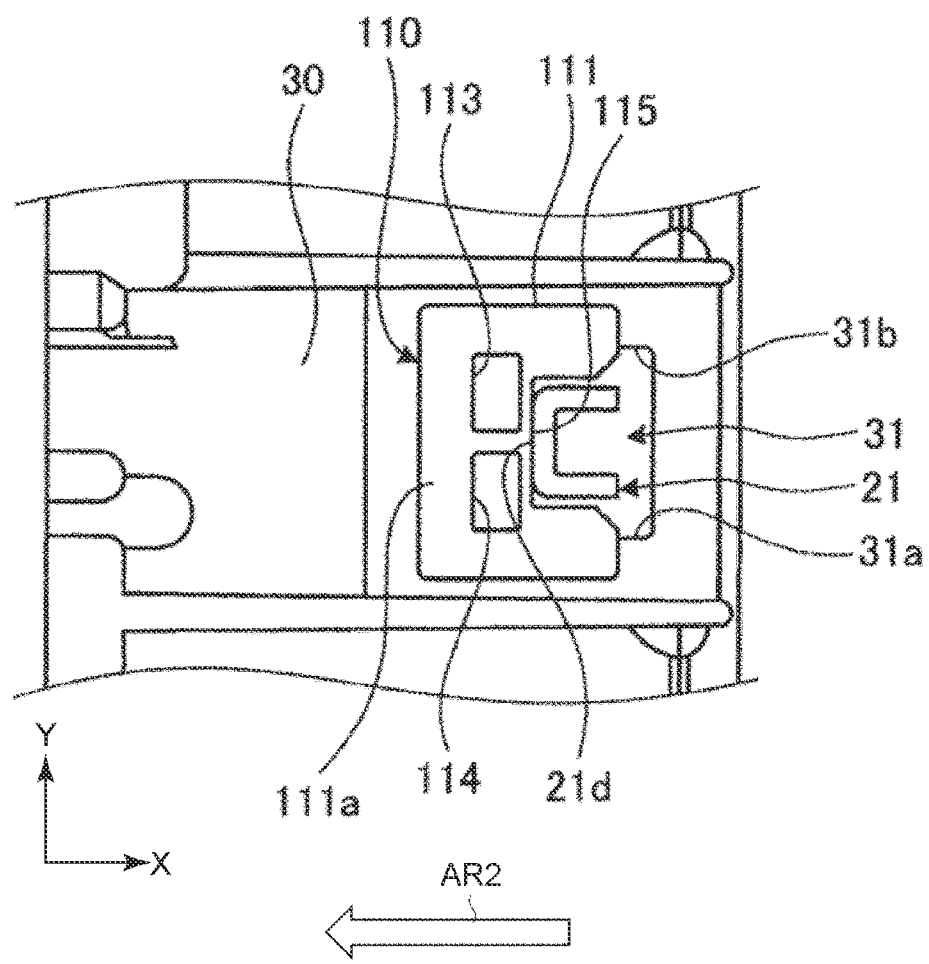
FIG. 7 shows the first jig attached to a through hole of a clutch housing shown in FIG. 2.
Figure 8:
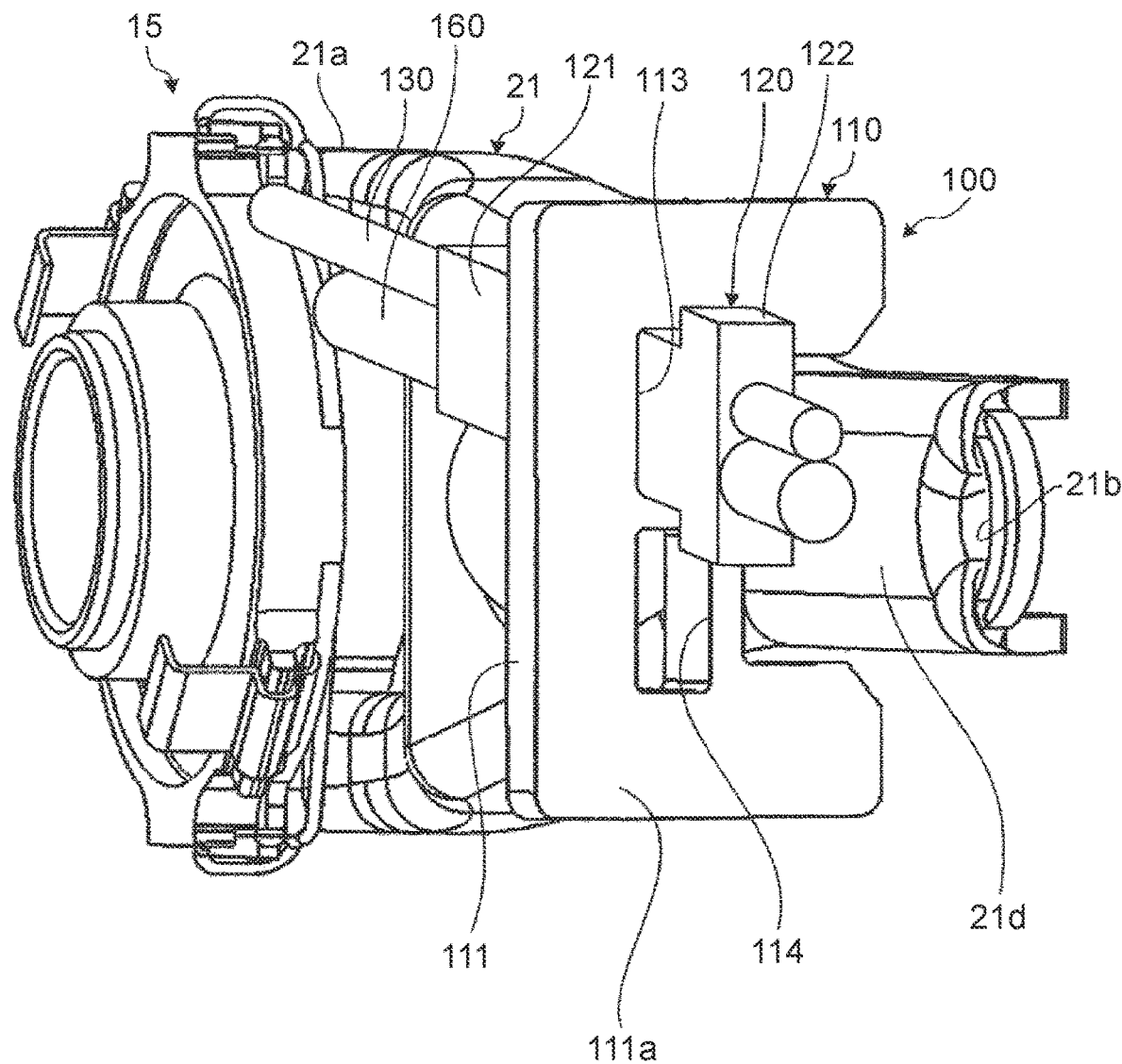
FIG. 8 shows the greasing pipe extending toward a pressing portion of a clutch release fork with a second jig, shown in FIG. 2, inserted through an insertion hole of the first jig.
Figure 9:
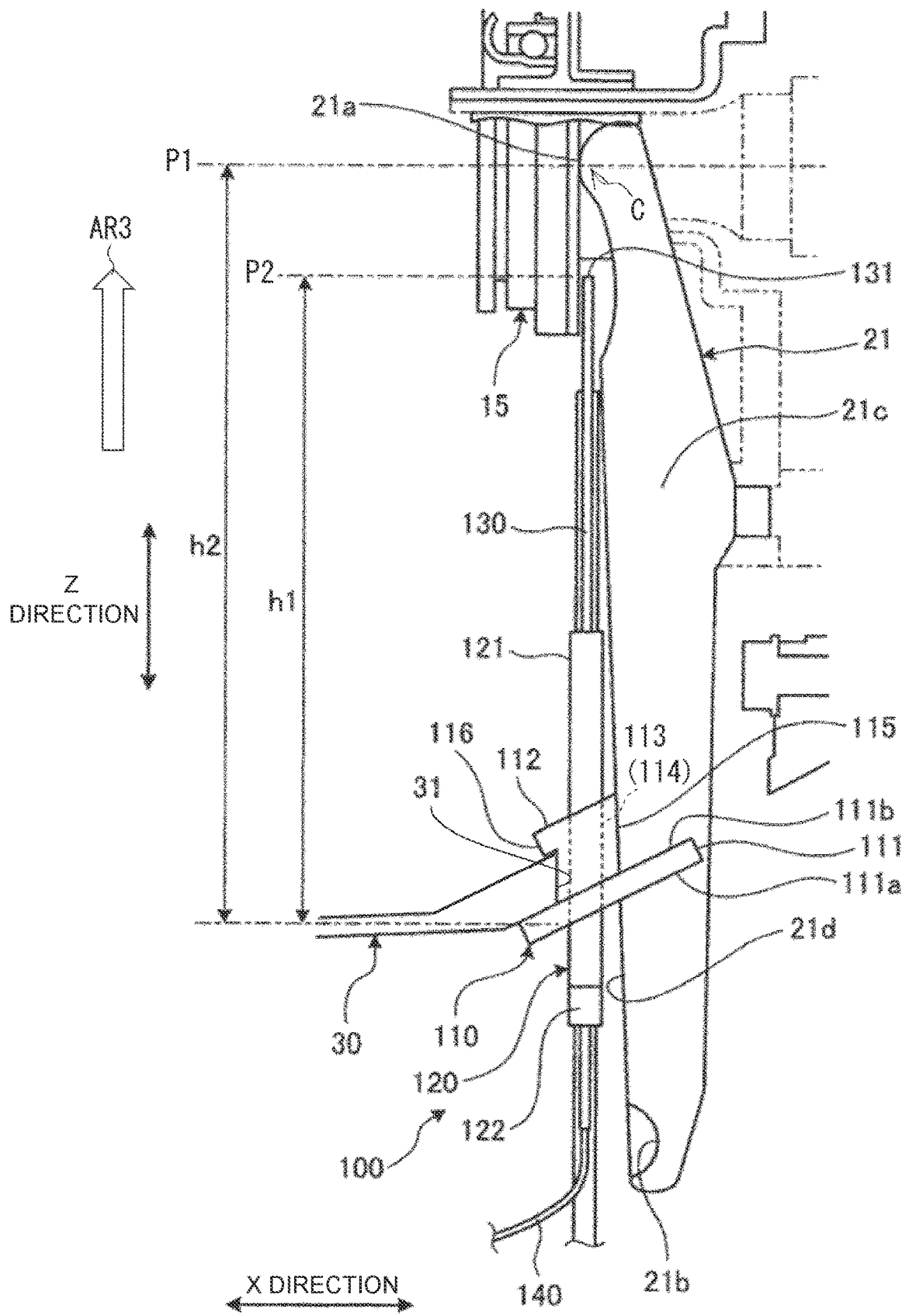
FIG. 9 illustrates the height position of a distal end portion of the greasing pipe.

Next, a greasing method using the greasing device 100 will be described with reference to FIGS. 7 to 9. FIG. 7 shows the first jig 110 attached to the through hole 31 of the clutch housing 30. FIG. 8 shows the greasing pipe 130 extending toward the pressing portion 21a of the clutch release fork 21 with the second jig 120 inserted through the insertion hole of the first jig 110. FIG. 9 illustrates the height position of the distal end portion 131 of the greasing pipe 130. The Z direction shown in FIG. 9 represents the height direction. The fork boot 32 is removed before the following steps are performed. The through hole 31 (see FIGS. 2, 9, etc.) of the clutch housing 30 through which the greasing pipe 130 etc. is to be inserted is thus exposed.

In a first step, the first jig 110 is fixed to the through hole 31 of the clutch housing 30. The clutch housing 30 is also an example of a "fixing mating member" of the present disclosure.

Figure 10A:
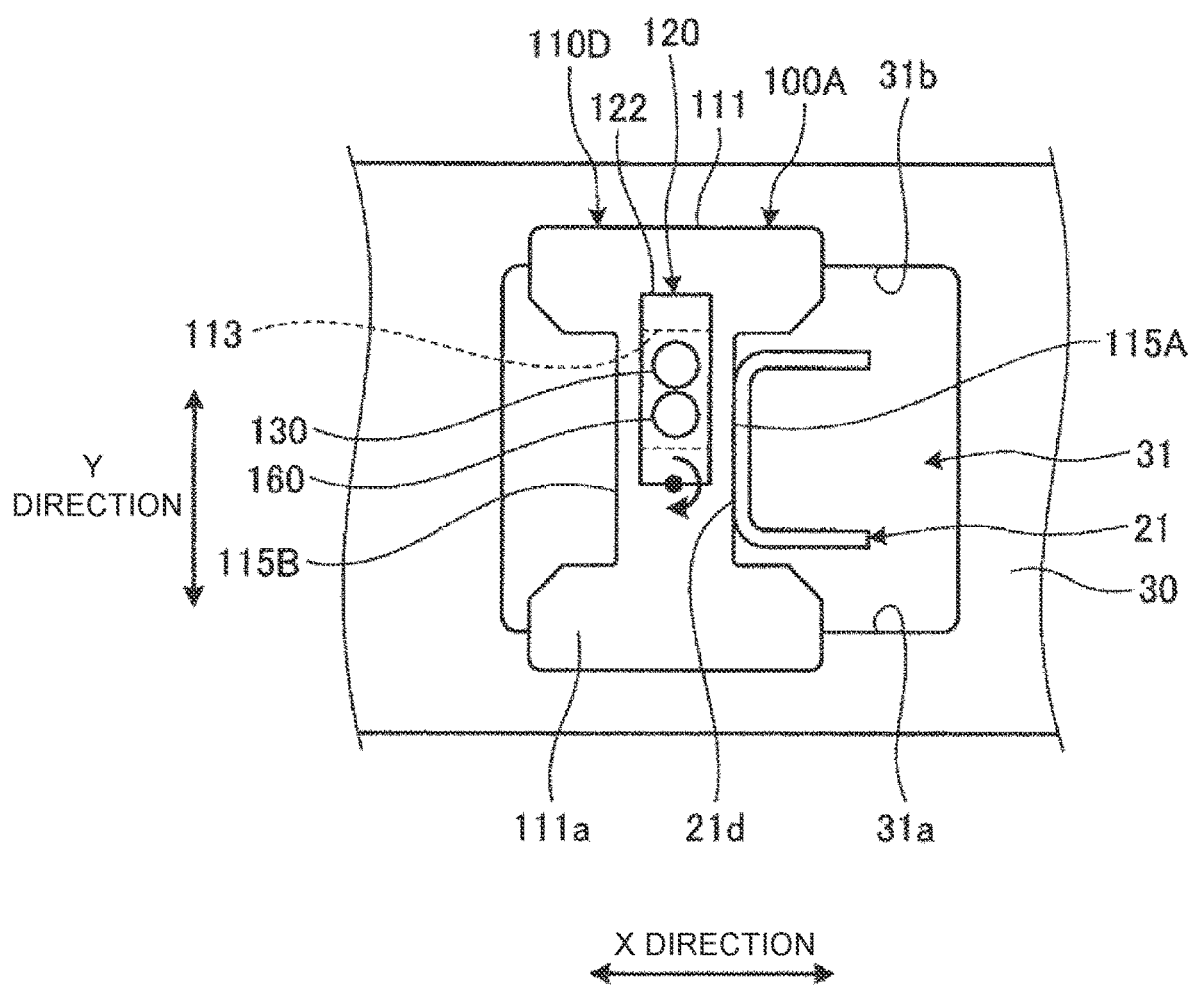
FIG. 10A schematically shows a first modification of the first jig.
Figure 10B:
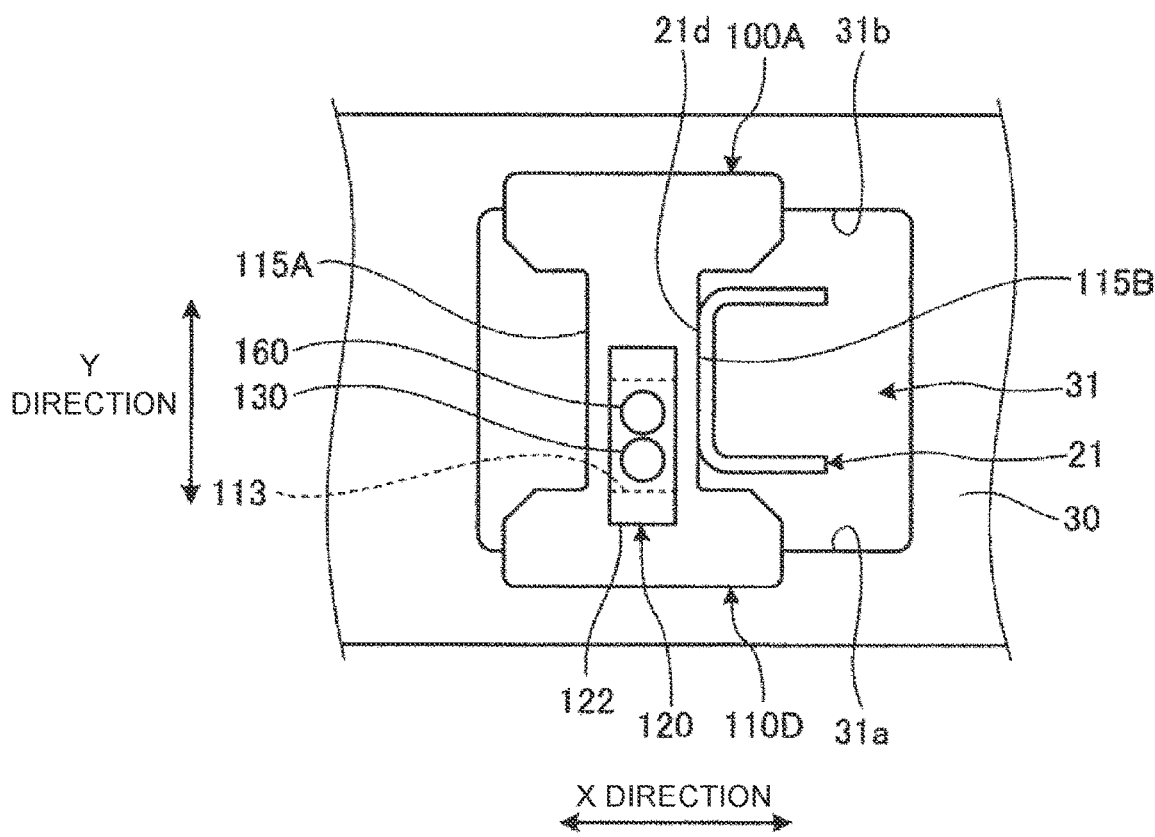
FIG. 10B schematically shows the first modification of the first jig.

FIGS. 10A and 10B schematically show a modification of the first jig 110. A first jig 110D includes a base portion 111, a projecting portion 112, and a first hole 113 for positioning. The first hole 113 is an insertion hole into which the greasing pipe 130, the endoscope 160, and the second jig 120 are inserted. Here, the first hole 113 is disposed at a position displaced from the center of the first jig 110D in the Y direction. As a result, in the greasing device 100, grease can be applied to a different position by rotating the first jig 110D by 180 degrees and inserting the first jig 110D after the first jig 110D is inserted. FIG. 10A is a schematic diagram when the first jig 110D is inserted. FIG. 10B is a schematic diagram when the first jig 110D in FIG. 10A is rotated by 180 degrees and inserted. In FIG. 10A, a first side surface 115A of the first jig 110D serves as an abutting surface that abuts on the clutch release fork 21. In FIG. 10B, a second side surface 115B of the first jig 110D serves as an abutting surface that abuts on the clutch release fork 21. The greasing pipe 130 is located outside the endoscope 160 with respect to the center in the Y direction. Note that, the endoscope 160 may be located outside the greasing pipe 130 with respect to the center in the Y direction.

Figure 11:
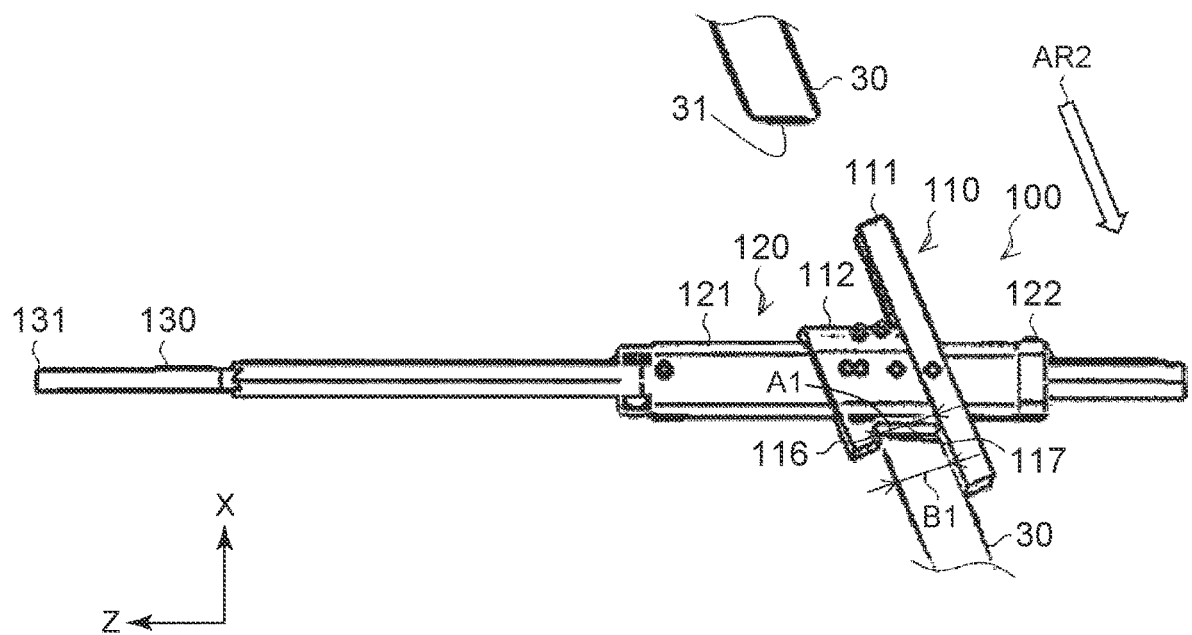
FIG. 11 shows the first and second jigs extracted from FIG. 9.

FIG. 11 shows the first jig 110 and the second jig 120 extracted from FIG. 9.

As shown in FIG. 11, the first jig 110 is positioned with respect to the clutch housing 30 in the X, Y, and Z directions and fixed to the clutch housing 30 (portion of the clutch housing 30 around the through hole 31).

Specifically, first, the projecting portion 112 of the first jig 110 and the through hole 31 of the clutch housing 30 are caused to face each other (see FIG. 2), and the abutting surface 115 of the first jig 110 and the clutch release fork 21 (flat surface 21d) are caused to face (contact) each other (see FIG. 7).

Next, the first jig 110 is slid in the direction toward the through hole 31 (see the arrow AR1 in FIG. 2) along the clutch release fork 21 (flat surface 21d) until the projecting portion 112 of the first jig 110 is inserted through the through hole 31 and the base portion 111 of the first jig 110 abuts on the portion of the clutch housing 30 around the through hole 31.

Since the projecting portion 112 of the first jig 110 is inserted through the through hole 31 and side surfaces 112a, 112b of the projecting portion 112 face (abut on) inner surfaces 31a, 31b of the through hole 31, the first jig 110 is positioned with respect to the clutch housing 30 in the Y direction.

Since the base portion 111 of the first jig 110 abuts on the portion of the clutch housing 30 around the through hole 31, the first jig 110 is positioned with respect to the clutch housing 30 in the Z direction.

Next, the first jig 110 thus positioned with respect to the clutch housing 30 in the Y and Z directions is pushed in the direction of the arrow AR2 (see FIGS. 7 and 11).

Specifically, the first jig 110 positioned with respect to the clutch housing 30 in the Y and Z directions as described above is pushed in the direction of the arrow AR2 (see FIGS. 7 and 11) until the portion of the clutch housing 30 around the through hole 31 is inserted (press-fitted) into a space between the base portion 111 and the key portion 116 of the first jig 110 (see FIG. 11) and abuts on a bottom portion 117 between the base portion 111 and the key portion 116 of the first jig 110.

A distance A1 (see FIG. 11) between the base portion 111 and the key portion 116 of the first jig 110 and a thickness B1 (see FIG. 11) of the portion of the clutch housing 30 around the through hole 31 are set to have a relationship of A1<B1. Therefore, when the first jig 110 thus positioned with respect to the clutch housing 30 in the Y and Z directions is pushed in the direction of the arrow AR2 (see FIGS. 7 and 11), the portion of the clutch housing 30 around the through hole 31 is inserted (press-fitted) into the space between the base portion 111 and the key portion 116 of the first jig 110. The first jig 110 is thus fixed to the clutch housing 30.

Since the portion of the clutch housing 30 around the through hole 31 abuts on the bottom portion 117 between the base portion 111 and the key portion 116 of the first jig 110, the first jig 110 is positioned with respect to the clutch housing 30 in the X direction.

The first jig 110 is thus positioned with respect to the clutch housing 30 in the X, Y, and Z directions and fixed to the clutch housing 30 (portion of the clutch housing 30 around the through hole 31). In other words, the first jig 110 is positioned with respect to the clutch housing 30 in the X, Y, and Z directions and engaged with the portion of the clutch housing 30 around the through hole 31. The base portion 111 and the key portion 116 of the first jig 110 are an example of an "engagement portion" of the present disclosure.

With the first jig 110 thus fixed to the clutch housing 30 (portion of the clutch housing 30 around the through hole 31), the first hole 113 of the first jig 110 extends toward the relevant portion C (one arm of the bifurcated pressing portion 21a) (see FIG. 9). Similarly, the second hole 114 of the first jig 110 extends toward the relevant portion C (the other arm of the bifurcated pressing portion 21a). The first jig 110 can be removed from the clutch housing 30 by performing the above steps in the opposite order.

In a step (insertion step) following the first step, the greasing pipe 130 and the second jig 120 are inserted into the insertion hole (first hole 113, second hole 114) of the first jig 110 fixed to the clutch housing 30 as described above. In the insertion step, the second jig 120 is inserted into the insertion hole (first hole 113, second hole 114) of the first jig 110 in two stages. The insertion portion 121 of the second jig 120 has a scribing line on the side surfaces 121a, 121b at a position a predetermined distance from the distal end side. The scribing line will be described later in a second embodiment. The insertion portion 121 has a rectangular outer peripheral shape. The side surfaces 121a, 121b correspond to the short sides of the rectangle. The side surface 121a is a surface on one side in the Y direction. The side surface 121b is a surface on the other side in the Y direction. The rectangle of the insertion portion 121 is smaller than the rectangle of the opening portion of the first hole 113 and the rectangle of the opening portion of the second hole 114.

As shown in FIG. 8, since the insertion portion 121 of the second jig 120 is inserted into the first hole 113 of the first jig 110, the greasing pipe 130 extends toward the pressing portion 21a of the clutch release fork 21 that is the portion that needs greasing. Since the pressing portion 21a has a bifurcated structure, the greasing pipe 130 inserted into the first hole 113 extends toward the one arm of the pressing portion 21a. It is sometimes necessary to avoid an obstacle inside the clutch housing 30 before the greasing pipe 130 reaches close to the pressing portion 21a of the clutch release fork 21. An example of the obstacle includes a clip that is a component of the release bearing 15. Since the clip is located near the bifurcated structure of the clutch release fork 21, it is desirable to make sure that the greasing pipe 130 does not contact the clip before the greasing pipe 130 reaches the pressing portion 21a.

Therefore, in a second step (the former half of the insertion step), the insertion portion 121 of the second jig 120 is inserted into the insertion hole of the first jig 110 to the position of the scribing line. With the insertion portion 121 inserted into the insertion hole to the position of the scribing line in the second step, the second jig 120 can be moved within the insertion hole so as to be displaced with respect to the first jig 110 so that the greasing pipe 130 and the endoscope 160 can avoid an obstacle in the clutch housing 30. That is, in a third step (avoiding operation step), the second jig 120 is moved so as to avoid the internal structure of the clutch housing 30. In the step described below, an operator performs an operation of moving the second jig 120 (insertion portion 121) held with his or her one hand (e.g., left hand) in the direction of the arrow AR3 (see FIGS. 9 and 11) toward the relevant portion C so that the distal end portion 131 of the greasing pipe 130 reaches the relevant portion C (see FIG. 9), while looking at a screen (image including the distal end portion 131 of the greasing pipe 130 and the surroundings of the distal end portion 131 (e.g., the relevant portion C)) displayed on the display unit 163 attached to the operation unit 162 held with the other hand (e.g., right hand).

With the insertion portion 121 thus inserted into the first hole 113 in the third step, there is clearance (about 0.5 mm) between the side surfaces 121a, 121b of the insertion portion 121 and the inner surface (inner wall) of the first hole 113. Similarly, with the insertion portion 121 thus inserted into the second hole 114 in the third step, there is clearance (about 0.5 mm) between the side surfaces 121a, 121b of the insertion portion 121 and the inner surface (inner wall) of the second hole 114. Therefore, with the second jig 120 inserted into the insertion hole to the position of the scribing line, the greasing pipe 130 can be positioned at a height where the greasing pipe 130 does not contact the clip of the release bearing 15 and a position where the greasing pipe 130 avoids the internal structure such as the clip. In this case, the operator can hold the stopper portion 122 with his or her hand and move the second jig 120 so as to swing the distal end side of the insertion portion 121 in the Y direction.

As shown in FIG. 9, the clip of the release bearing 15 can be avoided when the distal end portion 131 of the greasing pipe 130 is at a height h1. At this time, the insertion of the greasing pipe 130 is stopped, and the position of the distal end portion 131 is controlled so as to avoid the clip of the release bearing 15. The height h1 also represents the amount of insertion (stroke amount).

In the third step, for example, as an operation for the greasing pipe 130 to avoid an obstacle in the clutch housing 30, the side surface 121a of the insertion portion 121 that has not been in contact with the second surface 113b of the first hole 113 is brought into contact with the second surface 113b of the first hole 113 from the state in which the side surface 121b of the insertion portion 121 abuts on the first surface 113a of the first hole 113. At this time, the second jig 120 is moved until the insertion portion 121 slides on the third surface 113c of the first hole 113 and the side surface 121a (see FIG. 2) comes into contact with the second surface 113b. This sliding motion includes translation in the Y direction and lateral swinging of the distal end portion 131 side. The greasing pipe 130 is thus brought to a position where the greasing pipe 130 does not contact the clip.

After the greasing pipe 130 is thus brought to a position where the greasing pipe 130 avoids an obstacle in the clutch housing 30, the distal end portion 131 of the greasing pipe 130 is moved again toward the portion that needs greasing. That is, the step of inserting the second jig 120 is resumed, and the insertion portion 121 is inserted into the through hole 31 to a position where the stopper portion 122 of the second jig 120 abuts on the base portion 111 of the first jig 110. The distal end portion 131 of the greasing pipe 130 will have been inserted to a predetermined target position in the clutch housing 30 when the stopper portion 122 of the second jig 120 comes into contact with the first jig 110. That is, in a fourth step (the latter half of the insertion step), the insertion portion 121 is inserted further into the insertion hole of the first jig 110 from the position of the scribing line to move the distal end portion 131 of the greasing pipe 130 to the portion that needs greasing.

In the fourth step, as shown in FIG. 9, the distal end portion 131 of the greasing pipe 130 reaches a height h2 where the one arm of the bifurcated pressing portion 21a is located. The distal end portion 131 of the greasing pipe 130 can thus be brought to a position near the pressing portion 21a of the clutch release fork 21. The amount of insertion is larger at the height h2 than at the height h1.

Then, in a fifth step, grease is supplied from the opening portion 131a of the greasing pipe 130. In the fifth step, the operator holds the greasing unit 150 with his or her one hand (e.g., left hand) and operates the greasing unit 150 (e.g., pushes the plunger rod 152 shown in FIG. 3 in the axial direction of the plunger rod 152) to supply grease from the opening portion 131a of the greasing pipe 130 to the relevant portion C (see FIG. 9), while looking at a screen (image including the distal end portion 131 of the greasing pipe 130 and the surroundings of the distal end portion 131 (e.g., the relevant portion C)) displayed on the display unit 163 attached to the operation unit 162 held with the other hand (e.g., right hand). In the fifth step, when an appropriate amount of grease is supplied from the greasing unit 150 connected to the greasing pipe 130, an appropriate amount of grease is ejected from the distal end portion 131 of the greasing pipe 130 and applied to the pressing portion 21a. In this case, the greasing pipe 130 is filled with grease from the greasing unit 150 in advance. Therefore, greasing can be smoothly performed by operating the greasing unit 150 once the distal end portion 131 of the greasing pipe 130 is brought to a desired position.

When greasing in the fifth step is completed, the greasing pipe 130 is removed in a sixth step. In the sixth step, grease supply from the distal end portion 131 of the greasing pipe 130 is cut off with the first jig 110 still attached to the through hole 31. Thereafter, the second jig 120 is removed from the through hole 31, and the distal end portion 131 of the greasing pipe 130 is also removed from the through hole 31 to the outside of the clutch housing 30.

For example, the second jig 120 is removed from the insertion hole of the first jig 110. When removing the second jig 120 from the insertion hole of the first jig 110, the clearance between the insertion hole and the insertion portion 121 allows swinging the second jig 120 in the lateral direction. This can avoid adhesion of grease to portions and components other than the portion that needs greasing.

In the case where the above first to fifth steps have been performed for the first hole 113, the second to fifth steps are performed for the second hole 114 with the first jig 110 kept attached to the through hole 31. Greasing can thus be performed on both arms of the bifurcated pressing portion 21a.

The second and third steps may be omitted when there is no obstacle up to the portion that needs greasing inside the clutch housing 30. In this case, no scribing line is necessary for the second jig 120, and the fourth step may be performed after the first step. Namely, the insertion portion 121 of the second jig 120 may be continuously inserted into the insertion hole of the first jig 110 until the stopper portion 122 abuts on the first jig 110.

As described above, with the greasing device 100 of the first embodiment, it is possible to grease the pressing portion 21a of the clutch release fork 21 without removing the clutch housing 30 (or a manual transmission unit that includes the clutch housing 30) from the vehicle. This facilitates the greasing maintenance work and improves workability.

Figure 12A:
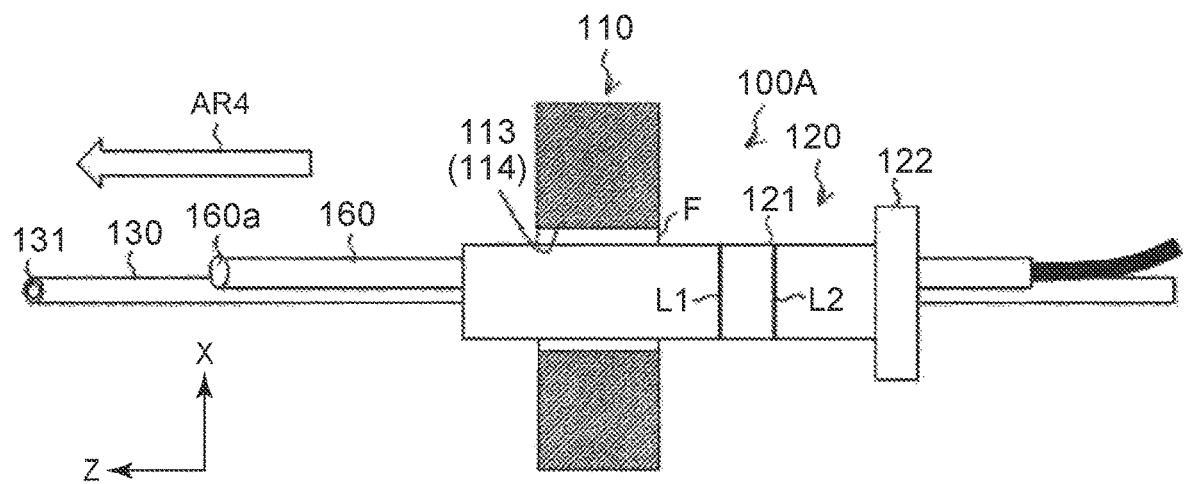
FIG. 12A is a schematic view of an insertion amount grasping device of a second embodiment of the present disclosure.
Figure 12B:
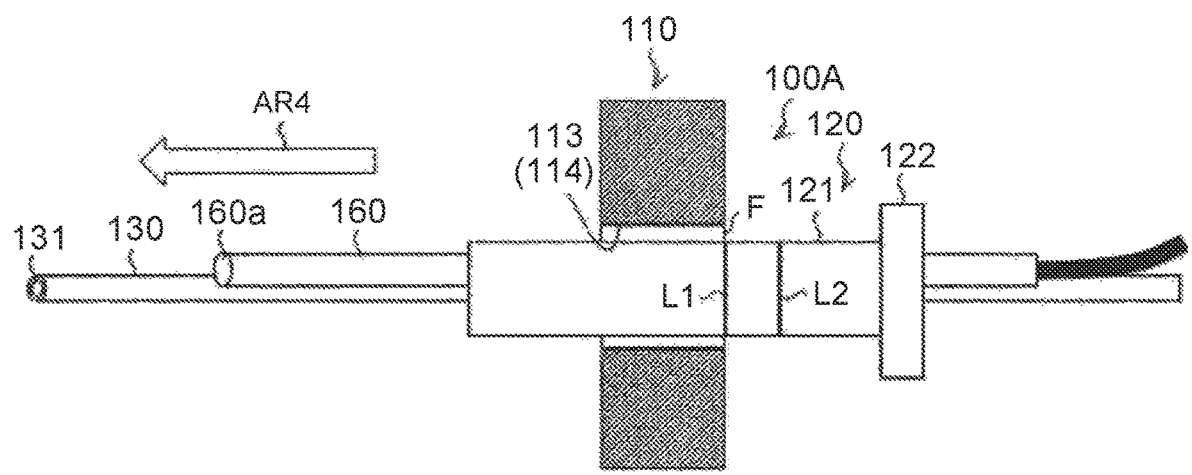
FIG. 12B is a schematic view of the insertion amount grasping device of the second embodiment.
Figure 12C:
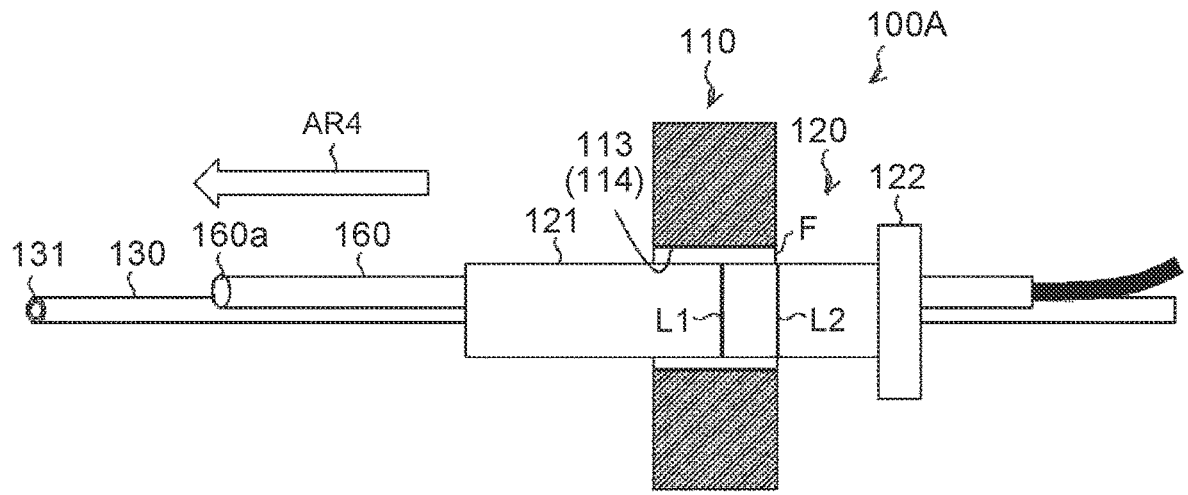
FIG. 12C is a schematic view of the insertion amount grasping device of the second embodiment.

Next, an insertion amount grasping device 100A of a second embodiment (reference example) will be described. FIGS. 12A to 12C are schematic views of the insertion amount grasping device 100A of the second embodiment. FIGS. 12A to 12C sequentially illustrate in this order how the second jig 120 is inserted into the first jig 110.

The insertion amount grasping device 100A is a device that allows visually grasping the amount by which the second jig 120 needs to be inserted into the first jig 110 in order for the distal end portion 131 of the greasing pipe 130 to reach a position P1 (see FIG. 9) near the relevant portion C or a position P2 (see FIG. 9) a predetermined distance before the relevant portion C (hereinafter this amount will be sometimes referred to as the "required insertion amount") from the outside of the clutch housing 30.

The insertion amount grasping device 100A is configured similarly to the greasing device 100 of the first embodiment, but is different from the greasing device 100 of the first embodiment in that the insertion portion 121 of the second jig 120 has a first scribing line L1 and a second scribing line L2.

The differences from the first embodiment will be mainly described below. The same configurations as those of the first embodiment are denoted with the same signs, and description thereof will be omitted as appropriate. In the following description, it is assumed that the first jig 110 has been positioned with respect to the clutch housing 30 in the X, Y, and Z directions and fixed to the clutch housing 30 (portion of the clutch housing 30 around the through hole 31), as described in the first embodiment.

The first jig 110 and the second jig 120 may be made of either a resin or metal.

As shown in FIG. 12A, the insertion portion 121 of the second jig 120 is inserted into the first hole 113 (or the second hole 114) of the first jig 110 and is moved in the direction of the arrow AR4 toward the relevant portion C (see FIG. 9) by the operator holding the second jig 120. By the operation of moving the second jig 120 toward the relevant portion C, the distal end portion 131 of the greasing pipe 130 reaches the position P2 (see FIG. 9) that is a predetermined distance before the relevant portion C, and eventually the position P1 (see FIG. 9) near the relevant portion C.

As shown in FIG. 12A, the insertion portion 121 of the second jig 120 has the first scribing line L1 and the second scribing line L2 in order to allow visually grasping the required insertion amounts of the second jig 120 into the first jig 110 for the distal end portion 131 of the greasing pipe 130 to reach the position P2 (see FIG. 9) that is a predetermined distance before the relevant portion C and the position P1 (see FIG. 9) near the relevant portion C. The insertion portion 121 of the second jig 120 may have indications such as lines drawn with a marker pen or sticker, instead of the scribing lines L1, L2.

The first scribing line L1 is located at such a position that the first scribing line L1 reaches the first jig 110 (e.g., a guide flange F of the first jig 110) (e.g., the first scribing line L1 is aligned with the guide flange F) (see FIG. 12B) when the distal end portion 131 of the greasing pipe 130 reaches the position P2 (see FIG. 9) that is a predetermined distance before the relevant portion C (when the distal end portion 131 of the greasing pipe 130 and the relevant portion C have a predetermined positional relationship).

Therefore, by visually checking the positional relationship between the first scribing line L1 and the first jig 110 (e.g., the guide flange F of the first jig 110) from the outside of the clutch housing 30, the operator can grasp the required insertion amount of the second jig 120 into the first jig 110 for the distal end portion 131 of the greasing pipe 130 to reach the position P2 (see FIG. 9) that is a predetermined distance before the relevant portion C.

The second scribing line L2 is located at such a position that the second scribing line L2 reaches the first jig 110 (e.g., the guide flange F of the first jig 110) (e.g., the second scribing line L2 is aligned with the guide flange F) (see FIG. 12C) when the distal end portion 131 of the greasing pipe 130 reaches the position P1 (see FIG. 9) near the relevant portion C (when the distal end portion 131 of the greasing pipe 130 and the relevant portion C have a predetermined positional relationship).

Therefore, by visually checking the positional relationship between the second scribing line L2 and the first jig 110 (e.g., the guide flange F of the first jig 110) from the outside of the clutch housing 30, the operator can grasp the required insertion amount of the second jig 120 into the first jig 110 for the distal end portion 131 of the greasing pipe 130 to reach the position P1 (see FIG. 9) near the relevant portion C.

The scribing line L1 may be omitted.

As described above, according to the second embodiment, it is possible to visually grasp, from the outside of the clutch housing 30, the required insertion amount of the second jig 120 into the first jig 110 for the distal end portion 131 of the greasing pipe 130 to reach the position P1 (see FIG. 9) near the relevant portion C or the position P2 (see FIG. 9) that is a predetermined distance before the relevant portion C.

The second embodiment has the following advantage. The required insertion amount (stroke) for the distal end portion 131 of the greasing pipe 130 to reach near the relevant portion C is sometimes different depending on the vehicle model (i.e., depending on the manual transmission unit). In this case, for each of vehicle models (manual transmission units) with different required insertion amounts, an indication (e.g., a scribing line or a line drawn with a marker pen or sticker) that reaches the first jig 110 (e.g., the guide flange F of the first jig 110) when the distal end portion 131 of the greasing pipe 130 reaches near the relevant portion C is provided on the insertion portion 121 of the second jig 120. Greasing can thus be performed using a single first jig 110 for a plurality of vehicle models (a plurality of manual transmission units) with different required insertion amounts. That is, it is not necessary to prepare the first jig 110 for each vehicle model (each manual transmission unit). This can reduce an increase in number of types of first jigs 110 and therefore can reduce an increase in investment (cost).

Next, an insertion amount grasping device 100B of a third embodiment (reference example) will be described.

Figure 13A:
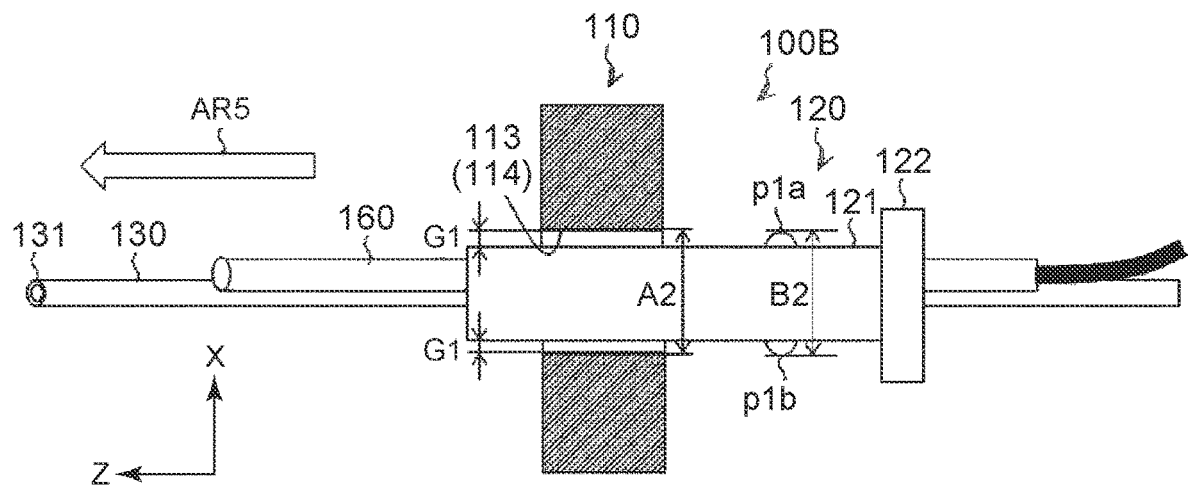
FIG. 13A is a schematic view of an insertion amount grasping device of a third embodiment of the present disclosure.
Figure 13B:
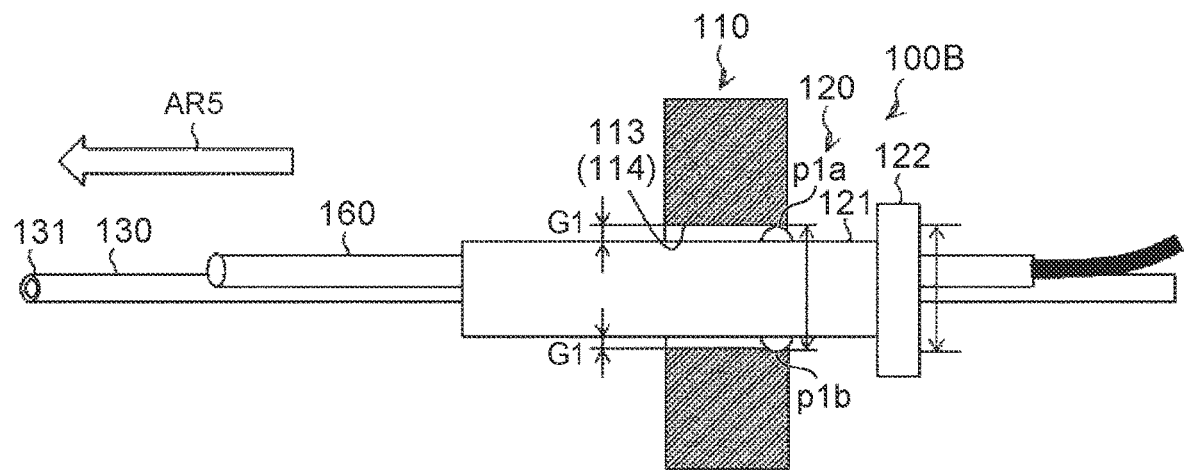
FIG. 13B is a schematic view of the insertion amount grasping device of the third embodiment.

FIGS. 13A and 13B are schematic views of the insertion amount grasping device 100B of the third embodiment. FIGS. 13A and 13B sequentially illustrate in this order how the second jig 120 is inserted into the first jig 110.

The insertion amount grasping device 100B is a device that allows grasping, through hand feeling (sensation of a hand holding the second jig 120) rather than visually, that the distal end portion 131 of the greasing pipe 130 has reached the position P1 (see FIG. 9) near the relevant portion C (the distal end portion 131 of the greasing pipe 130 and the relevant portion C have a predetermined positional relationship).

The insertion amount grasping device 100B is configured similarly to the greasing device 100 of the first embodiment, but is different from the greasing device 100 of the first embodiment in that the insertion portion 121 of the second jig 120 is provided with first protruding portions p1a, p1b.

The differences from the first embodiment will be mainly described below. The same configurations as those of the first embodiment are denoted with the same signs, and description thereof will be omitted as appropriate. In the following description, it is assumed that the first jig 110 has been positioned with respect to the clutch housing 30 in the X, Y, and Z directions and fixed to the clutch housing 30 (portion of the clutch housing 30 around the through hole 31), as described in the first embodiment.

Either or both of the first jig 110 and the second jig 120 is made of a resin. When one of the first jig 110 and the second jig 120 is made of a resin, the other jig may be made of either a resin or metal.

As shown in FIG. 13A, the insertion portion 121 of the second jig 120 is inserted into the first hole 113 (or the second hole 114) of the first jig 110 and is moved in the direction of the arrow AR5 toward the relevant portion C (see FIG. 9) by the operator holding the second jig 120. By the operation of moving the second jig 120 toward the relevant portion C, the distal end portion 131 of the greasing pipe 130 eventually reaches the position P1 (see FIG. 9) near the relevant portion C.

The insertion portion 121 of the second jig 120 is provided with the first protruding portions p1a, p1b in order to allow grasping, through hand feeling (sensation of a hand holding the second jig 120) rather than visually, that the distal end portion 131 of the greasing pipe 130 has reached the position P1 (see FIG. 9) near the relevant portion C (the distal end portion 131 of the greasing pipe 130 and the relevant portion C have a predetermined positional relationship).

The first protruding portions p1a, p1b are, for example, hemispherical protruding portions. The first protruding portions p1a, p1b are not limited to the hemispherical protruding portions, and may be protruding portions in other shapes.

The first protruding portions p1a, p1b are provided at such a position that the first protruding portions p1a, p1b are inserted into the first hole 113 (or the second hole 114) (see FIG. 13B) and cause friction (friction force) with the first hole 113 (or the second hole 114) when the distal end portion 131 of the greasing pipe 130 reaches the position P1 (see FIG. 9) near the relevant portion C as a result of the operation of moving the second jig 120 toward the relevant portion C.

In order to cause such friction, as shown in FIG. 13A, a diameter A2 (design dimension) of the first hole 113 (and the second hole 114) and a thickness B2 (design dimension) of the insertion portion 121 of the second jig 120, including the first protruding portions p1a, p1b, are set to have a relationship of A2<B2.

This configuration allows the operator to grasp, through hand feeling (sensation of a hand holding the second jig 120) rather than visually, that the distal end portion 131 of the greasing pipe 130 has reached the position P1 (see FIG. 9) near the relevant portion C (the above friction has occurred) as a result of the operation of moving the second jig 120 toward the relevant portion C.

As described above, according to the third embodiment, it is possible to grasp, through hand feeling (sensation of a hand holding the second jig 120) rather than visually, that the distal end portion 131 of the greasing pipe 130 has reached the position P1 (see FIG. 9) near the relevant portion C (the distal end portion 131 of the greasing pipe 130 and the relevant portion C have a predetermined positional relationship).

This is because of the presence of the first protruding portions p1a, p1b that are inserted into the first hole 113 (or the second hole 114) (see FIG. 13B) and cause friction (friction force) with the first hole 113 (or the second hole 114) when the distal end portion 131 of the greasing pipe 130 reaches the position P1 (see FIG. 9) near the relevant portion C (when the distal end portion 131 of the greasing pipe 130 and the relevant portion C have a predetermined positional relationship) as a result of the operation of moving the second jig 120 toward the relevant portion C.

This configuration allows the operator to focus on the operation of moving the second jig 120 (insertion portion 121) held with his or her one hand (e.g., left hand) in the direction of the arrow AR5 toward the relevant portion C so that the distal end portion 131 of the greasing pipe 130 reaches the position P1 (see FIG. 9) near the relevant portion C, while looking at a screen (image including the distal end portion 131 of the greasing pipe 130 and the surroundings of the distal end portion 131 (e.g., the relevant portion C)) displayed on the display unit 163 attached to the operation unit 162 held with the other hand (e.g., right hand).

The third embodiment has the following advantage. As described above, when the first protruding portions p1a, p1b are inserted into the first hole 113 (or the second hole 114), the second jig 120 is fixed to the first jig 110 by the friction caused between the first protruding portions p1a, p1b and the inner wall of the first hole 113 (or the second hole 114). The gap G1 (clearance) between the insertion portion 121 of the second jig 120 inserted into the first hole 113 (or the second hole 114) and the inner wall of the first hole 113 (or the second hole 114) is about 0.5 mm.

Therefore, when the above friction is caused, the position of the distal end portion 131 of the greasing pipe 130 with respect to the relevant portion C will not change (hardly change) even if the operator releases the second jig 120 from his or her hand.

Accordingly, when the above friction is caused, that is, when the distal end portion 131 of the greasing pipe 130 reaches the position P1 (see FIG. 9) near the relevant portion C, the operator releases the second jig 120 from his or her one hand (e.g., left hand), holds the greasing unit 150 with that hand (e.g., left hand), and operates the greasing unit 150 (e.g., pushes the plunger rod 152 shown in FIG. 3 in the axial direction of the plunger rod 152). Grease can thus be supplied from the opening portion 131a of the greasing pipe 130 to the relevant portion C. That is, a single operator can perform the operation of moving the second jig 120 toward the relevant portion C and the subsequent operation of supplying grease from the opening portion 131a of the greasing pipe 130 to the relevant portion C. This improves work efficiency.

Next, an insertion amount grasping device 100C of a fourth embodiment (reference example) will be described.

Figure 14A:
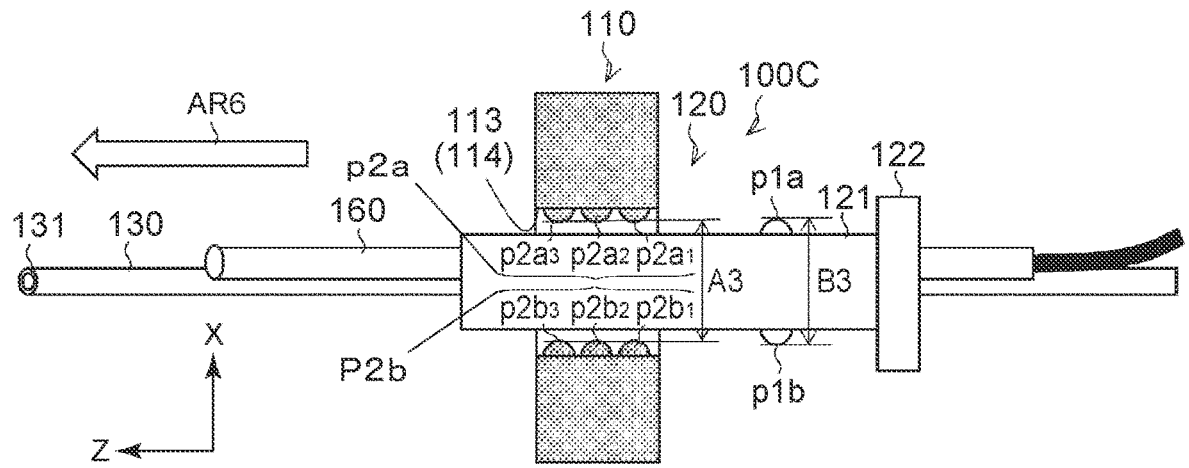
FIG. 14A is a schematic view of an insertion amount grasping device of a fourth embodiment of the present disclosure.
Figure 14B:
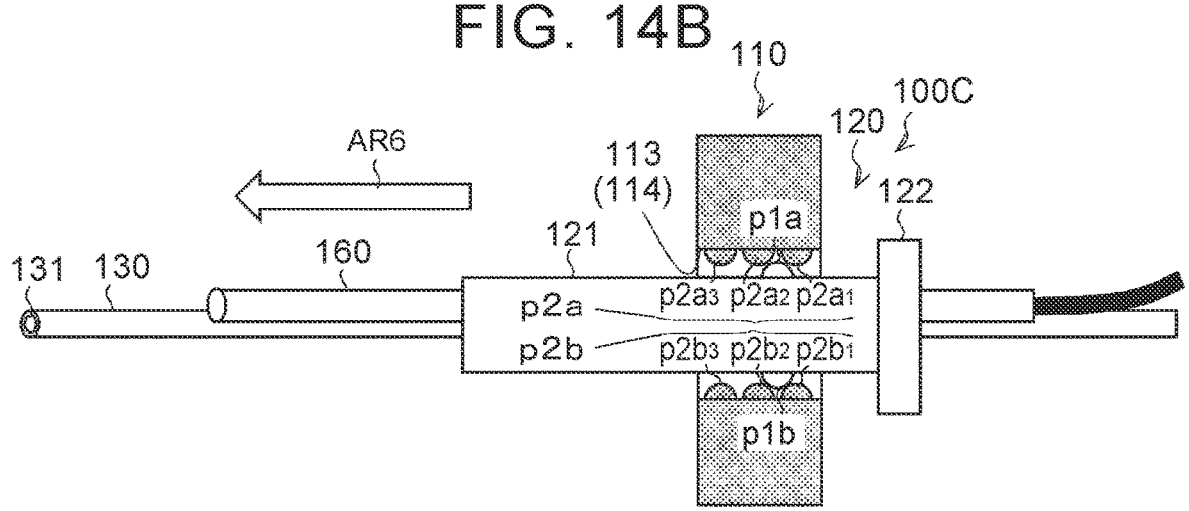
FIG. 14B is a schematic view of the insertion amount grasping device of the fourth embodiment.
Figure 14C:
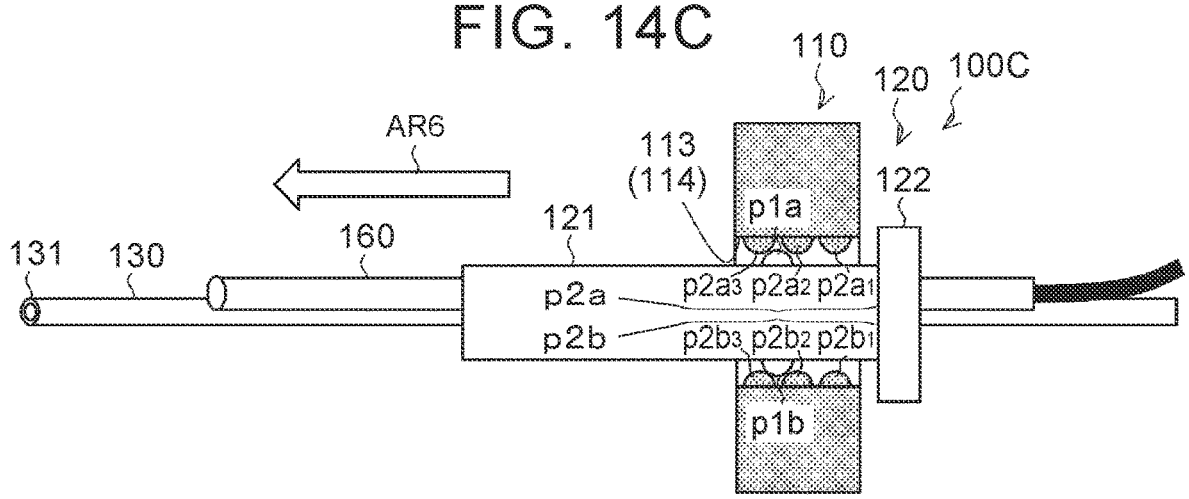
FIG. 14C is a schematic view of the insertion amount grasping device of the fourth embodiment.

FIGS. 14A to 14C are schematic views of the insertion amount grasping device 100C of the fourth embodiment. FIGS. 14A to 14C sequentially illustrate in this order how the second jig 120 is inserted into the first jig 110.

The insertion amount grasping device 100C is a device that allows grasping, through hand feeling (sensation of a hand holding the second jig 120) rather than visually, that the distal end portion 131 of the greasing pipe 130 has reached the position P2 (see FIG. 9) that is a predetermined distance before the relevant portion C or the position P1 (see FIG. 9) near the relevant portion C (the distal end portion 131 of the greasing pipe 130 and the relevant portion C have a predetermined positional relationship).

The insertion amount grasping device 100C is configured similarly to the insertion amount grasping device 100 of the first embodiment, but is different from the insertion amount grasping device 100 of the first embodiment in that the insertion portion 121 of the second jig 120 is provided with first protruding portions p1a, p1b and that the inner wall of the first hole 113 (and the second hole 114) of the first jig 110 is provided with second protruding portions p2a (p2$a_1$, p2$a_2$, and p2$a_3$), p2b (p2$b_1$, p2$b_2$, and p2$b_3$).

The differences from the first embodiment will be mainly described below. The same configurations as those of the first embodiment are denoted with the same signs, and description thereof will be omitted as appropriate. In the following description, it is assumed that the first jig 110 has been positioned with respect to the clutch housing 30 in the X, Y, and Z directions and fixed to the clutch housing 30 (portion of the clutch housing 30 around the through hole 31), as described in the first embodiment.

Either or both of the first jig 110 and the second jig 120 is made of a resin. When one of the first jig 110 and the second jig 120 is made of a resin, the other jig may be made of either a resin or metal.

As shown in FIG. 14A, the insertion portion 121 of the second jig 120 is inserted into the first hole 113 (or the second hole 114) of the first jig 110 and is moved in the direction of the arrow AR6 toward the relevant portion C (see FIG. 9) by the operator holding the second jig 120. By the operation of moving the second jig 120 toward the relevant portion C, the distal end portion 131 of the greasing pipe 130 reaches the position P2 (see FIG. 9) that is a predetermined distance before the relevant portion C, and eventually the position P1 (see FIG. 9) near the relevant portion C.

The insertion portion 121 of the second jig 120 is provided with the first protruding portions p1a, p1b in order to allow grasping, through hand feeling (sensation of a hand holding the second jig 120) rather than visually, that the distal end portion 131 of the greasing pipe 130 has reached the position P2 (see FIG. 9) that is a predetermined distance before the relevant portion C and the position P1 (see FIG. 9) near the relevant portion C (the distal end portion 131 of the greasing pipe 130 and the relevant portion C have a predetermined positional relationship). The inner wall of the first hole 113 (and the second hole 114) of the first jig 110 is provided with the second protruding portions p2a (p2$a_1$, p2$a_2$, and p2$a_3$), p2b (p2$b_1$, p2$b_2$, and p2$b_3$).

The first protruding portions p1a, p1b and the second protruding portions p2a (p2$a_1$, p2$a_2$, and p2$a_3$), p2b (p2$b_1$, p2$b_2$, and p2$b_3$) are, for example, hemispherical protruding portions. The first protruding portions p1a, p1b and the second protruding portions p2a (p2$a_1$, p2$a_2$, and p2$a_3$), p2b (p2$b_1$, p2$b_2$, and p2$b_3$) are not limited to the hemispherical protruding portions, and may be protruding portions in other shapes.

The first protruding portions p1a, p1b are provided at such a position that the first protruding portions p1a, p1b are inserted into the first hole 113 (or the second hole 114) (see FIGS. 14B, 14C) when the distal end portion 131 of the greasing pipe 130 reaches the position P2 (see FIG. 9) that is a predetermined distance before the relevant portion C and the position P1 (see FIG. 9) near the relevant portion C as a result of the operation of moving the second jig 120 toward the relevant portion C.

The second protruding portions p2a (p2$a_1$, p2$a_2$, and p2$a_3$), p2b (p2$b_1$, p2b2, and p2$b_3$) are arranged in line in the insertion direction of the second jig 120 (see the arrow AR6 in FIGS. 14A to 14C).

The first protruding portions p1a, p1b pass the second protruding portions p2a (p2$a_1$, p2$a_2$, and p2$a_3$), p2b (p2$b_1$, p2$b_2$, and p2$b_3$) while causing friction with the second protruding portions p2a (p2$a_1$, p2$a_2$, and p2$a_3$), p2b (p2$b_1$, p2$b_2$, and p2$b_3$) by the operation of moving the second jig 120 toward the relevant portion C.

In order to cause such friction, as shown in FIG. 14A, a diameter A3 (design dimension) of the first hole 113 (and the second hole 114), including the second protruding portions p2a (p2a$_1$, p2a$_2$, and p2a$_3$), p2b (p2b$_1$, p2b$_2$, and p2b$_3$), and a thickness B3 (design dimension) of the insertion portion 121 of the second jig 120, including the first protruding portions p1a, p1b, are set to have a relationship of A3<B3.

This configuration allows the operator to grasp, through hand feeling (sensation of a hand holding the second jig 120) rather than visually, that the distal end portion 131 of the greasing pipe 130 has reached the position P2 (see FIG. 9) that is a predetermined distance before the relevant portion C and the position P1 (see FIG. 9) near the relevant portion C (the above friction has occurred) as a result of the operation of moving the second jig 120 toward the relevant portion C. For example, when the first protruding portions p1a, p1b pass the second protruding portions p2a$_1$, p2b$_1$ while abutting on (or press-contacting) the second protruding portions p2a$_1$, p2b$_1$ by the operation of moving the second jig 120 toward the relevant portion C, the operator can grasp, through hand feeling (sensation of a hand holding the second jig 120) rather than visually, that the distal end portion 131 of the greasing pipe 130 has reached the position P2 (see FIG. 9) that is a predetermined distance before the relevant portion C (the above friction has occurred). In addition, when the first protruding portions p1a, p1b pass the second protruding portions p2a$_2$, p2b$_2$ while abutting on (or press-contacting) the second protruding portions p2a$_2$, p2b$_2$ by the operation of further moving the second jig 120 toward the relevant portion C, the operator can grasp, through hand feeling (sensation of a hand holding the second jig 120) rather than visually, that the distal end portion 131 of the greasing pipe 130 has reached the position P1 (see FIG. 9) near the relevant portion C (the above friction has occurred).

As described above, according to the fourth embodiment, it is possible to grasp, through hand feeling (sensation of a hand holding the second jig 120) rather than visually, that the distal end portion 131 of the greasing pipe 130 has reached the position P2 (see FIG. 9) that is a predetermined distance before the relevant portion C and further the position P1 (see FIG. 9) near the relevant portion C (the distal end portion 131 of the greasing pipe 130 and the relevant portion C have a predetermined positional relationship).

This is because of the presence of the first protruding portions p1a, p1b and the second protruding portions p2a (p2a$_1$, p2a$_2$, and p2a$_3$), p2b (p2b$_1$, p2b$_2$, and p2b$_3$) that cause friction (friction force) when the distal end portion 131 of the greasing pipe 130 reaches the position P2 (see FIG. 9) that is the predetermined distance before the relevant portion C and the position P1 (see FIG. 9) near the relevant portion C (when the distal end portion 131 of the greasing pipe 130 and the relevant portion C have a predetermined positional relationship) as a result of the operation of moving the second jig 120 toward the relevant portion C.

This configuration allows the operator to focus on the operation of moving the second jig 120 (insertion portion 121) held with his or her one hand (e.g., left hand) in the direction of the arrow AR6 toward the relevant portion C so that the distal end portion 131 of the greasing pipe 130 reaches the position P2 (see FIG. 9) that is a predetermined distance before the relevant portion C and the position P1 (see FIG. 9) near the relevant portion C, while looking at a screen (image including the distal end portion 131 of the greasing pipe 130 and the surroundings of the distal end portion 131 (e.g., the relevant portion C)) displayed on the display unit 163 attached to the operation unit 162 held with the other hand (e.g., right hand).

The fourth embodiment has the following advantage. As described above, the second jig 120 is fixed to the first jig 110 when the distal end portion 131 of the greasing pipe 130 reaches the position P1 (see FIG. 9) near the relevant portion C and the first protruding portions p1a, p1b are inserted into the first hole 113 (or the second hole 114) (see FIG. 14C). The gap (clearance) between the insertion portion 121 of the second jig 120 inserted into the first hole 113 (or the second hole 114) and the inner wall of the first hole 113 (or the second hole 114) is about 0.5 mm.

Therefore, once the distal end portion 131 of the greasing pipe 130 reaches the position P1 (see FIG. 9) near the relevant portion C and the first protruding portions p1a, p1b are inserted into the first hole 113 (or the second hole 114) (see FIG. 14C), the position of the distal end portion 131 of the greasing pipe 130 with respect to the relevant portion C will not change (hardly change) even if the operator releases the second jig 120 from his or her hand.

Accordingly, when the distal end portion 131 of the greasing pipe 130 reaches the position P1 (see FIG. 9) near the relevant portion C, the operator releases the second jig 120 from his or her one hand (e.g., left hand), holds the greasing unit 150 with that hand (e.g., left hand), and operates the greasing unit 150 (e.g., pushes the plunger rod 152 shown in FIG. 3 in the axial direction of the plunger rod 152). Grease can thus be supplied from the opening portion 131a of the greasing pipe 130 to the relevant portion C. That is, a single operator can perform the operation of moving the second jig 120 toward the relevant portion C and the subsequent operation of supplying grease from the opening portion 131a of the greasing pipe 130 to the relevant portion C. This improves work efficiency.

The fourth embodiment further has the following advantage. The required insertion amount (stroke) for the distal end portion 131 of the greasing pipe 130 to reach near the relevant portion C is sometimes different depending on the vehicle model (i.e., depending on the manual transmission unit). In this case, for each of vehicle models (manual transmission units) with different required insertion amounts, the second protruding portions p2a (p2a$_1$, p2a$_2$, and p2a$_3$), p2b (p2b$_1$, p2b$_2$, and p2b$_3$) are disposed so as to cause friction (friction force) when the distal end portion 131 of the greasing pipe 130 reaches near the relevant portion C. Greasing can thus be performed using a single first jig 110 for a plurality of vehicle models (a plurality of manual transmission units) with different required insertion amounts. That is, it is not necessary to prepare the first jig 110 for each vehicle model (each manual transmission unit). This can reduce an increase in number of types of first jigs 110 and therefore can reduce an increase in investment (cost).

Modifications will be described next.

Figure 15:
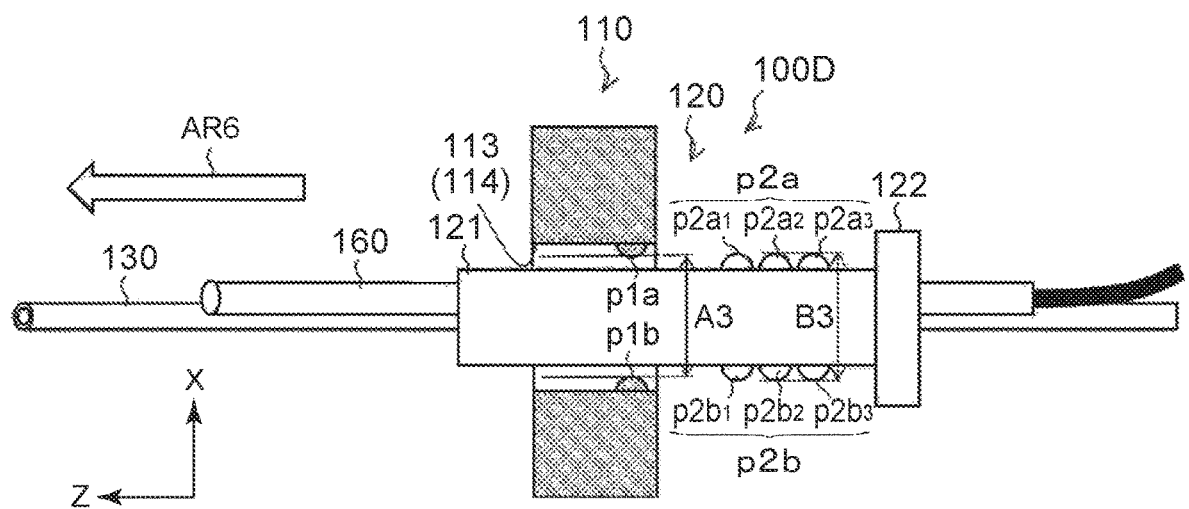
FIG. 15 is a schematic view of an insertion amount grasping device (modification) of the fourth embodiment.

FIG. 15 is a schematic view of an insertion amount grasping device (modification) of the fourth embodiment.

An example in which the insertion portion 121 of the second jig 120 is provided with the first protruding portions p1a, p1b and the inner wall of the first hole 113 (and the second hole 114) of the first jig 110 is provided with the second protruding portions p2a (p2a$_1$, p2a$_2$, and p2a$_3$), p2b (p2b$_1$, p2b$_2$, and p2b$_3$) as shown in FIG. 14A is described in the fourth embodiment. However, the present disclosure is not limited to this.

For example, as shown in FIG. 15, the insertion portion 121 of the second jig 120 may be provided with the second protruding portions p2a (p2a$_1$, p2a$_2$, and p2a$_3$), p2b (p2b$_1$, p2$b_2$, and p2$b_3$), and the inner wall of the first hole 113 (and the second hole 114) of the first jig 110 may be provided with the first protruding portions p1a, p1b.

Although an example in which three second protruding portions p2a (p2$a_1$, p2$a_2$, and p2$a_3$), p2b (p2$b_1$, p2$b_2$, and p2$b_3$) are provided on each side is described in the fourth embodiment, the present disclosure is not limited to this. For example, four or more second protruding portions p2a, p2b may be provided on each side.

Next, modifications of the first and fourth embodiments will be described.

Although an example in which the fluidic substance is grease is described in the first to fourth embodiments, the present disclosure is not limited to this. For example, the fluidic substance may be fluid. In this case, the relevant portion C is a portion that needs to be supplied with the fluid. The fluidic substance may be a fluidic substance other than grease and fluid.

Although an example in which the insertion portion 121 of the second jig 120 is provided with the first protruding portions p1a, p1b is described in the third and fourth embodiments, the present disclosure is not limited to this. For example, in the case where the second jig 120 is omitted, the greasing pipe 130 may be provided with the first protruding portions p1a, p1b.

Although an example in which the second jig 120 is provided with the greasing pipe 130 is described in the first to fourth embodiments, the present disclosure is not limited to this. For example, the greasing pipe 130 may be omitted. This allows performing a narrow space inspection using the endoscope 160. In this case, the relevant portion C is a portion that needs a narrow space inspection. Although an example in which the second jig 120 is provided with the endoscope 160 is described in the first to fourth embodiments, the present disclosure is not limited to this. For example, the endoscope 160 may be omitted.

Although an example in which the insertion amount grasping device of the present disclosure is applied to the vehicle field (maintenance with grease ejection for clutch release mechanisms) is described in the first to fourth embodiments, the present disclosure is not limited to this. For example, the insertion amount grasping device of the present disclosure may be applied to various fields other than the vehicle field, such as the medical field. Although an example in which the fixing mating member is the clutch housing 30 (portion of the clutch housing 30 around the through hole 31) is described in the first to fourth embodiments, the present disclosure is not limited to this. That is, the fixing mating member may be a fixing mating member suitable for the field to which the insertion amount grasping device of the present disclosure is applied. Similarly, although an example in which the cover member is the clutch housing 30 is described in the first to fourth embodiments, the present disclosure is not limited to this. That is, the cover member may be a cover member suitable for the field to which the insertion amount grasping device of the present disclosure is applied.

Next, an ejection device of a fifth embodiment (reference example) will be described.

Figure 16:
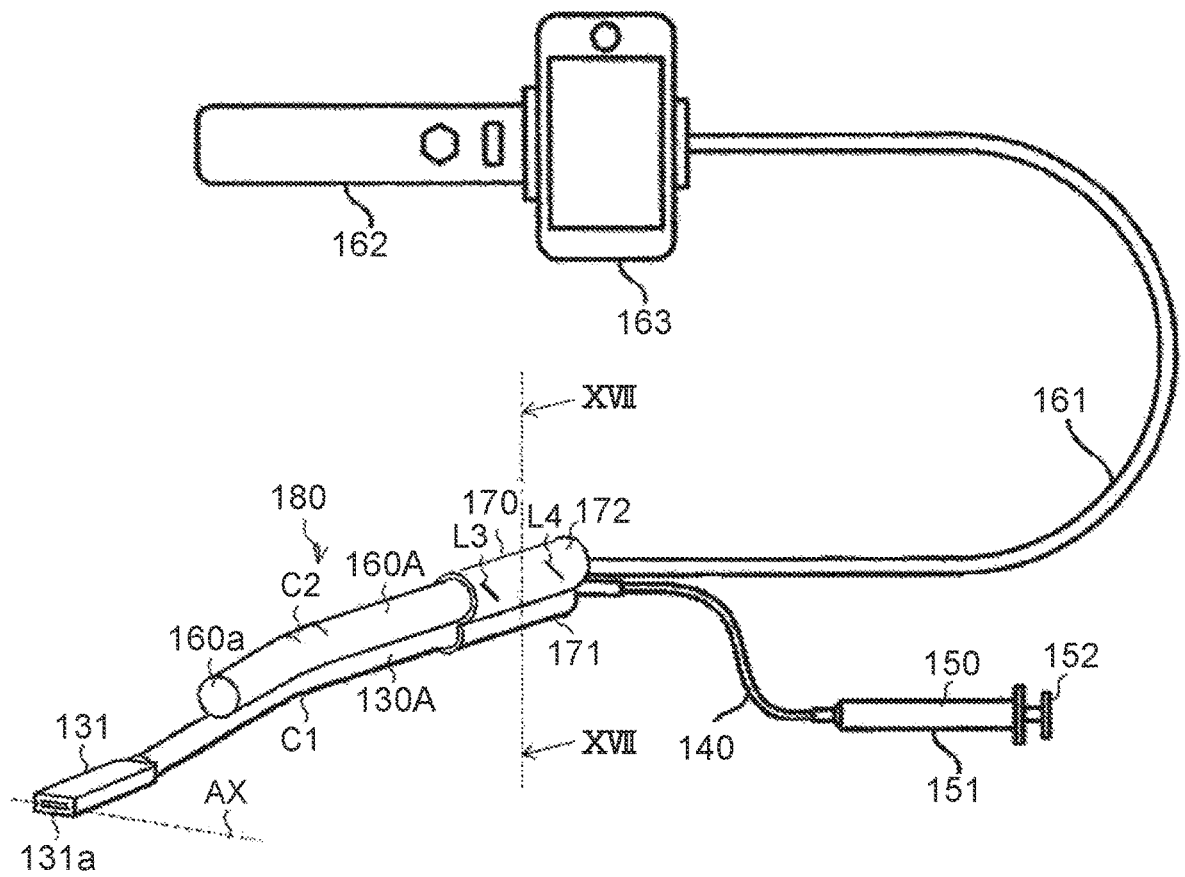
FIG. 16 shows a configuration of an ejection device of a fifth embodiment of the present disclosure.

FIG. 16 shows a configuration of an ejection device.

The ejection device of the fifth embodiment is mainly different from the first embodiment in that the ejection device does not include the first jig 110 and the second jig 120 and in that the ejection device includes a holding member 170. The differences from the first embodiment will be mainly described below. Configurations similar to those of the first embodiment are denoted with the same signs, and description thereof will be omitted as appropriate.

Figure 22:
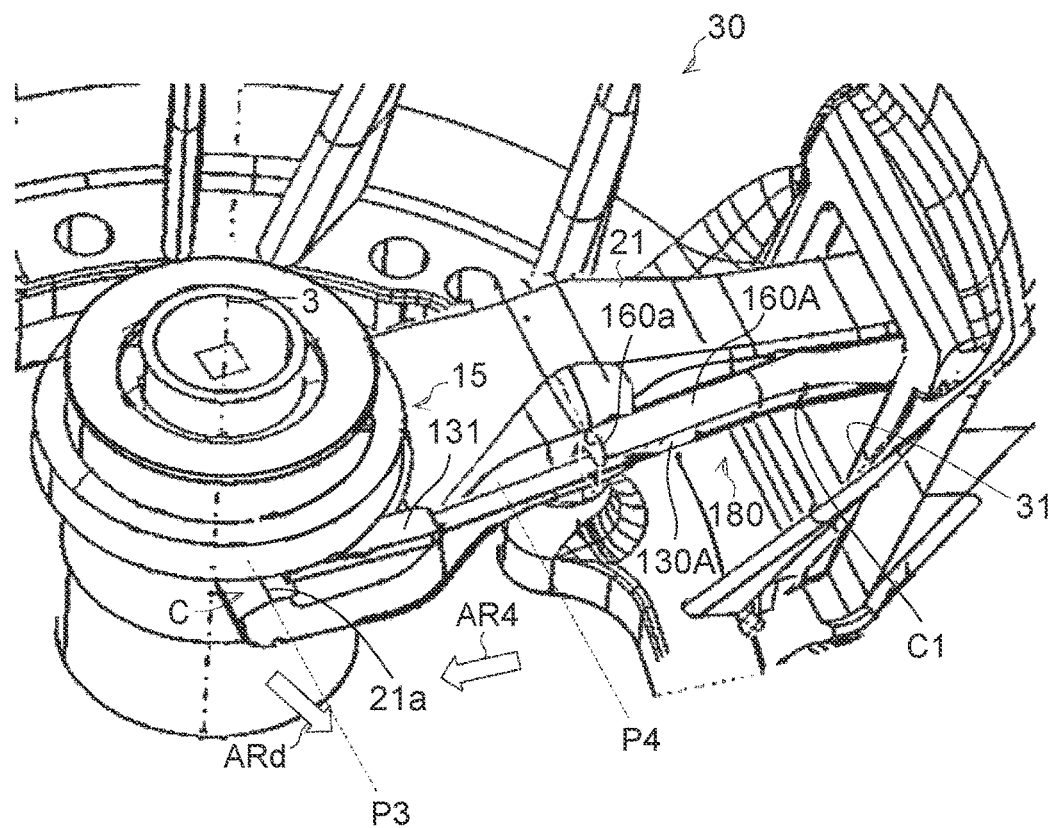
FIG. 22 shows a greasing pipe extending toward the relevant portion located on the side closer to the viewer of FIG. 22 with the insertion portion inserted through the through hole of the clutch housing in the ejection device of the fifth embodiment.

Like the first embodiment, the ejection device of the fifth embodiment includes an insertion portion 180 (see FIG. 16) that is held by the operator and inserted toward the relevant portion C in a narrow space. The insertion portion 180 includes a greasing pipe 130A, an endoscope 160A, and a holding member 170. Hereinafter, as in the first embodiment, an example in which the narrow space is a portion between the clutch release fork 21 (pressing portion 21a) and the release bearing 15, namely a portion that needs greasing (portion that needs to be supplied with grease from the distal end portion 131 of the greasing pipe 130A), will be described. One end of the clutch release fork 21 is formed by the pressing portion 21a that presses the release bearing 15 in the axial direction (see FIG. 22). The pressing portion 21a has a bifurcated structure. Namely, the pressing portion 21a is bifurcated on its distal end side so as to hold the input shaft 3 between the arms of the bifurcation inside the clutch housing 30. The relevant portion C on the side closer to the viewer of FIG. 22 is shown FIG. 22. However, the relevant portion C on the side farther from the viewer of FIG. 22 is located behind the release bearing 15 in FIG. 22, and is not shown in FIG. 22. Hereinafter, the relevant portion C on the side closer to the viewer of FIG. 22 is also referred to as the "one relevant portion C," and the relevant portion C on the side farther from the viewer of FIG. 22 is also referred to as the "other relevant portion C."

Like the greasing pipe 130 of the first embodiment, the greasing pipe 130A is a long ejection unit including the distal end portion 131 from which grease is ejected. The greasing pipe 130A is made of metal. In order to make it easier to insert the distal end portion 131 of the greasing pipe 130A between the clutch release fork 21 (pressing portion 21a) and the release bearing 15, namely to a portion that needs greasing, the distal end portion 131 of the greasing pipe 130A is in the shape of a rectangular prism having a laterally long rectangular section (see FIG. 16). The greasing pipe 130A other than the distal end portion 131 has a cylindrical shape. The greasing pipe 130A, including the distal end portion 131, may have a cylindrical shape.

The layout of the internal structure of the clutch housing 30 is sometimes different depending on the vehicle model (i.e., depending on the manual transmission unit). Depending on the layout of the internal structure of the clutch housing 30, an insertion path of the insertion portion 180 (greasing pipe 130A and endoscope 160A) from the through hole 31 of the clutch housing 30 toward the relevant portion C is sometimes linear and sometimes includes one or more bends.

In the latter case, if the greasing pipe 130A extends linearly like the greasing pipe 130 of the first embodiment, it is difficult to move the insertion portion 180 (greasing pipe 130A and endoscope 160A) toward the relevant portion C because the insertion portion 180 (greasing pipe 130A and endoscope 160A) interferes with an obstacle inside the clutch housing 30.

Therefore, in the fifth embodiment, the greasing pipe 130A is bent at a position C1 between its proximal and distal end portions in case the insertion path of the insertion portion 180 (greasing pipe 130A and endoscope 160A) includes a bend(s). With this configuration, the insertion portion 180 (greasing pipe 130A and endoscope 160A) can be relatively easily moved toward the relevant portion C even when the insertion path of the insertion portion 180 (greasing pipe 130A and endoscope 160A) includes a bend(s). Depending on the insertion path of the insertion portion 180 (greasing pipe 130A and endoscope 160A), the greasing pipe 130A may be bent at a plurality of positions between its proximal and distal end portions 131.

The distal end portion 131 (distal end face) of the greasing pipe 130A has an opening portion 131a from which grease supplied through the cylindrical pipe portion of the greasing pipe 130A is ejected. The flexible tube 140 is connected to the proximal end side of the greasing pipe 130A. The greasing pipe 130A is connected to the greasing unit 150 via the flexible tube 140.

The endoscope 160A is a long imaging device that includes, in the distal end portion 160a, an imaging unit that captures an image including the distal end portion 131 of the greasing pipe 130A and the surroundings of the distal end portion 131 (e.g., the relevant portion C). The endoscope 160A has a cylindrical shape with a diameter larger than that of the greasing pipe 130A, and is bent at a position C2 between its proximal and distal end portions 160a at the same angle as the greasing pipe 130A. As with the greasing pipe 130A, depending on the insertion path of the insertion portion 180 (greasing pipe 130A and endoscope 160A), the endoscope 160A may be bent at a plurality of positions between its proximal and distal end portions 160a.

The proximal end side of the endoscope 160A is connected to the operation unit 162 via the cable 161. The internal structure of the clutch housing 30 can be imaged with the endoscope 160A by operating the operation unit 162. An image captured by the endoscope 160A (e.g., an image including the distal end portion 131 of the greasing pipe 130A and the surroundings of the distal end portion 131 (e.g., the relevant portion C)) can be displayed on the display unit 163 attached to the operation unit 162.

Next, the holding member 170 will be described.

As shown in FIG. 16, the holding member 170 holds the greasing pipe 130A and the endoscope 160A such that the greasing pipe 130A and the endoscope 160A are arranged next to each other in parallel.

Figure 17:
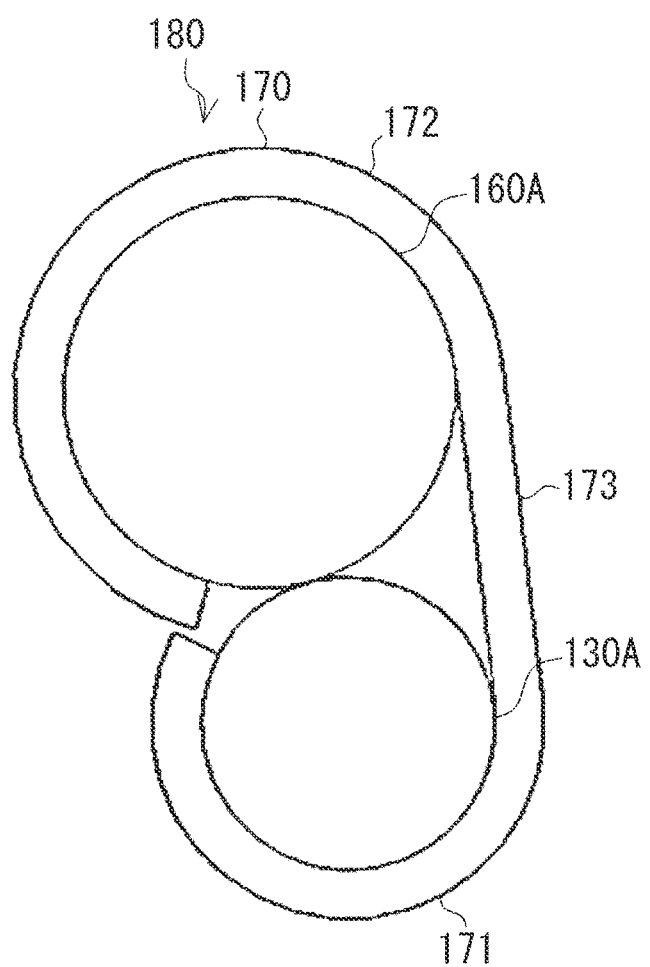
FIG. 17 is a sectional view taken along line XVII-XVII in FIG. 16.
Figure 18:
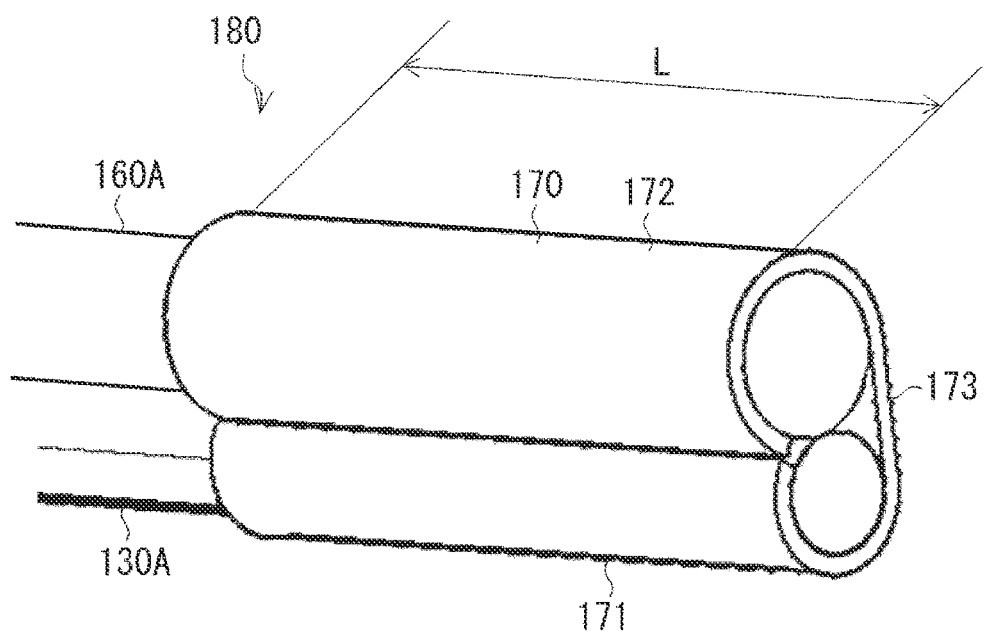
FIG. 18 is a perspective view of a holding member shown in FIG. 16.

FIG. 17 is a sectional view taken along line XVII-XVII in FIG. 16, and FIG. 18 is a perspective view of the holding member 170.

As shown in FIGS. 17 and 18, the holding member 170 includes an ejection unit insertion portion 171 into which the greasing pipe 130A (cylindrical portion on the proximal end portion side) is press-fitted, an imaging unit insertion portion 172 into which the endoscope 160A (cylindrical portion on the proximal end portion side) is press-fitted, and a first connection portion 173 connecting the ejection unit insertion portion 171 and the imaging unit insertion portion 172.

The ejection unit insertion portion 171 is a first semi-cylindrical portion into which the greasing pipe 130A (cylindrical portion on the proximal end portion side) is press-fitted. The imaging unit insertion portion 172 is a second semi-cylindrical portion into which the endoscope 160A (cylindrical portion on the proximal end portion side) is press-fitted. The first connection portion 173 is a flat portion connecting one end of the first semi-cylindrical portion (ejection unit insertion portion 171) and one end of the second semi-cylindrical portion (imaging unit insertion portion 172). Hereinafter, the first connection portion 173 is sometimes referred to as the "flat portion 173." This flat portion (first connection portion 173) extends in the tangential direction to the first semi-cylindrical portion (ejection unit insertion portion 171) and the second semi-cylindrical portion (imaging unit insertion portion 172) (see FIG. 17).

The first semi-cylindrical portion (ejection unit insertion portion 171) is in such a form that one end of a plate is rolled into a semi-cylindrical shape. Similarly, the second semi-cylindrical portion (imaging unit insertion portion 172) is in such a form that the other end of the plate is rolled into a semi-cylindrical shape. The first connection portion 173 is a plate portion between the first semi-cylindrical portion (ejection unit insertion portion 171) and the second semi-cylindrical portion (imaging unit insertion portion 172).

The holding member 170 (plate) is made of a synthetic resin or spring steel. That is, the holding member 170 may be formed by injection molding a synthetic resin, or may be formed by bending or pressing a spring steel plate.

The holding member 170 has an axial length L (see FIG. 18) suitable for fixing the greasing pipe 130A and the endoscope 160A together (e.g., L=40 mm).

The diameter of the ejection unit insertion portion 171 is slightly larger than the diameter of the greasing pipe 130A. Therefore, when the greasing pipe 130A is inserted into the ejection unit insertion portion 171, the ejection unit insertion portion 171 is elastically deformed and is then fixed to the greasing pipe 130A (cylindrical portion on the proximal end portion side) by the restoring force of the ejection unit insertion portion 171 in such a manner that the ejection unit insertion portion 171 is in close contact with the outer peripheral surface of the greasing pipe 130A (cylindrical portion on the proximal end portion side).

Similarly, the diameter of the imaging unit insertion portion 172 is slightly larger than the diameter of the endoscope 160A. Therefore, when the endoscope 160A is inserted into the imaging unit insertion portion 172, the imaging unit insertion portion 172 is elastically deformed and is then fixed to the endoscope 160A (cylindrical portion on the proximal end portion side) by the restoring force of the imaging unit insertion portion 172 in such a manner that the imaging unit insertion portion 172 is in close contact with the outer peripheral surface of the endoscope 160A (cylindrical portion on the proximal end portion side).

Figure 19:
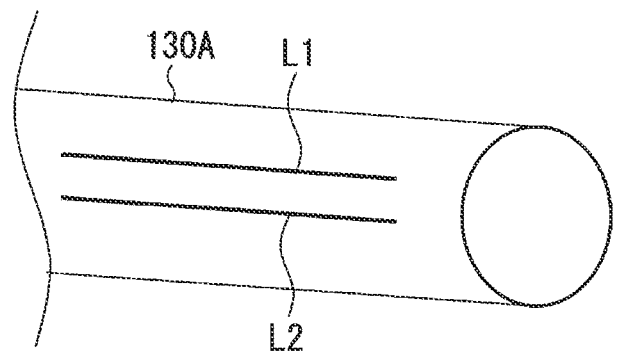
FIG. 19 is a perspective view of a greasing pipe (cylindrical portion on the proximal end portion side) shown in FIG. 16.

FIG. 19 is a perspective view of the greasing pipe 130A (cylindrical portion on the proximal end portion side).

As shown in FIG. 19, the outer peripheral surface of the greasing pipe 130A has a first scribing line L1 and a second scribing line L2 that extend in the axial direction. The scribing lines L1, L2 are used to place the endoscope 160A at an appropriate angular position with respect to the greasing pipe 130A. This will be described later. The scribing lines L1, L2 are an example of an "indication on the ejection unit" of the present disclosure. The indication on the ejection unit is not limited to the scribing lines L1, L2, and may be other indications such as a line drawn with a marker pen or sticker on the outer peripheral surface of the greasing pipe 130A.

Figure 20:
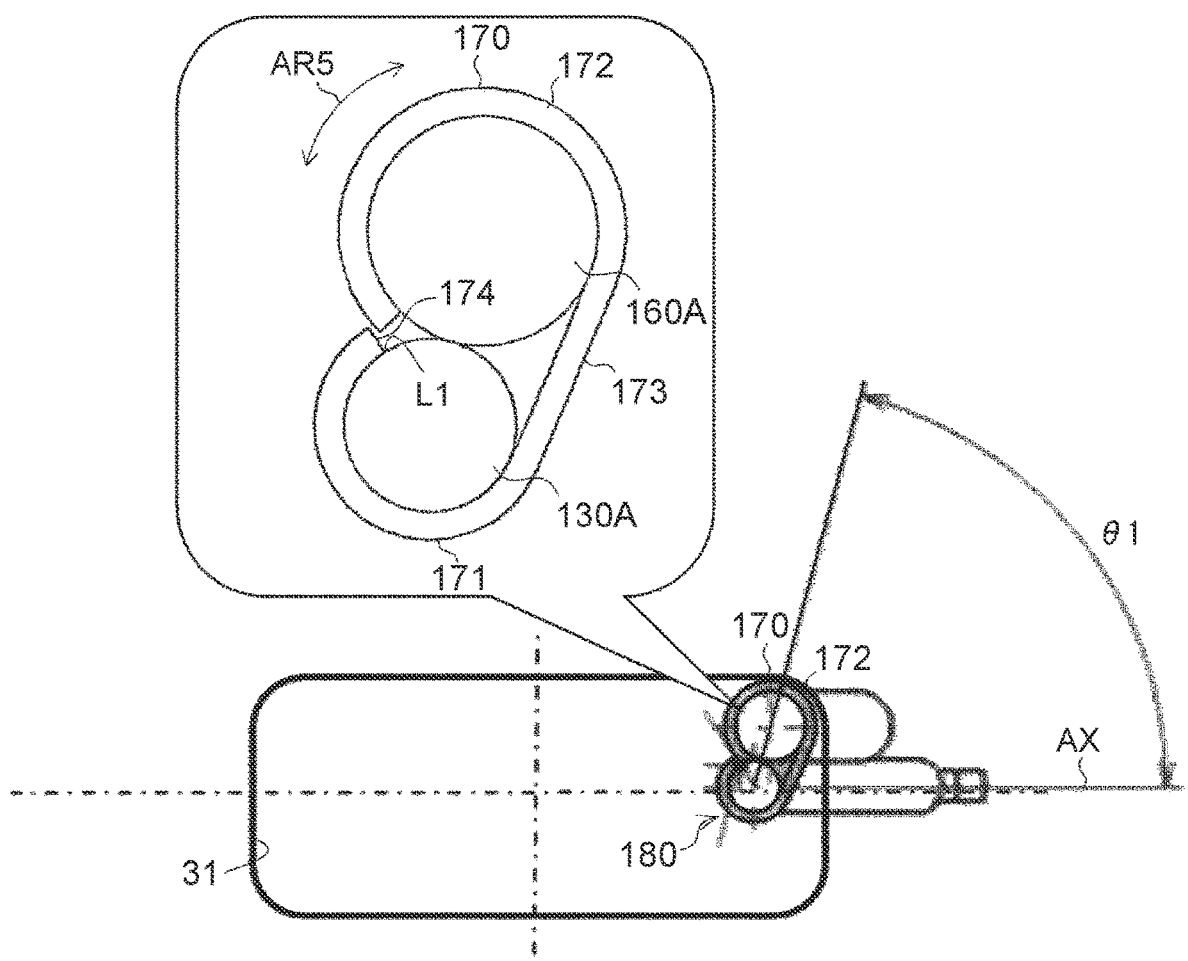
FIG. 20 shows an insertion portion inserted into the through hole of the clutch housing in order to supply grease to a relevant portion located on the side closer to the viewer of FIG. 22 in the ejection device of the fifth embodiment.
Figure 21:
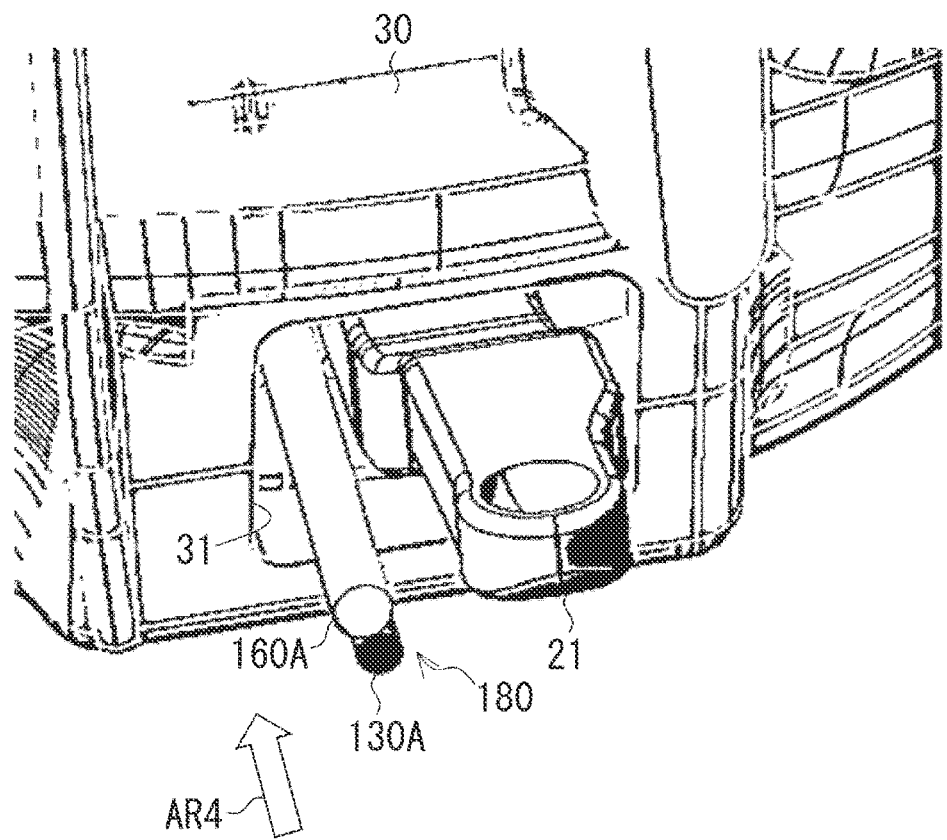
FIG. 21 shows the insertion portion inserted into the through hole of the clutch housing in order to supply grease to the relevant portion located on the side closer to the viewer of FIG. 22 in the ejection device of the fifth embodiment.

Next, a greasing method using the ejection device will be described with reference to FIGS. 20 to 22. FIGS. 20 and 21 show the insertion portion 180 inserted into the through hole 31 of the clutch housing 30 in order to supply grease to the one relevant portion C. FIG. 20 shows the through hole 31 as viewed in the opposite direction to the direction of the arrow AR4 in FIG. 22. FIG. 22 shows the greasing pipe 130A extending toward the one relevant portion C with the insertion portion 180 inserted through the through hole 31 of the clutch housing 30.

The fork boot 32 is removed before the following steps are performed. The through hole 31 (see FIG. 21 etc.) of the clutch housing 30 through which the insertion portion 180 is to be inserted is thus exposed.

An example in which the one relevant portion C and the other relevant portion C in FIG. 22 are greased in this order will be described below. The other relevant portion C is located behind the release bearing 15 in FIG. 22, and is not shown in FIG. 22.

First, in a first step, the operator places the endoscope 160A at an appropriate angular position with respect to the greasing pipe 130A according to the layout of the internal structure of the clutch housing 30 in order to avoid the insertion portion 180 (greasing pipe 130A and endoscope 160A) to be moved toward the one relevant portion C from interfering with an obstacle inside the clutch housing 30 (and in order to secure the field of view of the endoscope 160A).

This step is implemented by rotating the holding member 170 holding the greasing pipe 130A and the endoscope 160A with respect to the greasing pipe 130A (see the arrow AR5 in FIG. 20) to align a rolled end 174 on the ejection unit insertion portion 171 side of the holding member 170 with the first scribing line L1 (see FIG. 19) on the outer peripheral surface of the greasing pipe 130A (see FIG. 20).

The first scribing line L1 is located at such a position that the rolled end 174 on the ejection unit insertion portion 171 side of the holding member 170 is aligned with the first scribing line L1 when the endoscope 160A is located at an angle θ1 (see FIG. 20) with respect to the greasing pipe 130A (reference line AX). In the case of FIG. 20, the angle θ1 is, for example, 75°. The rolled end 174 on the ejection unit insertion portion 171 side is an example of an "indication on the holding member" of the present disclosure. The indication on the holding member is not limited to the rolled end 174 on the ejection unit insertion portion 171 side, and may be other indications such as a line drawn with a magic or sticker on the holding member 170. For example, the reference line AX extends in a direction parallel to the upper surface (see FIG. 16) of the rectangular prism-shaped distal end portion 131 of the greasing pipe 130A (see FIG. 16).

Therefore, the operator can grasp that the endoscope 160A is located at the angle θ1 (see FIG. 20) with respect to the greasing pipe 130A (reference line AX) by visually checking the positional relationship between the rolled end 174 on the ejection unit insertion portion 171 side of the holding member 170 and the first scribing line L1.

Next, in a second step, the operator inserts the insertion portion 180 with the endoscope 160A located at the position of the angle θ1 into the through hole 31 of the clutch housing 30. The through hole 31 of the clutch housing 30 is an example of an "opening or cut formed in the partition wall between the operator and the relevant portion" of the present disclosure. At this time, as shown in FIG. 20, the operator inserts the insertion portion 180 into the through hole 31 of the clutch housing 30 with the imaging unit insertion portion 172 of the holding member 170 being in contact with a corner (right corner in FIG. 20) of the through hole 31 that corresponds to the one relevant portion C. That is, the operator inserts the insertion portion 180 into the through hole 31 of the clutch housing 30 while guiding the insertion direction of the insertion portion 180 toward the one relevant portion C. As described above, in the fifth embodiment, the guide function is implemented by the corner of the through hole 31 of the clutch housing 30 and the imaging unit insertion portion 172 of the holding member 170.

Figure 23:
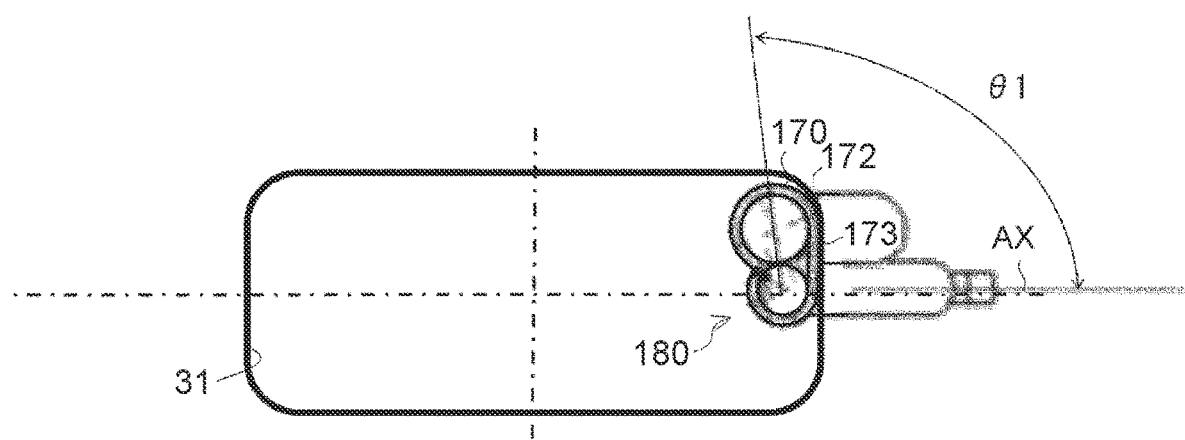
FIG. 23 shows the insertion portion inserted into the through hole of the clutch housing in order to supply grease to the relevant portion located on the side closer to the viewer of FIG. 22 in the ejection device of the fifth embodiment (modification)

The guide function may be implemented as follows. FIG. 23 shows a modification, illustrating the insertion portion 180 inserted into the through hole 31 of the clutch housing 30 in order to supply grease to the one relevant portion C. As shown in FIG. 23, the operator may insert the insertion portion 180 into the through hole 31 of the clutch housing 30 with not only the imaging unit insertion portion 172 but also the flat portion 173 of the holding member 170 being in contact with a corner (right corner in FIG. 23) etc. of the through hole 31 that corresponds to the one relevant portion C. This is an example in which the guide function is implemented by the corner of the through hole 31 of the clutch housing 30 and the imaging unit insertion portion 172 and the flat portion 173 of the holding member 170. In the case of FIG. 23, the angle θ1 is, for example, 100°.

In the step described below, an operator performs an operation of moving the insertion portion 180 held with his or her one hand (e.g., left hand) in the direction of the arrow AR4 (see FIGS. 21 and 22) toward the one relevant portion C so that the distal end portion 131 of the greasing pipe 130A reaches the one relevant portion C, while looking at a screen (image including the distal end portion 131 of the greasing pipe 130A and the surroundings of the distal end portion 131 (e.g., the one relevant portion C)) displayed on the display unit 163 attached to the operation unit 162 held with the other hand (e.g., right hand).

By the operation of moving the insertion portion 180 toward the one relevant portion C, the distal end portion 131 of the greasing pipe 130A reaches a position P4 (see FIG. 22) that is a predetermined distance before the one relevant portion C, and eventually a position P3 (see FIG. 22) near the one relevant portion C.

As shown in FIG. 16, the holding member 170 has a third scribing line L3 and a fourth scribing line L4 in order to allow visually grasping the required insertion amounts for the distal end portion 131 of the greasing pipe 130A to reach the position P4 that is a predetermined distance before the relevant portion C and the position P3 near the relevant portion C. The holding member 170 may have indications such as lines drawn with a marker pen or sticker, instead of the scribing lines L3, L4.

The third scribing line L3 is located at such a position that the third scribing line L3 is aligned with the through hole 31 of the clutch housing 30 when the distal end portion 131 of the greasing pipe 130A reaches the position P4 (see FIG. 22) that is a predetermined distance before the relevant portion C (when the distal end portion 131 of the greasing pipe 130A and the relevant portion C have a predetermined positional relationship).

Therefore, by visually checking the positional relationship between the third scribing line L3 and the through hole 31 of the clutch housing 30, the operator can grasp the required insertion amount for the distal end portion 131 of the greasing pipe 130A to reach the position P4 (see FIG. 22) that is a predetermined distance before the relevant portion C. The operator can also grasp that the distal end portion 131 of the greasing pipe 130A has reached the position P4 (see FIG. 22) that is a predetermined distance before the relevant portion C.

The fourth scribing line L4 is located at such a position that the fourth scribing line L4 is aligned with the through hole 31 of the clutch housing 30 when the distal end portion 131 of the greasing pipe 130A reaches the position P3 (see FIG. 22) near the relevant portion C (when the distal end portion 131 of the greasing pipe 130A and the relevant portion C have a predetermined positional relationship).

Therefore, by visually checking the positional relationship between the fourth scribing line L4 and the through hole 31 of the clutch housing 30, the operator can grasp the required insertion amount for the distal end portion 131 of the greasing pipe 130A to reach the position P3 (see FIG. 22) near the relevant portion C. The operator can also grasp that the distal end portion 131 of the greasing pipe 130A has reached the position P3 (see FIG. 22) near the relevant portion C.

The third scribing line L3 may be omitted.

When the fourth scribing line L4 is aligned with the through hole 31 of the clutch housing 30, that is, when the distal end portion 131 of the grease pipe 130A reaches the position P3 (see FIG. 22) near the one relevant portion C, the operator then inserts the distal end portion 131 of the grease pipe 130A between the clutch release fork 21 (pressing portion 21a) and the release bearing 15 (see FIG. 22) and supplies grease from the opening portion 131a of the greasing pipe 130A to the one relevant portion C in a third step. Specifically, the operator holds the greasing unit 150 with his or her one hand (e.g., left hand) and operates the greasing unit 150 (e.g., pushes the plunger rod 152 shown in FIG. 16 in the axial direction of the plunger rod 152) to supply grease from the opening portion 131a of the greasing pipe 130A to the one relevant portion C (see FIG. 22), while looking at a screen (image including the distal end portion 131 of the greasing pipe 130A and the surroundings of the distal end portion 131 (e.g., the one relevant portion C)) displayed on the display unit 163 attached to the operation unit 162 held with the other hand (e.g., right hand).

When the supply of grease to the one relevant portion C is completed, the operator then removes the greasing pipe 130A through the through hole 31 of the clutch housing 30 in a fourth step.

Thereafter, in a fifth step, the operator places the endoscope 160A at an appropriate angular position with respect to the greasing pipe 130A according to the layout of the internal structure of the clutch housing 30 in order to avoid the insertion portion 180 (greasing pipe 130A and endoscope 160A) to be moved toward the other relevant portion C from interfering with an obstacle inside the clutch housing 30 (and in order to secure the field of view of the endoscope 160A).

Figure 24:
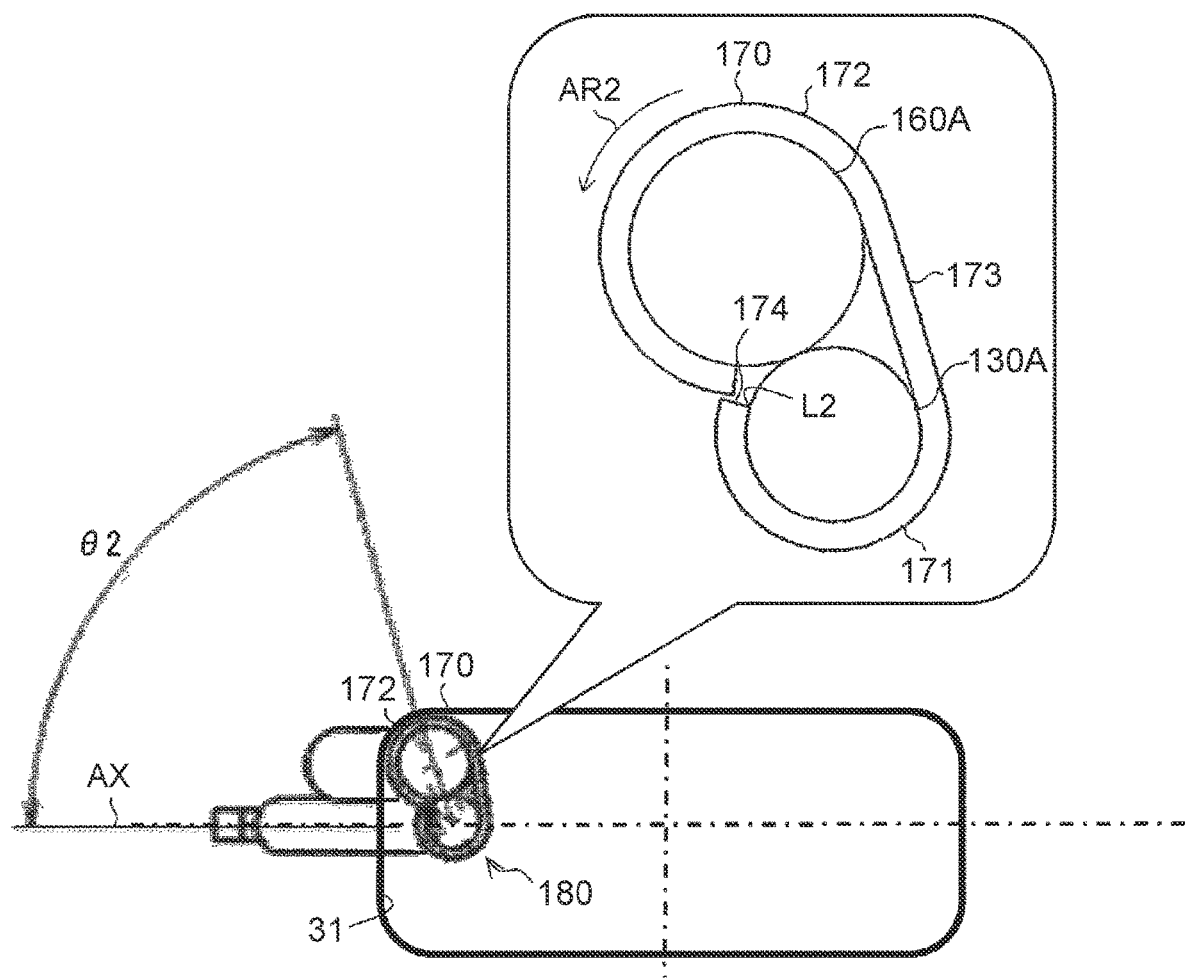
FIG. 24 shows the insertion portion inserted into the through hole of the clutch housing in order to supply grease to a relevant portion located on the side farther from the viewer of FIG. 22 in the ejection device of the fifth embodiment.

This step is implemented by rotating the holding member 170 holding the greasing pipe 130A and the endoscope 160A with respect to the greasing pipe 130A (see the arrow AR2 in FIG. 24) to align the rolled end 174 on the ejection unit insertion portion 171 side of the holding member 170 with the second scribing line L2 (see FIG. 19) on the outer peripheral surface of the greasing pipe 130A (see FIG. 24). FIG. 24 shows the insertion portion 180 inserted into the through hole 31 of the clutch housing 30 in order to supply grease to the other relevant portion C. FIG. 24 shows the through hole 31 as viewed in the opposite direction to the direction of the arrow AR4 in FIG. 22.

The second scribing line L2 is located at such a position that the rolled end 174 on the ejection unit insertion portion 171 side of the holding member 170 is aligned with the second scribing line L2 when the endoscope 160A is located at an angle θ2 (see FIG. 24) with respect to the greasing pipe 130A (reference line AX). In the case of FIG. 24, the angle θ2 is, for example, 75°.

Therefore, the operator can grasp that the endoscope 160A is located at the angle θ2 (see FIG. 24) with respect to the greasing pipe 130A (reference line AX) by visually checking the positional relationship between the rolled end 174 on the ejection unit insertion portion 171 side of the holding member 170 and the second scribing line L2.

Thereafter, in a sixth step, the operator inserts the insertion portion 180 with the endoscope 160A located at the position of the angle θ2 into the through hole 31 of the clutch housing 30. At this time, as shown in FIG. 24, the operator inserts the insertion portion 180 into the through hole 31 of the clutch housing 30 with the imaging unit insertion portion 172 of the holding member 170 being in contact with a corner (left corner in FIG. 24) of the through hole 31 that corresponds to the other relevant portion C. That is, the operator inserts the insertion portion 180 into the through hole 31 of the clutch housing 30 while guiding the insertion direction of the insertion portion 180 toward the other relevant portion C. As described above, in the fifth embodiment, the guide function is implemented by the corner of the through hole 31 of the clutch housing 30 and the imaging unit insertion portion 172 of the holding member 170.

Figure 25:
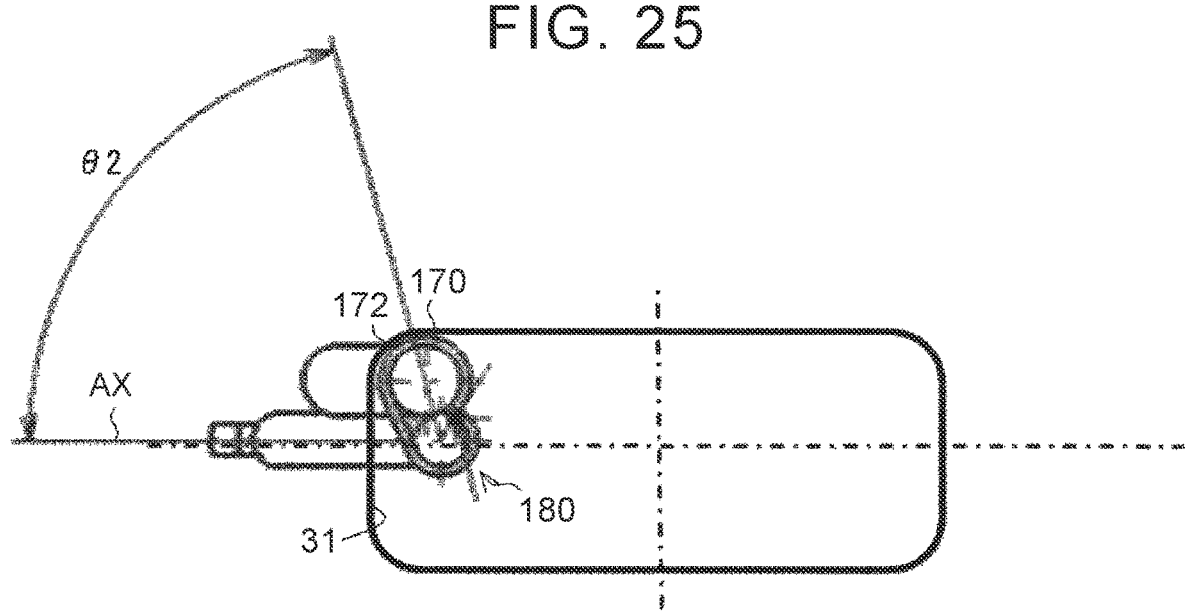
FIG. 25 shows the insertion portion inserted into the through hole of the clutch housing in order to supply grease to the relevant portion located on the side farther from the viewer of FIG. 22 in the ejection device of the fifth embodiment (modification)

The guide function may be implemented as follows. FIG. 25 shows the insertion portion 180 inserted into the through hole 31 of the clutch housing 30 in order to supply grease to the other relevant portion C (modification). As shown in FIG. 25, the operator may insert the insertion portion 180 into the through hole 31 of the clutch housing 30 with the imaging unit insertion portion 172 of the holding member 170 being in contact with a corner (left corner in FIG. 25) of the through hole 31 that corresponds to the other relevant portion C. The holding member 170 in FIG. 20 has been horizontally flipped from the orientation of the holding member 170 in FIG. 20. This is implemented by performing, between the fourth and fifth step, the step of removing the greasing pipe 130A and the endoscope 160A from the holding member 170, horizontally flipping the holding member 170, and holding the greasing pipe 130A and the endoscope 160A again in the horizontally flipped holding member 170.

Figure 26:
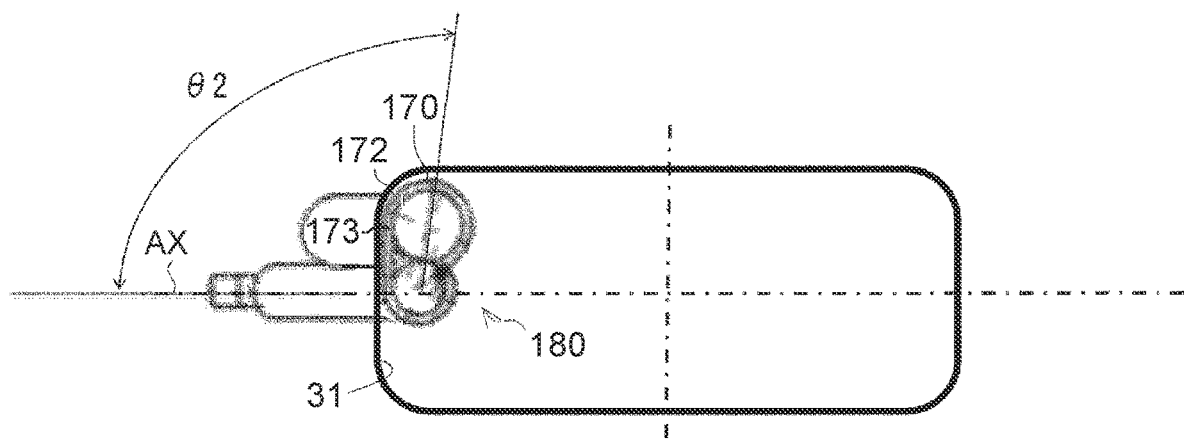
FIG. 26 shows the insertion portion inserted into the through hole of the clutch housing in order to supply grease to the relevant portion located on the side farther from the viewer of FIG. 22 in the ejection device of the fifth embodiment (modification)

The guide function may alternatively be implemented as follows. FIG. 26 shows the insertion portion 180 inserted into the through hole 31 of the clutch housing 30 in order to supply grease to the other relevant portion C (modification). As shown in FIG. 26, the operator may insert the insertion portion 180 into the through hole 31 of the clutch housing 30 with not only the imaging unit insertion portion 172 but also the flat portion 173 of the holding member 170 being in contact with a corner (left corner in FIG. 26) etc. of the through hole 31 that corresponds to the other relevant portion C. This is an example in which the guide function is implemented by the corner of the through hole 31 of the clutch housing 30 and the imaging unit insertion portion 172 and the flat portion 173 of the holding member 170. In the case of FIG. 26, the angle θ2 is, for example, 100°.

In the step described below, the operator performs an operation of moving the insertion portion 180 held with his or her one hand (e.g., left hand) toward the other relevant portion C so that the distal end portion 131 of the greasing pipe 130A reaches the other relevant portion C, while looking at a screen (image including the distal end portion 131 of the greasing pipe 130A and the surroundings of the distal end portion 131 (e.g., the other relevant portion C)) displayed on the display unit 163 attached to the operation unit 162 held with the other hand (e.g., right hand).

By the operation of moving the insertion portion 180 toward the other relevant portion C, the distal end portion 131 of the greasing pipe 130A reaches the position P4 (see FIG. 22) that is a predetermined distance before the other relevant portion C, and eventually the position P3 (see FIG. 22) near the other relevant portion C.

When the fourth scribing line L4 is aligned with the through hole 31 of the clutch housing 30, that is, when the distal end portion 131 of the grease pipe 130A reaches the position P3 (see FIG. 22) near the other relevant portion C, the operator inserts the distal end portion 131 of the grease pipe 130A between the clutch release fork 21 (pressing portion 21a) and the release bearing 15 and supplies grease from the opening portion 131a of the greasing pipe 130A to the other relevant portion C in a seventh step. Specifically, the operator holds the greasing unit 150 with his or her one hand (e.g., left hand) and operates the greasing unit 150 (e.g., pushes the plunger rod 152 shown in FIG. 16 in the axial direction of the plunger rod 152) to supply grease from the opening portion 131a of the greasing pipe 130A to the other relevant portion C, while looking at a screen (image including the distal end portion 131 of the greasing pipe 130A and the surroundings of the distal end portion 131 (e.g. the other relevant portion C)) displayed on the display unit 163 attached to the operation unit 162 held with the other hand (e.g., right hand).

When the supply of grease to the other relevant portion C is completed, the operator then removes the greasing pipe 130A through the through hole 31 of the clutch housing 30 in an eighth step.

Greasing of the one relevant portion C and the other relevant portion C is completed by performing the above steps.

As described above, according to the fifth embodiment, the insertion portion 180 can be inserted toward the relevant portion C without using a guide jig.

This is because the guide function is implemented by the through hole 31 (corner etc.) of the clutch housing 30 and the holding member 170 (imaging unit insertion portion 172, flat portion 173).

According to the fifth embodiment, the endoscope 160A can be placed at an appropriate angular position with respect to the greasing pipe 130A.

This is because the ejection device includes the holding member 170 that holds the greasing pipe 130A and the endoscope 160A such that the greasing pipe 130A and the endoscope 160A are arranged next to each other in parallel, and the indication on the ejection unit (e.g., the scribing lines L1, L2) with which the indication on the holding member 170 (e.g., the rolled end 174 on the ejection unit insertion portion 171 side of the holding member 170) is to be aligned is provided on the greasing pipe 130A.

According to the fifth embodiment, it is possible to grease the pressing portion 21a of the clutch release fork 21 without removing the clutch housing 30 (or a manual transmission unit that includes the clutch housing 30) from the vehicle. This facilitates the greasing maintenance work and improves workability.

Next, a first modification of the holding member 170 of the fifth embodiment will be described.

Figure 27:
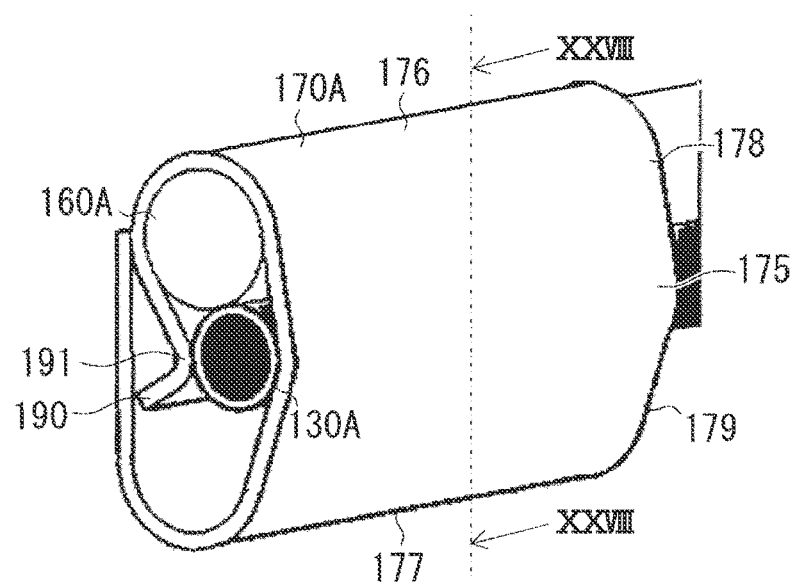
FIG. 27 is a perspective view of a holding member that is a first modification of the fifth embodiment.
Figure 28:
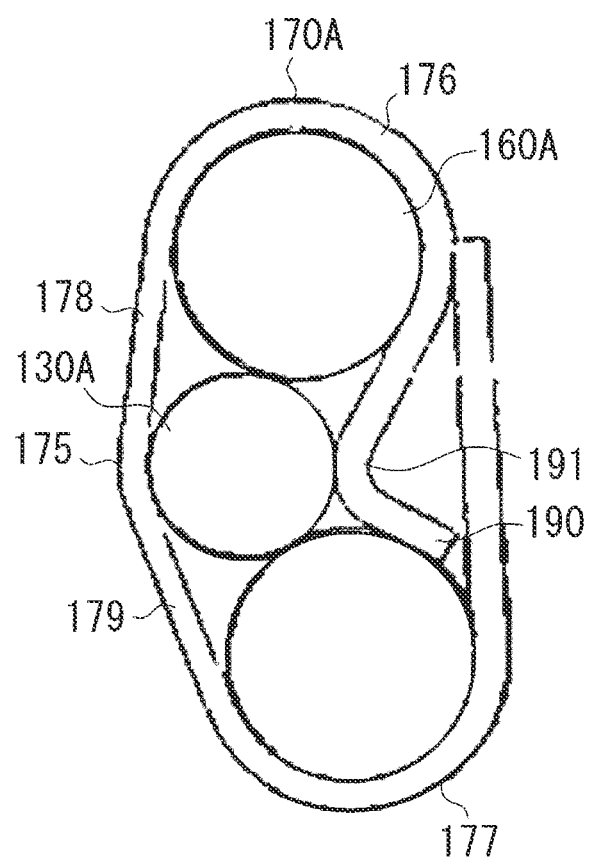
FIG. 28 is a sectional view taken along line XXVIII-XXVIII in FIG. 27.

FIG. 27 is a perspective view of a holding member 170A that is the first modification, and FIG. 28 is a sectional view taken along line XXVIII-XXVIII in FIG. 27.

As shown in FIGS. 27 and 28, the holding member 170A includes: a third semi-cylindrical portion 175 that is an ejection unit insertion portion into which the greasing pipe 130A (cylindrical portion on the proximal end portion side) is press-fitted; a fourth semi-cylindrical portion 176 and a fifth semi-cylindrical portion 177 that are imaging unit insertion portions into which the endoscope 160A (cylindrical portion on the proximal end portion side) is press-fitted; a second connection portion 178 connecting the third semi-cylindrical portion 175 and the fourth semi-cylindrical portion 176; and a third connection portion 179 connecting the third semi-cylindrical portion 175 and the fifth semi-cylindrical portion 177.

The second connection portion 178 is a flat portion connecting one end of the third semi-cylindrical portion 175 and one end of the fourth semi-cylindrical portion 176. This flat portion (second connection portion 178) extends in the tangential direction to the third semi-cylindrical portion 175 and the fourth semi-cylindrical portion 176 (see FIG. 28).

The third connection portion 179 is a flat portion connecting the other end of the third semi-cylindrical portion 175 and one end of the fifth semi-cylindrical portion 177. This flat portion (third connection portion 179) extends in the tangential direction to the third semi-cylindrical portion 175 and the fifth semi-cylindrical portion 177 (see FIG. 28).

The fourth semi-cylindrical portion 176 is in such a form that one end of a plate is rolled into a semi-cylindrical shape. Similarly, the fifth semi-cylindrical portion 177 is in such a form that the other end of the plate is rolled into a semi-cylindrical shape.

The third semi-cylindrical portion 175 is formed in a plate portion between the fourth semi-cylindrical portion 176 and the fifth semi-cylindrical portion 177.

The second connection portion 178 is a plate portion between the third semi-cylindrical portion 175 and the fourth semi-cylindrical portion 176. The third connection portion 179 is a plate portion between the third semi-cylindrical portion 175 and the fifth semi-cylindrical portion 177.

One end (free end) of the plate includes a first biasing portion 190 and a second biasing portion 191. The first biasing portion 190 biases the endoscope 160A (cylindrical portion on the proximal end portion side) inserted into the fifth semi-cylindrical portion 177 against the fifth semi-cylindrical portion 177. The second biasing portion 191 biases the greasing pipe 130A (cylindrical portion on the proximal end portion side) inserted into the third semi-cylindrical portion 175 against the third semi-cylindrical portion 175.

The third semi-cylindrical portion 175 is fixed to the greasing pipe 130A (cylindrical portion on the proximal end portion side) inserted into the third semi-cylindrical portion 175. This fixing can be performed by known means such as an adhesive or welding.

The holding member 170A (plate) is made of a synthetic resin or spring steel. That is, the holding member 170A may be formed by injection molding a synthetic resin, or may be formed by bending or pressing a spring steel plate.

As described above, according to the first modification, the operator can place the endoscope 160A at an appropriate angular position with respect to the greasing pipe 130A by press-fitting the endoscope 160A (cylindrical portion on the proximal end portion side) into either the fourth semi-cylindrical portion 176 or the fifth semi-cylindrical portion 177 according to the layout of the internal structure of the clutch housing 30. It is therefore possible to avoid the insertion portion 180 (greasing pipe 130A and endoscope 160A) from interfering with an obstacle inside the clutch housing 30 when inserting the insertion portion 180 (greasing pipe 130A and endoscope 160A) toward the relevant portion C.

According to the first modification, the second connection portion 178 and the third connection portion 179 are flat portions. This configuration can reduce the manufacturing cost of the holding member 170A (such as machining cost for bending the second connection portion 178 and the third connection portion 179), as compared to a second modification described below in which a fourth connection portion 178B and a fifth connection portion 179B that correspond to the second connection portion 178 and the third connection portion 179 are curved portions.

According to the first modification, effects similar to those of the fifth embodiment can be obtained by performing steps similar to the first to eighth steps described in the fifth embodiment.

Next, a second modification of the fifth embodiment will be described.

Figure 29:
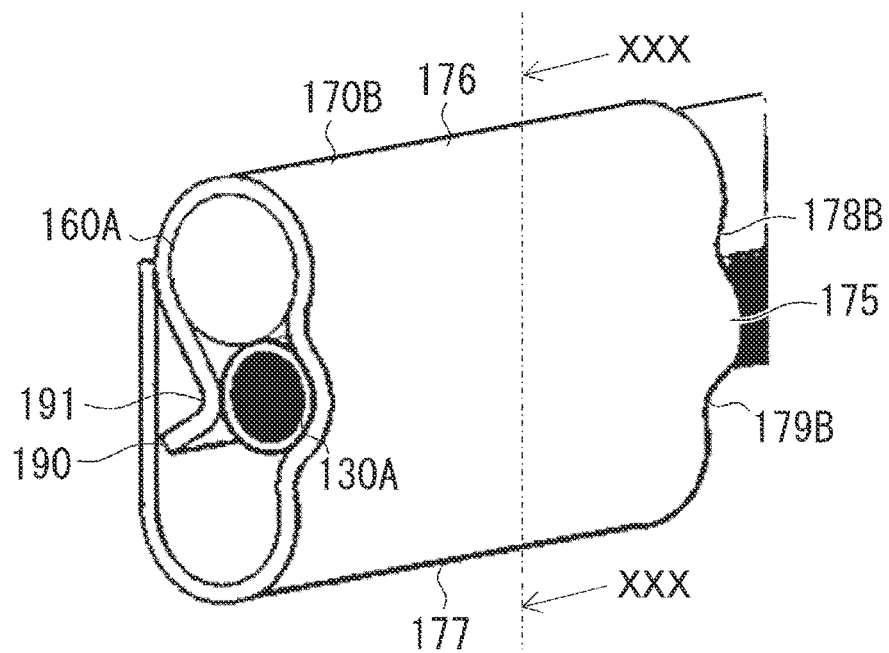
FIG. 29 is a perspective view of a holding member that is a second modification of the fifth embodiment.
Figure 30:
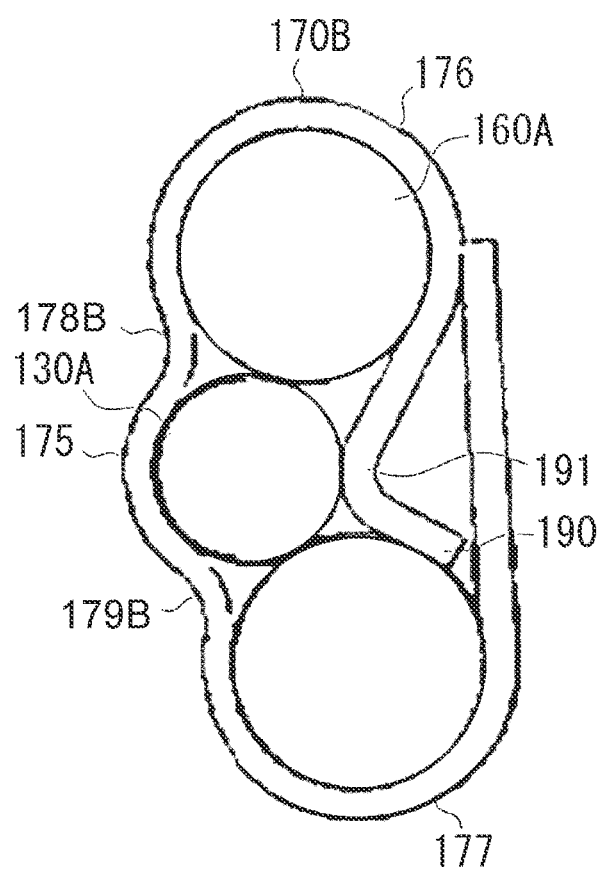
FIG. 30 is a sectional view taken along line XXX-XXX in FIG. 29.

FIG. 29 is a perspective view of a holding member 170B that is the second modification, and FIG. 30 is a sectional view taken along line XXX-XXX in FIG. 29.

In the holding member 170B, the second connection portion 178 that is a flat portion of the holding member 170A of the first modification is replaced with a fourth connection portion 178B that is a curved portion, and the third connection portion 179 that is a flat portion of the holding member 170A of the first modification is replaced with a fifth connection portion 179B that is a curved portion. The third semi-cylindrical portion 175 is not fixed to the greasing pipe 130A (cylindrical portion on the proximal end portion side) inserted into the third semi-cylindrical portion 175. The holding member 170B is otherwise similar to the holding member 170A of the first modification. The differences from the holding member 170A of the first modification will be mainly described below. Configurations similar to those of the holding member 170A are denoted with the same signs, and description thereof will be omitted as appropriate.

As shown in FIGS. 29 and 30, the holding member 170B includes: the third semi-cylindrical portion 175 that is an ejection unit insertion portion into which the greasing pipe 130A (cylindrical portion on the proximal end portion side) is press-fitted; the fourth semi-cylindrical portion 176 and the fifth semi-cylindrical portions 177 that are imaging unit insertion portions into which the endoscope 160A (cylindrical portion on the proximal end portion side) is press-fitted; the fourth connection portion 178B connecting the third semi-cylindrical portion 175 and the fourth semi-cylindrical portion 176; and the fifth connection portion 179B connecting the third semi-cylindrical portion 175 and the fifth semi-cylindrical portion 177.

The fourth connection portion 178B is a curved portion connecting one end of the third semi-cylindrical portion 175 and one end of the fourth semi-cylindrical portion 176.

The fifth connection portion 179B is a curved portion connecting the other end of the third semi-cylindrical portion 175 and one end of the fifth semi-cylindrical portion 177.

The fourth connection portion 178B is a plate portion between the third semi-cylindrical portion 175 and the fourth semi-cylindrical portion 176. The fifth connection portion 179B is a plate portion between the third semi-cylindrical portion 175 and the fifth semi-cylindrical portion 177.

The holding member 170B (plate) is made of a synthetic resin or spring steel. That is, the holding member 170B may be formed by injection molding a synthetic resin, or may be formed by bending or pressing a spring steel plate.

As described above, according to the second modification, the operator can place the endoscope 160A at an appropriate angular position with respect to the greasing pipe 130A by press-fitting the endoscope 160A (cylindrical portion on the proximal end portion side) into either the fourth semi-cylindrical portion 176 or the fifth semi-cylindrical portion 177 according to the layout of the internal structure of the clutch housing 30. It is therefore possible to avoid the insertion portion 180 (greasing pipe 130A and endoscope 160A) from interfering with an obstacle inside the clutch housing 30 when inserting the insertion portion 180 (greasing pipe 130A and endoscope 160A) toward the relevant portion C.

According to the second modification, effects similar to those of the fifth embodiment can be obtained by performing steps similar to the first to eighth steps described in the fifth embodiment.

Although an example in which the fluidic substance is grease is described in the fifth embodiment, the present disclosure is not limited to this. For example, the fluidic substance may be fluid. In this case, the relevant portion C is a portion that needs to be supplied with the fluid. The fluidic substance may be a fluidic substance other than grease and fluid.

Although an example in which the ejection device and the insertion direction guiding method of the present disclosure are applied to the vehicle field (maintenance with grease ejection for clutch release mechanisms) is described in the fifth embodiment, the present disclosure is not limited to this. For example, the ejection device and the insertion direction guiding method of the present disclosure may be applied to various fields other than the vehicle field, such as the medical field and the semiconductor field. For example, although an example in which the partition wall between the operator and the relevant portion C is the clutch housing 30 is described in the fifth embodiment, the present disclosure is not limited to this. That is, the partition wall between the operator and the relevant portion C may be a partition wall suitable for the field to which the ejection device and the insertion direction guiding method of the present disclosure are applied. An example in which the operator inserts the insertion portion 180 toward the relevant portion C with the insertion portion 180 being in contact with a corner of an opening (e.g., the through hole 31) formed in the partition wall between the operator and the relevant portion C (e.g., the clutch housing 30) (that is, while guiding the insertion direction of the insertion portion 180 toward the relevant portion C) is described in the fifth embodiment. However, the present disclosure is not limited to this. For example, in the case where the partition wall between the operator and the relevant portion C has a cut (not shown), the operator may insert the insertion portion 180 toward the relevant portion C with the insertion portion 180 being in contact with a corner of the cut (that is, while guiding the insertion direction of the insertion portion 180 toward the relevant portion C).

Next, an example of a configuration capable of supplying (applying) grease in a direction crossing the insertion direction will be described as a sixth embodiment. This example of the configuration can be applied to the first to fifth embodiments.

Figure 31:
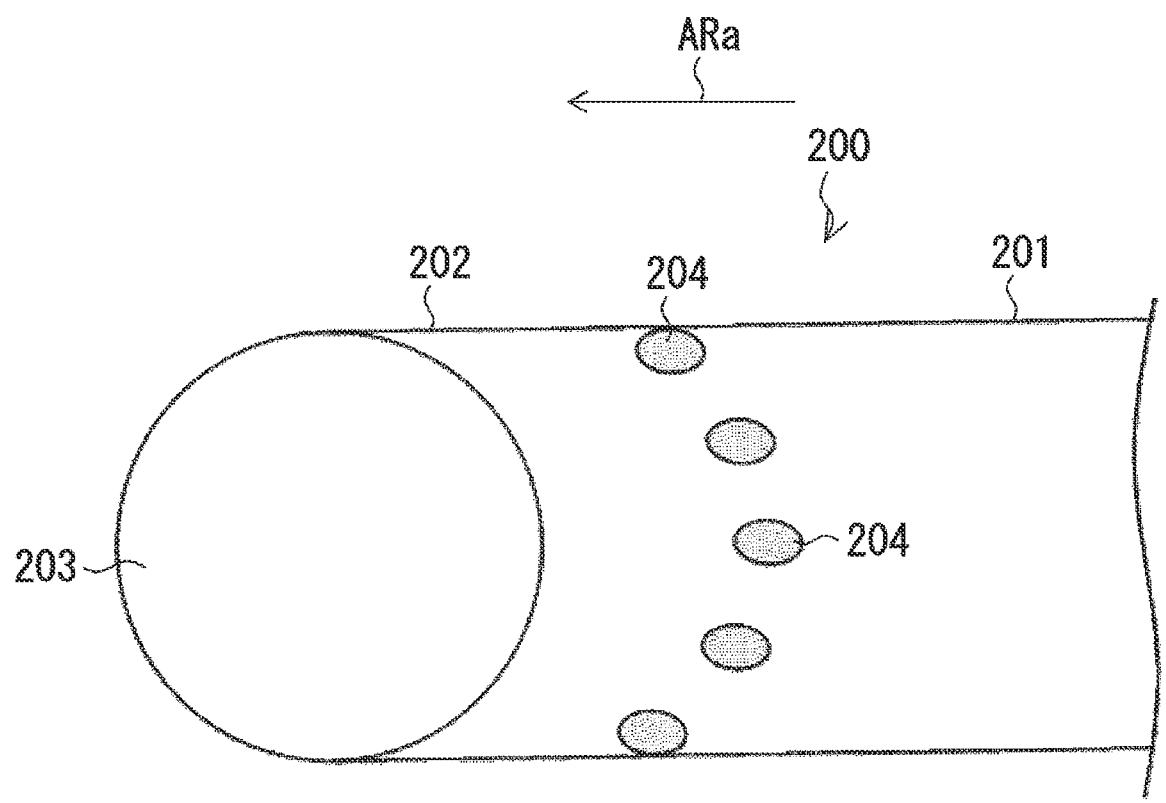
FIG. 31 is a perspective view of an example of a configuration capable of supplying (applying) grease in a direction crossing an insertion direction in a sixth embodiment.
Figure 32:
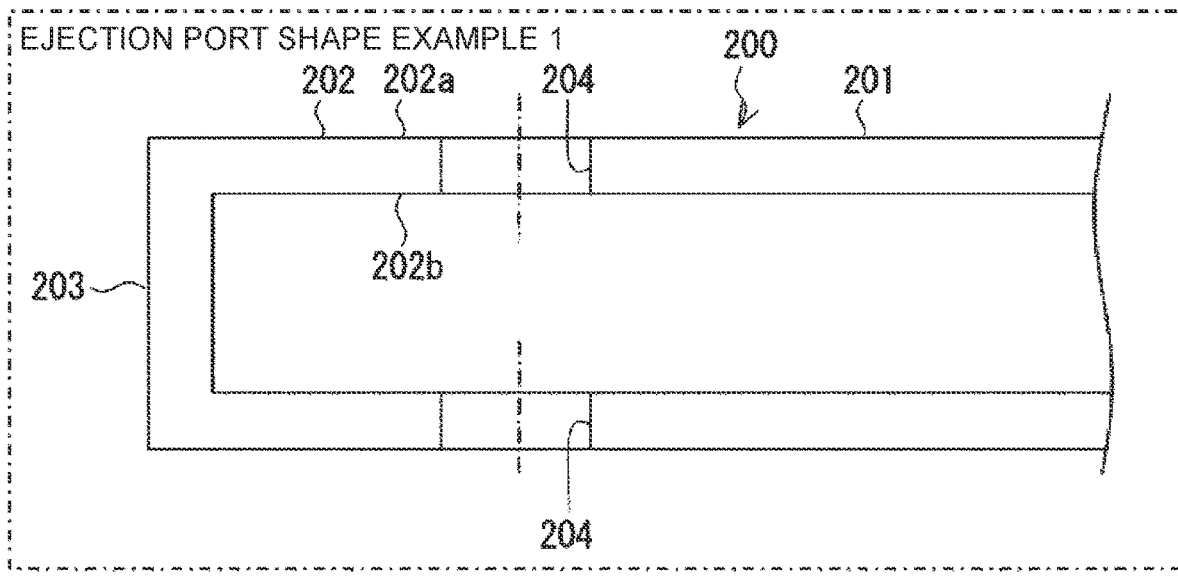
FIG. 32 shows sectional views of near a distal end portion of an ejection unit shown in FIG. 31 (sectional views taken along a plane including the central axis of the ejection unit)
Figure 32:
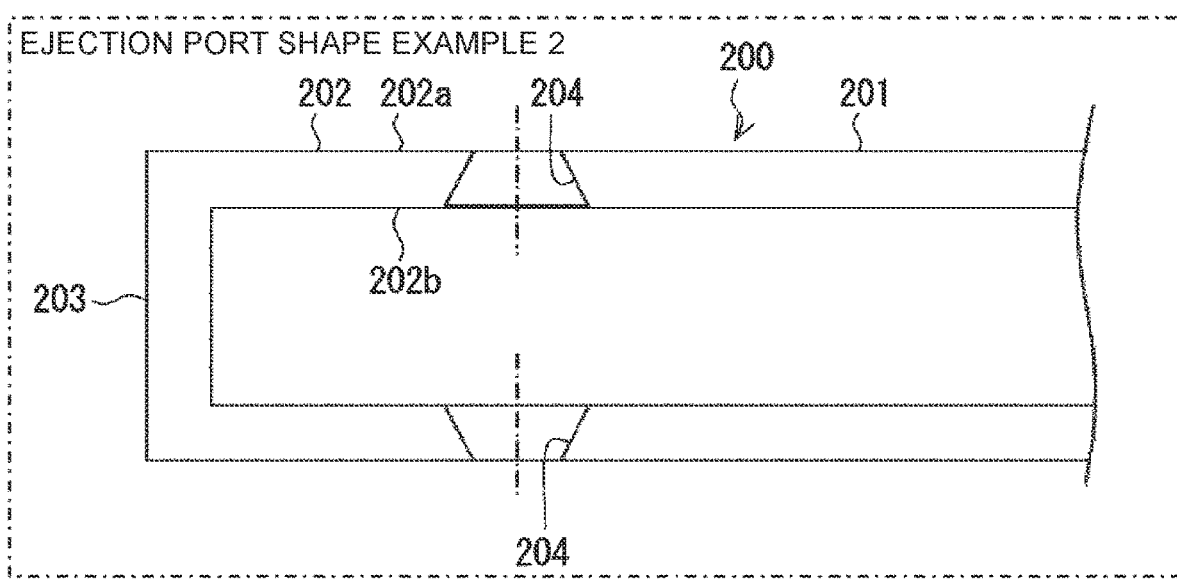
Figure 33:
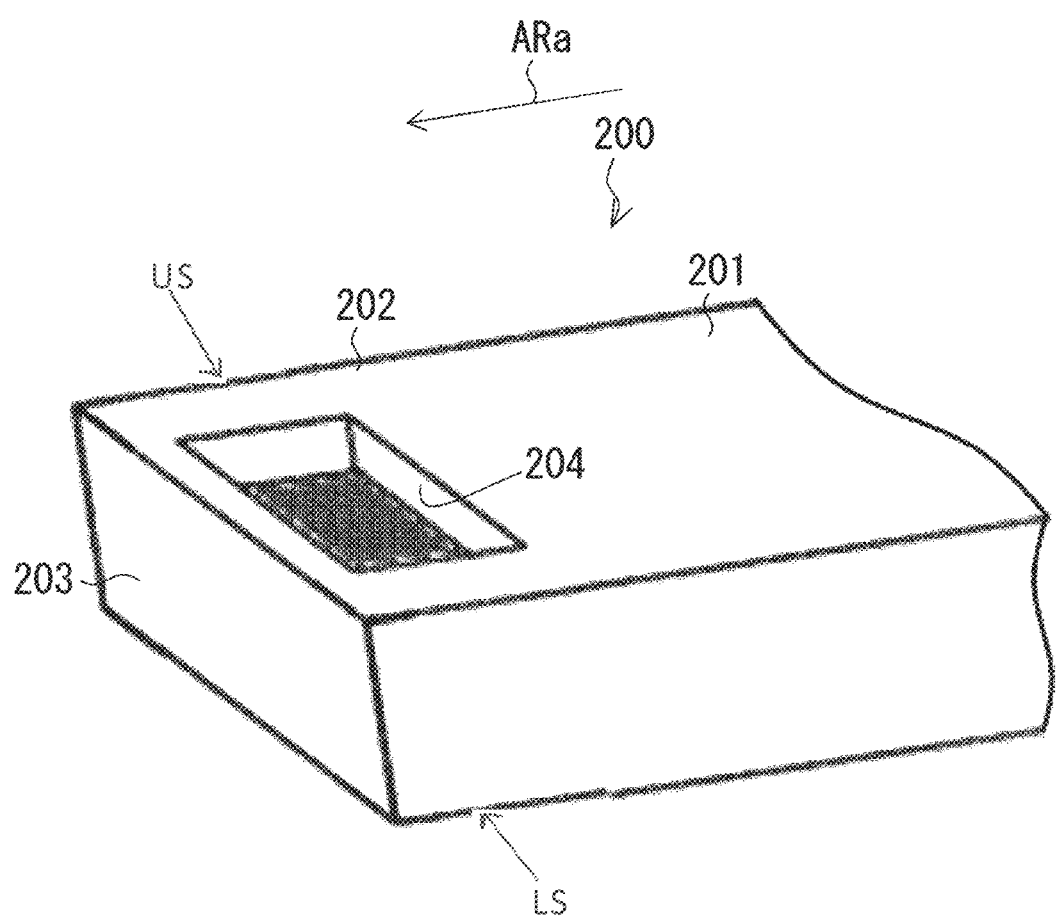
FIG. 33 is a perspective view of an example (modification) of the configuration capable of supplying (applying) grease in a direction crossing to the insertion direction in the sixth embodiment.

FIG. 31 is a perspective view of the example of the configuration capable of supplying (applying) grease in a direction crossing an insertion direction ARa. FIG. 32 shows sectional views of near a distal end portion 202 of an ejection unit 201 (sectional views taken along a plane including the central axis of the ejection unit 201). FIG. 33 is a perspective view of an example (modification) of the configuration capable of supplying (applying) grease in a direction crossing to the insertion direction ARa.

As shown in FIG. 31, the example of the configuration capable of supplying (applying) grease in a direction crossing the insertion direction ARa includes an insertion portion 200 that is held by the operator and inserted toward the relevant portion C in a narrow space. An example in which the relevant portion C is an inner peripheral surface of a ring-shaped member E (see FIG. 34) placed in the internal space surrounded by the cover member will be described below. Hereinafter, the relevant portion C is sometimes referred to as the "inner peripheral surface C of the ring-shaped member E." The cover member is, for example, but is not limited to, the clutch housing 30 of the first to fifth embodiments. That is, the cover member may be a cover member that is used in various fields other than the vehicle field, such as the medical field and the semiconductor field. Although not shown in the figures, the cover member has a through hole similar to the through hole 31 of the clutch housing 30 into which the insertion portion 200 is to be inserted.

The insertion portion 200 includes the ejection unit 201. The ejection unit 201 is a fluidic substance supply pipe with its distal end portion 202 (distal end face) closed by a closing portion 203. The ejection unit 201 is, for example, the greasing pipe 130 of the first to fourth embodiments with its distal end portion 202 (distal end face) closed by the closing portion 203, or the greasing pipe 130A of the fifth embodiment with its distal end portion closed by the closing portion 203. The ejection unit 201 (including the distal end portion 202) may be a round pipe (see FIG. 31), a rectangular pipe (see FIG. 33), or a pipe with other shape. Although not shown in the figures, the insertion portion 200 includes an imaging unit. The imaging unit is, for example, the endoscope 160 of the first to fourth embodiments or the endoscope 160A of the fifth embodiment.

A side surface of the distal end portion 202 of the ejection unit 201 has an ejection port 204. As shown in FIG. 32, the ejection port 204 is an ejection port that extends from an outer peripheral surface 202a to an inner peripheral surface 202b of the distal end portion 202 and from which grease to be supplied through the ejection unit 201 that is a fluidic substance supply pipe is ejected. The ejection port 204 is an example of a "fluidic substrate ejection port" of the present disclosure.

The orientation, position, number, size, and shape of the ejection port 204 may be the orientation, position, number, size, and shape that are appropriate for the application.

For example, as shown in FIG. 31, a plurality of ejection ports 204 may be formed in an annular pattern in the circumferential direction of the side surface of the distal end portion 202 of the ejection unit 201. In this case, the ejection ports 204 may be formed in a radial fashion so that grease is ejected in a radial pattern from the ejection ports 204. The number of ejection ports 204 may be one.

For example, as shown in the upper part of FIG. 32, the ejection port 204 may have a cylindrical shape having the same diameter along its entire length between the outer peripheral surface 202a side and the inner peripheral surface 202b side of the distal end portion 202 of the ejection unit 201. For example, as shown in the lower part of FIG. 32, the ejection port 204 may have a tapered shape having a smaller diameter on the outer peripheral surface 202a side of the distal end portion 202 of the ejection unit 201 and a larger diameter on the inner peripheral surface 202b side of the distal end portion 202 of the ejection unit 201. With this tapered configuration, the scattering distance of grease ejected from the ejection port 204 can be increased as compared to the ejection port 204 having the cylindrical shape. Moreover, the scattering distance of grease ejected from the ejection port 204 can be adjusted according to the speed at which the greasing unit 150 is operated (e.g., the speed at which the plunger rod 152 shown in FIG. 3 is pushed in the axial direction of the plunger rod 152). As shown in FIG. 33, the ejection port 204 may have a rectangular shape.

Next, an example of a configuration for uniformly supplying (applying) grease will be described.

Figure 34:
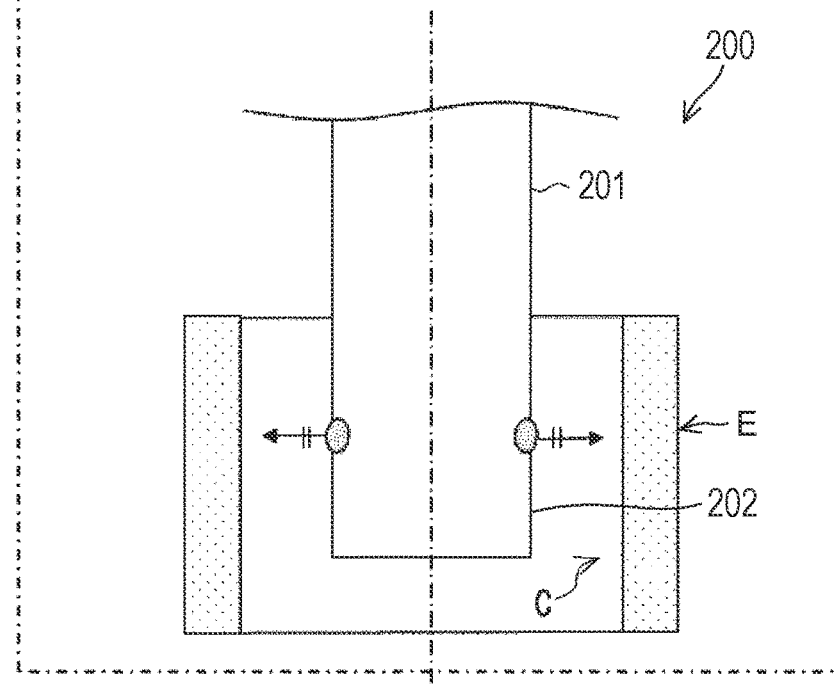
FIG. 34 shows examples of grease supply in an ejection device of the sixth embodiment.
Figure 34:
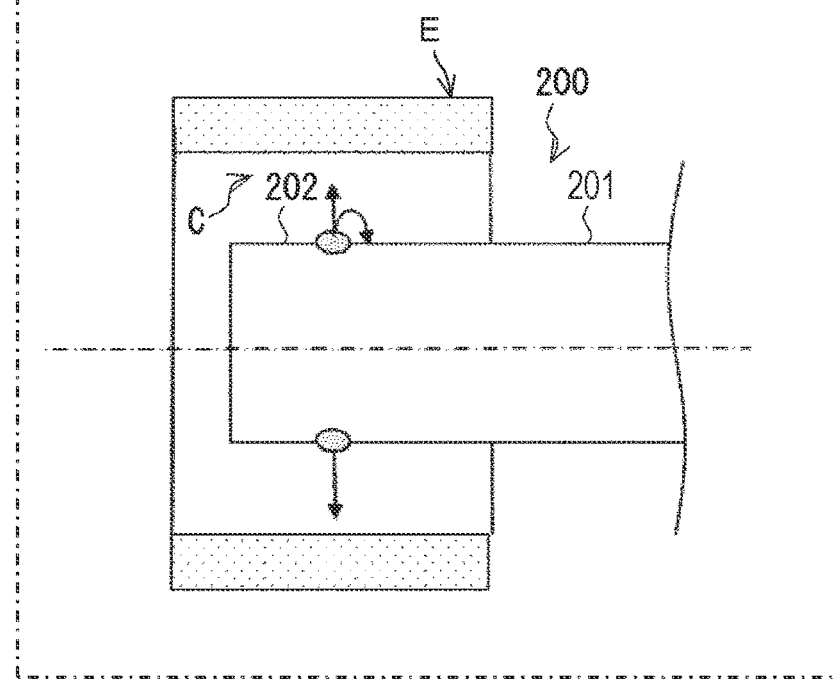

FIG. 34 shows examples of grease supply.

The upper part of FIG. 34 shows the ejection unit 201 inserted through the through hole in the cover member and then inserted in the vertical direction into the ring-shaped member E located in a small space by the operator holding the insertion portion 200, and shows how grease is supplied (applied) from the ejection unit 201 to the inner peripheral surface C of the ring-shaped member E.

An example of horizontal grease application is shown in the upper part of FIG. 34. In order to evenly supply (apply) grease from the ejection unit 201 inserted in the vertical direction, it is desirable to form a plurality of ejection ports 204 having the same size, shape, etc. at equal intervals in the circumferential direction of the side surface of the distal end portion 202 of the ejection unit 201 in a radial fashion such that the ejection ports 204 form an annular pattern. With this configuration, the same amount of grease is evenly ejected in a radial pattern in the horizontal direction from each ejection port 204 of the ejection unit 201 inserted in the vertical direction, so that a fixed amount of grease reaches the inner peripheral surface C of the ring-shaped member E from each ejection port 204. Grease can therefore be evenly supplied (applied) to the inner peripheral surface C of the ring-shaped member E.

An example of vertical grease application is shown in the lower part of FIG. 34. There is the following problem when inserting the ejection unit 201 in the horizontal direction to evenly supply (apply) grease. In the case where the ejection unit 201 is inserted in the horizontal direction, the amount of grease reaching the inner peripheral surface C of the ring-shaped member E is smaller for grease ejected from the upper ejection port 204 than for grease ejected from the lower ejection port 204 due to the influence of the own weight of the grease. Therefore, grease cannot be uniformly supplied (applied) to the inner peripheral surface C of the ring-shaped member E.

Figure 35:
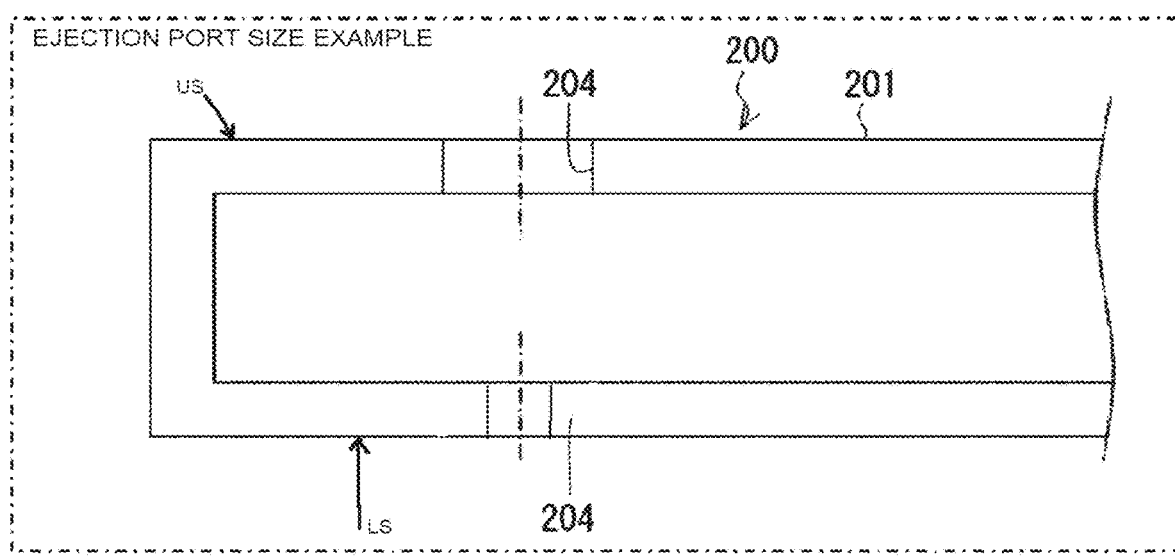
FIG. 35 shows an example of an ejection device having a larger ejection port on the upper side than the ejection port on the lower side.

In order to evenly supply (apply) grease from the ejection unit 201 inserted in the horizontal direction, it is desirable, in consideration of the own weight of grease ejected from each ejection port 204, to make the total area of the ejection ports 204 that are located on the upper side (US in FIGS. 33 and 35) when the insertion portion 200 is inserted in the horizontal direction larger than the total area of the ejection ports 204 that are located on the lower side (LS in FIGS. 33 and 35) when the insertion portion 200 is inserted in the horizontal direction so that the amount of grease reaching the inner peripheral surface C of the ring-shaped member E from each ejection port 204 becomes uniform.

This configuration can be implemented by, for example, making the number of ejection ports 204 that are located on the upper side when the insertion portion 200 is inserted in the horizontal direction larger than the number of ejection ports 204 that are located on the lower side when the insertion portion 200 is inserted in the horizontal direction. This configuration can also be implemented by, for example, making the size of the ejection ports 204 that are located on the upper side when the insertion portion 200 is inserted in the horizontal direction larger than the size of the ejection ports 204 that are located on the lower side when the insertion portion 200 is inserted in the horizontal direction. This can be seen in FIG. 35 where the ejection portion on the upper side (US) is greater in size than the ejection port on the lower side (LS).

The scale position of the cylinder 151 to which the plunger rod 152 of the greasing unit 150 is to be pushed may be specified, a one-push dose of grease may be specified, or an automatic ejection gun capable of supplying a fixed amount of grease may be used as the greasing unit 150 instead of the cylinder 151 and the plunger rod 152 (piston). Grease can thus be more stably supplied (applied) to the relevant portion C (e.g., the inner peripheral surface of the ring-shaped member E), and the work quality of the grease supply (application) to the relevant portion C (e.g., the inner peripheral surface of the ring-shaped member E) can be ensured.

As described above, according to the sixth embodiment, grease is ejected from the ejection ports 204 formed in the side surface of the distal end portion 202 of the ejection unit 201. Therefore, the grease can be supplied (applied) in a direction crossing the insertion direction ARa.

Next, modifications will be described.

Although an example in which the fluidic substance is grease is described in the sixth embodiment, the present disclosure is not limited to this. For example, the fluidic substance may be fluid. In this case, the relevant portion C is a portion that needs to be supplied with the fluid. The fluidic substance may be a fluidic substance other than grease and fluid.

Although an example in which the ejection device of the present disclosure is applied to the vehicle field (maintenance with grease ejection for clutch release mechanisms) is described in the sixth embodiment, the present disclosure is not limited to this. For example, the ejection device of the present disclosure may be applied to various fields other than the vehicle field, such as the medical field and the semiconductor field.

Although an example in which the insertion portion 200 includes an imaging unit is described in the sixth embodiment, the present disclosure is not limited to this. For example, the imaging unit may be omitted.

It should be understood that the numerical values in the above embodiments are all illustrative and numerical values different from those numerical values can be used as appropriate.

The above embodiments are merely illustrative in all respects. The present disclosure should not be construed as being limited by the above description of the embodiments.

The present disclosure can be carried out in various other forms without departing from the spirit or main features of the disclosure.

What is claimed is:

1. A grease ejection device, comprising an insertion portion that is inserted toward a relevant portion in a narrow space, wherein the insertion portion includes an ejection unit that is a fluidic substance supply pipe of which distal end portion is closed, and a side surface of the distal end portion of the ejection unit includes at least one fluidic substance ejection port that extends from an outer peripheral surface to an inner peripheral surface of the distal end portion and from which grease that is a fluidic substance to be supplied through the ejection unit is ejected,
    wherein a plurality of the fluidic substance ejection ports is provided in a circumferential direction of the distal end portion of the ejection unit, and
    wherein a total area of the fluidic substance ejection ports located on an upper side when the insertion portion is inserted in a horizontal direction is larger than a total area of the fluidic substance ejection ports located on a lower side when the insertion portion is inserted in the horizontal direction.

2. The ejection device according to claim 1, wherein the at least one fluidic substance ejection port is taper shaped with a smaller diameter on the outer peripheral surface side of the distal end portion of the ejection unit and a larger diameter on the inner peripheral surface side of the distal end portion of the ejection unit.

3. The ejection device according to claim 1, wherein the insertion portion further includes an imaging device configured to capture an image including the distal end portion of the ejection unit, the at least one fluidic substance ejection port, and surroundings of the distal end portion and the at least one fluidic substance ejection port.

4. The ejection device according to claim 3, wherein the imaging device is an endoscope.

5. The ejection device according to claim 1, further comprising:
    a supply unit configured to supply the fluidic substance to the insertion portion; and
    a flexible tube configured to connect the insertion portion and the supply unit.

* * * * *